US012697546B2

(12) United States Patent
Hirahata et al.

(10) Patent No.: US 12,697,546 B2
(45) Date of Patent: Aug. 4, 2026

(54) NON-TRANSITORY COMPUTER READABLE MEDIUM, INFORMATION PROCESSING METHOD, AND GAMING DEVICE

(71) Applicant: CYGAMES, INC., Tokyo (JP)

(72) Inventors: Kosuke Hirahata, Tokyo (JP); Yuki Tamura, Tokyo (JP); Mizuki Masuda, Tokyo (JP); Yujiro Deguchi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 163 days.

(21) Appl. No.: 18/886,480

(22) Filed: Sep. 16, 2024

(65) Prior Publication Data

US 2025/0010187 A1      Jan. 9, 2025

Related U.S. Application Data

(63) Continuation of application No. PCT/JP2023/005483, filed on Feb. 16, 2023.

(30) Foreign Application Priority Data

Mar. 17, 2022    (JP) ................................. 2022-043026

(51) Int. Cl.
*A63F 13/533*        (2014.01)
*A63F 13/69*         (2014.01)
*A63F 13/825*        (2014.01)

(52) U.S. Cl.
CPC ............ *A63F 13/533* (2014.09); *A63F 13/69* (2014.09); *A63F 13/825* (2014.09)

(58) Field of Classification Search
None
See application file for complete search history.

(56) References Cited

U.S. PATENT DOCUMENTS

| | | | | |
|---|---|---|---|---|
| 8,585,508 B1 * | 11/2013 | Takagi | .................... | A63F 13/45 463/43 |
| 2014/0194178 A1 * | 7/2014 | Kawada | .............. | G07F 17/3225 463/31 |
| 2015/0018097 A1 * | 1/2015 | Yokoo | ..................... | A63F 13/58 463/31 |
| 2015/0148126 A1 * | 5/2015 | Kobayashi | .............. | A63F 13/75 463/31 |

FOREIGN PATENT DOCUMENTS

JP          6563579 B1      8/2019

* cited by examiner

*Primary Examiner* — Jason T Yen
(74) *Attorney, Agent, or Firm* — Osha Bergman Watanabe & Burton LLP

(57) ABSTRACT

A non-transitory computer readable medium stores a program causing a computer to execute: a process for allowing a player to select any of a plurality of predetermined commands; a process for allowing the player to select any of a plurality of specific commands based on a game medium associated with a plurality of character IDs, each of the plurality of specific commands being associated with one of the plurality of character IDs; a process for updating a parameter of a raising target character based on the predetermined command or the specific command selected by the player; and a process for causing an event to occur when the specific command is selected, the event involving displaying a character corresponding to a character ID associated with the selected specific command.

5 Claims, 53 Drawing Sheets

| CHARACTER TYPE | ATTRIBUTE PARAMETER (INITIAL VALUE) | | | | |
|---|---|---|---|---|---|
| | SPEED | STAMINA | POWER | SPIRIT | WISDOM |
| A | 90 | 65 | 60 | 102 | 105 |
| B | 102 | 63 | 73 | 105 | 100 |
| C | 92 | 98 | 109 | 100 | 101 |
| D | 80 | 72 | 110 | 112 | 64 |
| E | 100 | 102 | 62 | 65 | 71 |

FIG.6A

| CHARACTER TYPE | APTITUDE PARAMETER (INITIAL VALUE) | | | | | | | | | |
|---|---|---|---|---|---|---|---|---|---|---|
| | RACETRACK APTITUDE | | DISTANCE APTITUDE | | | | RUNNING-STYLE APTITUDE | | | |
| | TURF | DIRT | SHORT | MILE | MID | LONG | PACE-MAKER | FRONT-RUNNER | STALKER | CLOSER |
| A | A | G | G | E | A | A | C | A | A | D |
| B | A | F | A | B | D | E | A | A | F | F |
| C | A | F | E | A | A | C | C | A | A | A |
| D | E | A | A | B | C | C | G | F | A | D |
| E | A | B | B | A | A | B | B | A | A | E |

FIG.6B

| CHARACTER TYPE | ACQUIRED SKILL AND POSSESSED SKILL | | | | | | | | | | |
|---|---|---|---|---|---|---|---|---|---|---|---|
| | a | b | c | d | e | f | g | h | i | j | k |
| A | | | | | | ○ | ○ | ◎ | | ○ | |
| B | | | ○ | ◎ | ○ | | ○ | | ○ | | |
| C | ◎ | ○ | ○ | ○ | ○ | ○ | ○ | ○ | | | |
| D | | | | | ◎ | ○ | ○ | ○ | | ○ | |
| E | | | | | | ◎ | | | ○ | | ○ |

FIG.6C

| CHARACTER TYPE | OWNED CHARACTER EVENT | | | | | | | | | | |
|---|---|---|---|---|---|---|---|---|---|---|---|
| | a | b | c | d | e | f | g | h | i | j | k |
| A | | | | | | ○ | | ○ | | ○ | |
| B | | | ○ | | | | ○ | | | | |
| C | | | | | ○ | | | | | | |
| D | | | | | | ○ | | ○ | | ○ | |
| E | | | | | | | | | | | ○ |

FIG.6D

| | FACTOR TYPE | EFFECT | ACTIVATION TIMING |
|---|---|---|---|
| FACTOR INFORMATION | BASIC ATTRIBUTE FACTOR | ATTRIBUTE PARAMETER INCREASE | FACTOR ACTIVATION TURN |
| | APTITUDE FACTOR | APTITUDE PARAMETER INCREASE | FACTOR ACTIVATION TURN |
| | RACE FACTOR | ATTRIBUTE PARAMETER INCREASE | FACTOR ACTIVATION TURN |
| | CHARACTER FACTOR | SKILL HINT ACQUISITION | FACTOR ACTIVATION TURN |
| | SKILL FACTOR | SKILL HINT ACQUISITION | FACTOR ACTIVATION TURN |

FIG.9

| DETERMI-NATION TARGET | PRESENT GENERA-TION | FIRST INHERITANCE GROUP | | | SECOND INHERITANCE GROUP | | |
|---|---|---|---|---|---|---|---|
| | | FIRST INHERITANCE GENERATION | SECOND INHERITANCE GENERATION A | SECOND INHERITANCE GENERATION B | FIRST INHERITANCE GENERATION | SECOND INHERITANCE GENERATION A | SECOND INHERITANCE GENERATION B |
| No.1 | ◯ | ◯ | | | | | |
| No.2 | ◯ | | | | ◯ | | |
| No.3 | | ◯ | | | ◯ | | |
| No.4 | ◯ | ◯ | ◯ | | | | |
| No.5 | ◯ | ◯ | | ◯ | | | |
| No.6 | ◯ | | | | ◯ | ◯ | |
| No.7 | ◯ | | | | ◯ | | ◯ |

FIG.10A

| DETERMI-NATION ITEM | CONTENTS | COMPATIBILITY EXPECTATION VALUE |
|---|---|---|
| No.1 | STUDENT IN SAME GRADE | ＋2 |
| No.2 | COLLEAGUE | ＋2 |
| No.3 | GOOD FRIEND | ＋2 |
| No.4 | SPECIALTY RUNNING STYLE | ＋7 |
| No.5 | DISTANCE APTITUDE | ＋7 |
| No.6 | RACETRACK APTITUDE | ＋7 |

FIG.10B

| SORTING CONDITIONS | |
|---|---|
| SCORE | FACTOR |
| NUMBER OF SKILLS | NAME |
| RACETRACK APTITUDE | REGISTRATION DATE |
| RUNNING-STYLE APTITUDE | COMPATIBILITY LEVEL |
| DISTANCE APTITUDE | MEMO |

FIG.11A

| FILTERING CONDITIONS | | |
|---|---|---|
| BASIC ATTRIBUTE FACTOR | FACTOR LEVEL | PRESENCE OR ABSENCE OF INHERITANCE SOURCE |
| APTITUDE FACTOR | FACTOR LEVEL | PRESENCE OR ABSENCE OF INHERITANCE SOURCE |
| COMPATIBILITY LEVEL | ◎  ○  △ | |

FIG.11B

| TYPE OF SUPPORT CARD | SUPPORT CHARACTER (CHARACTER ID) | RARITY | LEVEL | SPECIALTY TRAINING |
|---|---|---|---|---|
| A1 | A | SSR | 50 | SPEED |
| A2 | A | SR | 45 | STAMINA |
| A3 | A | R | 40 | WISDOM |
| B1 | B | SR | 1 | POWER |
| G | A,C,E,H,K | SSR | 50 | — |

FIG.17A

| TYPE OF SUPPORT CARD | SUPPORT EFFECT | | | | | | |
|---|---|---|---|---|---|---|---|
| | TARGET a | TARGET b | TARGET c | TARGET d | TARGET e | TARGET f | TARGET g |
| A1 | +60% | | +40% | | +30% | +2pt | |
| A2 | +50% | +40% | | | | | |
| A3 | +40% | | | +25% | | +1pt | |
| B1 | +10% | | | | +5% | | +1pt |
| G | +15% | | | | | | +1pt |

FIG.17B

| TYPE OF SUPPORT CARD | POSSESSED SKILL | | | | | | | | | | |
|---|---|---|---|---|---|---|---|---|---|---|---|
| | a | b | c | d | e | f | g | h | i | j | k |
| A1 | | | ○ | | | ○ | ○ | | | ○ | ○ |
| A2 | | | ○ | | | ○ | | | ○ | | |
| A3 | | | | ○ | | | ○ | | | | |
| B1 | | | | ○ | ○ | | | | | ○ | ○ |
| G | | | | | | | | | ○ | | |

FIG.17C

| TYPE OF SUPPORT CARD | SUPPORT EVENT | | | | | | | | | | |
|---|---|---|---|---|---|---|---|---|---|---|---|
| | a | b | c | d | e | f | g | h | i | j | k |
| A1 | | | ○ | | | | ○ | | | ○ | ○ |
| A2 | | | | ○ | | ○ | ○ | | | | |
| A3 | | | | | ○ | | | | | | |
| B1 | | ○ | | | ○ | ○ | | | | | |
| G | | | | | | | | | ○ | | |

FIG.17D

| TURN NUMBER | SELECTION ITEM | | | | | ACQUISITION OF SKILL. USE IN SHOP, USAGE OF ITEM. |
| --- | --- | --- | --- | --- | --- | --- |
| | Rest | Training | Going Out | Race | Special Race | |
| 1ST TURN | ○ | ○ | ○ | ✕ | ✕ | |
| 2ND TURN | ○ | ○ | ○ | ✕ | ✕ | |
| 3RD TURN | ○ | ○ | ○ | ✕ | ✕ | |
| 4TH TURN | ○ | ○ | ○ | ✕ | ✕ | |
| 5TH TURN | ○ | ○ | ○ | ✕ | ✕ | |
| 6TH TURN | ○ | ○ | ○ | ✕ | ✕ | |
| 7TH TURN | ○ | ○ | ○ | ✕ | ✕ | |
| 8TH TURN | ○ | ○ | ○ | ✕ | ✕ | |
| 9TH TURN | ○ | ○ | ○ | ✕ | ✕ | |
| 10TH TURN | ○ | ○ | ○ | ✕ | ✕ | |
| 11TH TURN | ○ | ○ | ○ | ✕ | ✕ | |
| 12TH TURN | ○ | ○ | ○ | ✕ | ✕ | |
| 13TH TURN | ○ | ○ | ○ | ○ | ✕ | |
| 14TH TURN | ○ | ○ | ○ | ○ | ✕ | |
| 15TH TURN | ○ | ○ | ○ | ○ | ✕ | |
| 16TH TURN | ○ | ○ | ○ | ○ | ✕ | |
| 17TH TURN | ○ | ○ | ○ | ○ | ✕ | |
| 18TH TURN | ○ | ○ | ○ | ○ | ✕ | |
| 19TH TURN | ○ | ○ | ○ | ○ | ✕ | |
| 20TH TURN | ○ | ○ | ○ | ○ | ✕ | ○ |
| 21TH TURN | ○ | ○ | ○ | ○ | ✕ | |
| 22TH TURN | ○ | ○ | ○ | ○ | ✕ | |
| 23TH TURN | ○ | ○ | ○ | ○ | ✕ | |
| 24TH TURN | ○ | ○ | ○ | ○ | ✕ | |
| 25TH TURN | ○ | ○ | ○ | ○ | ✕ | |
| 26TH TURN | ○ | ○ | ○ | ○ | ✕ | |
| 27TH TURN | ○ | ○ | ○ | ○ | ✕ | |
| 28TH TURN | ○ | ○ | ○ | ○ | ✕ | |
| 29TH TURN | ○ | ○ | ○ | ○ | ✕ | |
| 30TH TURN | ○ | ○ | ○ | ○ | ✕ | |
| 31TH TURN | ○ | ○ | ○ | ○ | ✕ | |
| 32TH TURN | ○ | ○ | ○ | ○ | ✕ | |
| 33TH TURN | ○ | ○ | ○ | ○ | ✕ | |
| ⋮ | ⋮ | ⋮ | ⋮ | ⋮ | ⋮ | |
| 73TH TURN | ○ | ○ | ○ | ✕ | ✕ | |
| 74TH TURN | ✕ | ✕ | ✕ | ✕ | ○ | |
| 75TH TURN | ○ | ○ | ○ | ✕ | ✕ | |
| 76TH TURN | ✕ | ✕ | ✕ | ✕ | ○ | |
| 77TH TURN | ○ | ○ | ○ | ✕ | ✕ | |
| 78TH TURN | ✕ | ✕ | ✕ | ✕ | ○ | |

FIG.19

| NUMBER OF EXECUTIONS | EXECUTION PATTERN | EFFECT (BONUS) | |
|---|---|---|---|
| | | ENDURANCE | CONDITION |
| 1ST TIME | EVENT No.1 | +30 | +1 |
| 2ND TIME | EVENT No.2 | +37 | +1 |
| 3RD TIME | EVENT No.3 | +35 | +2 |
| 4TH TIME | EVENT No.4 | +35 | +2 |
| 5TH TIME | EVENT No.5 | +30 | +1 |
| 6TH TIME ~ | EVENT No.6 | +38 | +2 |

FIG.25

| SELECTED CHARACTER | EVENT | EVENT EMERGENCE CHARACTER | EFFECT (BONUS) | | |
|---|---|---|---|---|---|
| | | | ENDURANCE | CONDITION | SKILL |
| A | EVENT No.11 | A | +30 | +1 | — |
| C | EVENT No.12 | C | +30 | +1 | — |
| E | EVENT No.13 | E | +15 | +2 | — |
| H | EVENT No.14 | H | +30 | +1 | — |
| K | EVENT No.15 | K | +15 | +2 | — |
| ACEHK | EVENT No.16 | ACEHK | +50 | +2 | ◯ |

FIG.28

| CHARACTER IDENTIFICATION INFORMATION | ALLOCATION TO TRAINING ITEM | | | | | |
| --- | --- | --- | --- | --- | --- | --- |
| | ALLOCATE | | | | | NOT ALLOCATE |
| | SPEED | STAMINA | POWER | SPIRIT | WISDOM | |
| SUPPORT CHARACTER | 16% | 16% | 16% | 16% | 16% | 20% |

FIG.32

| NUMBER OF TIMES OF SELECTION | TRAINING LEVEL | | | | |
|---|---|---|---|---|---|
| | SPEED | STAMINA | POWER | SPIRIT | WISDOM |
| ~3 | Lv.1 | Lv.1 | Lv.1 | Lv.1 | Lv.1 |
| 4~7 | Lv.2 | Lv.2 | Lv.2 | Lv.2 | Lv.2 |
| 8~11 | Lv.3 | Lv.3 | Lv.3 | Lv.3 | Lv.3 |
| 12~15 | Lv.4 | Lv.4 | Lv.4 | Lv.4 | Lv.4 |
| 16~ | Lv.5 | Lv.5 | Lv.5 | Lv.5 | Lv.5 |

FIG.33A

| TRAINING LEVEL | FIXED INCREASE VALUE (SPEED) | | | | |
|---|---|---|---|---|---|
| | SPEED | STAMINA | POWER | SPIRIT | WISDOM |
| Lv.1 | 8 | 0 | 6 | 0 | 0 |
| Lv.2 | 10 | 0 | 8 | 0 | 0 |
| Lv.3 | 12 | 0 | 10 | 0 | 0 |
| Lv.4 | 14 | 0 | 12 | 0 | 0 |
| Lv.5 | 20 | 0 | 18 | 0 | 0 |

FIG.33B

| TRAINING LEVEL | FIXED INCREASE VALUE (POWER) | | | | |
|---|---|---|---|---|---|
| | SPEED | STAMINA | POWER | SPIRIT | WISDOM |
| Lv.1 | 0 | 6 | 8 | 0 | 0 |
| Lv.2 | 0 | 8 | 10 | 0 | 0 |
| Lv.3 | 0 | 10 | 12 | 0 | 0 |
| Lv.4 | 0 | 12 | 14 | 0 | 0 |
| Lv.5 | 0 | 18 | 20 | 0 | 0 |

FIG.33C

| TYPE OF SUPPORT CARD | OCCURRENCE OF FRIENDSHIP TRAINING | BONUS ADDITION RATE |
|---|---|---|
| GROUP | YES | 10%UP |
| | NO | NONE |
| OTHERS | YES | 20%UP |
| | NO | NONE |

FIG.33D

| TYPE OF EVENT | OCCURRENCE OF EVENT | | | | |
| --- | --- | --- | --- | --- | --- |
| | OCCUR | | | | NOT OCCUR |
| | EVENT A | EVENT B | EVENT C | EVENT D | |
| SECOND EVENT | 5% | 5% | 5% | 5% | 80% |

FIG.34

| CLASSIFICATION OF EVENT ASSOCIATED WITH GROUP SUPPORT CARD | OCCURRENCE CONDITION | | EFFECT |
|---|---|---|---|
| FIRST EVENT | ·SELECTED BY LOTTERY | | INCREASE OF PARAMETER |
| INITIAL EVENT | 1 | ·INITIAL EVENT HAS NOT OCCURRED. ·EXECUTE TRAINING TO WHICH GROUP SUPPORT CARD IS ALLOCATED. | CONTINUOUS EVENT CAN OCCUR |
| | 2 | ·INITIAL EVENT HAS NOT OCCURRED. ·SELECTED BY INITIAL EVENT LOTTERY (0.1%). | |
| CONTINUOUS EVENT | ·INITIAL EVENT HAS OCCURRED. ·SELECTED BY CONTINUOUS EVENT LOTTERY (5%,10%,15%). | | OUTING MODE IS SETTABLE |
| OUTING EVENT | 1 | ·OUTING MODE. ·SELECT CHARACTER TO GO OUT WITH. | ENDURANCE INCREASED. CONDITION INCREASED. |
| | 2 | ·ALL AFFILIATED CHARACTERS HAVE BEEN SELECTED. | ENDURANCE INCREASED. CONDITION INCREASED. SKILL ACQUIRED. |
| SECOND EVENT | ·CONTINUOUS EVENT HAS OCCURRED. ·EXECUTE TRAINING TO WHICH GROUP SUPPORT CARD IS ALLOCATED. ·SELECTED BY OCCURRENCE LOTTERY (40%). | | INCREASE OF PARAMETER |

FIG.35

| VARIOUS CONDITIONS | EFFECT |
|---|---|
| •OUTING MODE.<br>•EXECUTE TRAINING TO WHICH GROUP SUPPORT CARD IS ALLOCATED.<br>•SELECTED BY BONUS-ZONE OCCURRENCE LOTTERY (10%). | •START OF BONUS ZONE.<br>•POOR CONDITION RESOLVED. |
| •BONUS ZONE. | •NON-POOR CONDITION.<br>•INCREASED EFFECT OF SECOND EVENT. |
| •BONUS ZONE.<br>•EXECUTE TRAINING TO WHICH GROUP SUPPORT CARD IS ALLOCATED. | •OCCURRENCE OF FRIENDSHIP TRAINING.<br>•EXECUTION OF BONUS ENTERTAINMENT. |
| •SELECTED BY RELEASE LOTTERY ON 2ND TURN TO 4TH TURN AFTER OCCURRENCE OF BONUS ZONE (50%)<br>or<br>•5 TURNS HAVE LAPSED AFTER OCCURRENCE OF BONUS ZONE. | •END OF BONUS ZONE. |

FIG.36

| CHARACTER IDENTIFICATION INFORMATION | DIFFICULTY LEVEL | ALLOCATION | |
|---|---|---|---|
| | | ALLOCATE | NOT ALLOCATE |
| RIVAL CHARACTER | GI | 60% | 40% |
| | GII | 50% | 50% |
| | GIII | 40% | 60% |

FIG.38

NON-TRANSITORY COMPUTER READABLE MEDIUM, INFORMATION PROCESSING METHOD, AND GAMING DEVICE

CROSS REFERENCE TO RELATED APPLICATIONS

This application is a continuation application of International Application No. PCT/JP2023/005483, filed on Feb. 16, 2023, which claims priority to Japanese Patent Application No. 2022-043026, filed on Mar. 17, 2022, the entire contents of which are incorporated by reference herein.

BACKGROUND ART

Technical Field

The present invention relates to information processing programs, information processing methods, and gaming devices.

In the related art, for example, as indicated in Patent Literature 1, games in the so-called genre of raising games are known. A raising game is provided with multiple types of raising items. By selecting any of the raising items, a player can raise a target character to be raised.

Furthermore, in the raising game disclosed in Patent Literature 1, the player can organize support cards in a deck. Each support card is associated with one character as a support character. When a predetermined condition is satisfied during the raising game, an event where the support character appears occurs.

CITATION LIST

Patent Literature

Patent Literature 1: JP 6563579 B

SUMMARY OF INVENTION

Technical Problem

In the aforementioned raising game, the options for the player tend to be limited when organizing the deck. As a result, even when the game is repeatedly played, there is no significant difference in the game outcome. This is problematic in that the motivation for playing the game decreases.

An object of the present invention is to provide an information processing program, an information processing method, and a gaming device that can diversify the game outcome and can enhance the player's motivation for playing the game.

Solution to Problem

In order to solve the aforementioned problem, an information processing program causes a computer to execute:
a process for allowing a player to select any of a plurality of predetermined commands;
a process for allowing the player to select any of a plurality of specific commands associated with one of a plurality of pieces of character identification information based on a game medium associated with the plurality of pieces of character identification information;

a process for updating a parameter of a raising target character based on the predetermined command or the specific command selected by the player; and
a process for causing an event to occur when the specific command is selected, the event involving displaying a character corresponding to the character identification information associated with the selected specific command.

The information processing program may further cause the computer to execute a process for allowing the player to select a special command different from the predetermined command and the specific command when a specific condition is satisfied, the specific condition defining at least either of the number of times the specific command is selected and a type of the selected specific command.

The information processing program may further cause the computer to execute a process for causing a special event to occur when the special command is selected, the special event involving displaying two or more characters corresponding to any of the plurality of pieces of character identification information associated with the game medium.

In order to solve the aforementioned problem, an information processing method is executed by at least one computer. The computer executes:
a process for allowing a player to select any of a plurality of predetermined commands;
a process for allowing the player to select any of a plurality of specific commands associated with one of a plurality of pieces of character identification information based on a game medium associated with the plurality of pieces of character identification information;
a process for updating a parameter of a raising target character based on the predetermined command or the specific command selected by the player; and a process for causing an event to occur when the specific command is selected, the event involving displaying a character corresponding to the character identification information associated with the selected specific command.

In order to solve the aforementioned problem, a gaming device causes at least one computer to execute:
a process for allowing a player to select any of a plurality of predetermined commands;
a process for allowing the player to select any of a plurality of specific commands associated with one of a plurality of pieces of character identification information based on a game medium associated with the plurality of pieces of character identification information;
a process for updating a parameter of a raising target character based on the predetermined command or the specific command selected by the player; and
a process for causing an event to occur when the specific command is selected, the event involving displaying a character corresponding to the character identification information associated with the selected specific command.

Effects of Disclosure

The present invention can diversify the game outcome and can enhance the player's motivation for playing the game.

BRIEF DESCRIPTION OF DRAWINGS

FIG. 6A illustrates an attribute parameter (initial value) table, FIG. 6B illustrates an aptitude parameter (initial value) table, FIG. 6C illustrates a skill table, and FIG. 6D illustrates an owned-character event table.

FIG. 9 illustrates factor information.

FIG. 10A illustrates compatibility determination targets, and FIG. 10B illustrates compatibility determination items.

FIG. 11A illustrates sorting conditions, and FIG. 11B illustrates filtering conditions.

FIG. 17A illustrates a support card table, FIG. 17B illustrates a support effect table, FIG. 17C illustrates a possessed skill table, and FIG. 17D illustrates a support event table.

FIG. 19 illustrates a selection item table.

FIG. 25 illustrates execution patterns of a friend outing event.

FIG. 28 illustrates execution patterns of individual-affiliated-character events and an all-affiliated-character event.

FIG. 32 illustrates an allocation table.

FIG. 33A illustrates a training level table, FIG. 33B illustrates a fixed-increase-value (speed) table, FIG. 33C illustrates a fixed-increase-value (power) table, and FIG. 33D illustrates a bonus addition rate.

FIG. 34 illustrates a second event table.

FIG. 35 illustrates events associated with a group support card.

FIG. 36 illustrates a bonus zone.

FIG. 38 illustrates an allocation table.

DESCRIPTION OF EMBODIMENTS

Figure 1:
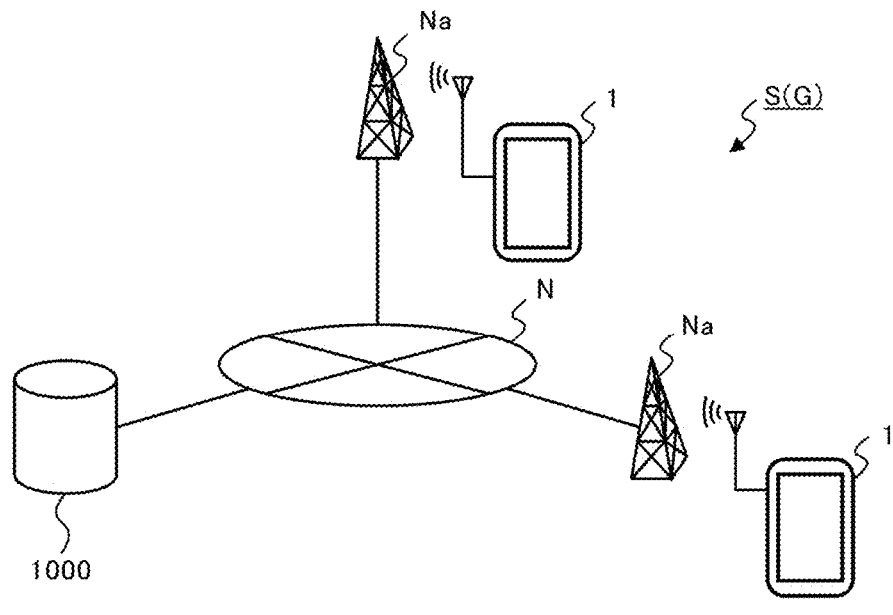
FIG. 1 schematically illustrates the configuration of an information processing system.

An embodiment of the present invention will be described in detail below with reference to the appended drawings.

Numerical values and the like indicated in the following embodiment are merely examples for facilitating the understanding thereof and are not intended to limit the present invention, unless otherwise specified. In the description and the drawings, elements having substantially identical functions and configurations are given the same reference signs to omit redundant descriptions, and elements not directly related to the present invention are not shown in the drawings.

[Overall Configuration of Information Processing System S]

FIG. 1 schematically illustrates the configuration of an information processing system S. The information processing system S is a so-called client server system including a player terminal 1 functioning as a client, that is, a gaming terminal, a server 1000, and a communication network N having a communication base station Na.

In the information processing system S according to this embodiment, the player terminal 1 and the server 1000 function as a gaming device G. The player terminal 1 and the server 1000 are given respective roles for controlling the progress of a game. The player terminal 1 and the server 1000 operate in cooperation with each other to allow the game to proceed.

The player terminal 1 can establish communication with the server 1000 via the communication network N. The player terminal 1 includes a wide range of electronic units communicatively connectable to the server 1000 in a wireless or wired manner. Examples of the player terminal 1 include a smartphone, a mobile phone, a tablet device, a personal computer, and a gaming unit. In this embodiment, the player terminal 1 is described as being a smartphone.

The server 1000 is communicatively connected to multiple player terminals 1. The server 1000 accumulates various types of information for each player playing the game. Based on an operation input from each player terminal 1, the server 1000 mainly executes a process involving updating accumulated information and downloading an image and various types of information to the player terminal 1.

The communication base station Na is connected to the communication network N and wirelessly exchanges information with each player terminal 1. The communication network N is constituted of, for example, a mobile phone network, the Internet, a LAN (local area network), or a dedicated line, and realizes a wireless or wired communicative connection between each player terminal 1 and the server 1000.

[Hardware Configuration of Player Terminal 1 and Server 1000]

Figure 2A:
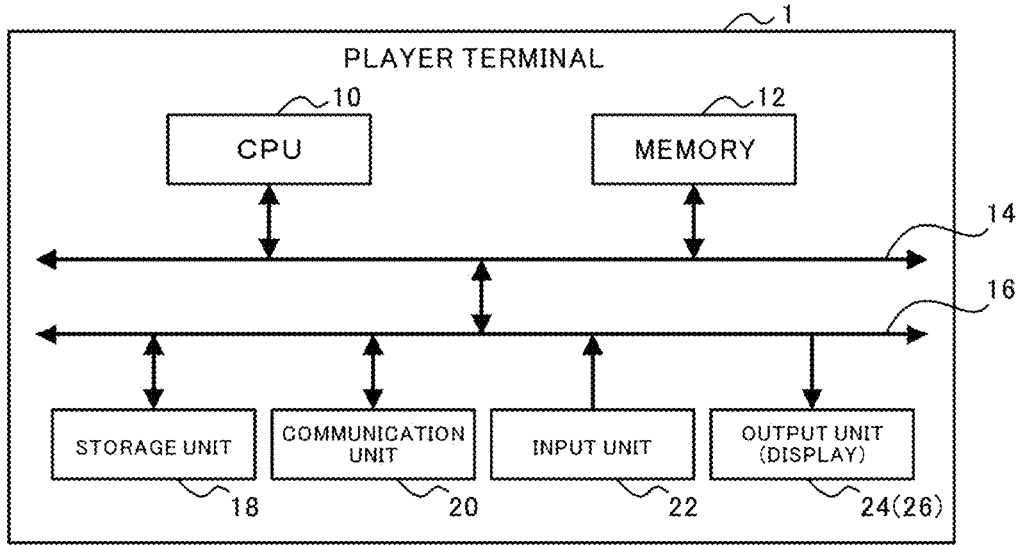
FIG. 2A illustrates the hardware configuration of a player terminal.
Figure 2B:
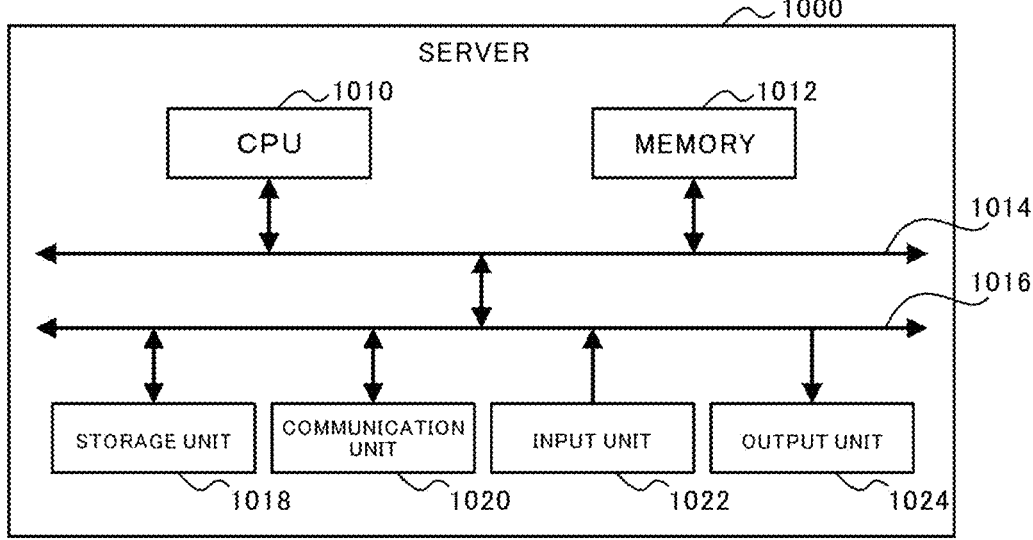
FIG. 2B illustrates the hardware configuration of a server.

FIG. 2A illustrates the hardware configuration of each player terminal 1. FIG. 2B illustrates the hardware configuration of the server 1000. As shown in FIG. 2A, the player terminal 1 includes a CPU (central processing unit) 10, a memory 12, a bus 14, an input-output interface 16, a storage unit 18, a communication unit 20, an input unit 22, and an output unit 24.

As shown in FIG. 2B, the server 1000 includes a CPU 1010, a memory 1012, a bus 1014, an input-output interface 1016, a storage unit 1018, a communication unit 1020, an input unit 1022, and an output unit 1024.

The configurations and functions of the CPU 1010, the memory 1012, the bus 1014, the input-output interface 1016, the storage unit 1018, the communication unit 1020, the input unit 1022, and the output unit 1024 of the server 1000 are substantially identical to those of the CPU 10, the memory 12, the bus 14, the input-output interface 16, the storage unit 18, the communication unit 20, the input unit 22, and the output unit 24 of the player terminal 1, respectively. Therefore, the hardware configuration of the player terminal 1 will be described below, whereas the description of the server 1000 will be omitted.

The CPU 10 activates a program stored in the memory 12 and controls the progress of the game. The memory 12 is constituted of a ROM (read only memory) or a RAM (random access memory) and stores a program and various types of data required for controlling the progress of the game. The memory 12 is connected to the CPU 10 via the bus 14.

The input-output interface 16 is connected to the bus 14. The storage unit 18, the communication unit 20, the input unit 22, and the output unit 24 are connected to the input-output interface 16.

The storage unit 18 is constituted of a semiconductor memory, such as a DRAM (dynamic random access memory), and stores various types of programs and data. In the player terminal 1, the programs and data stored in the storage unit 18 are loaded into the memory 12 (RAM) by the CPU 10.

The communication unit 20 is communicatively connected to the communication base station Na in a wireless manner and exchanges information, such as various types of data and programs, with the server 1000 via the communication network N. In the player terminal 1, for example, a program received from the server 1000 is stored in the memory 12 or the storage unit 18.

The input unit 22 is constituted of, for example, a touchscreen, a button, a keyboard, a mouse, a directional pad, and/or an analog controller via which player operations are input (operations are received). Alternatively, the input unit 22 may be a dedicated controller provided in the player terminal 1 or connected (externally) to the player terminal 1. As another alternative, the input unit 22 may be constituted of an acceleration sensor that detects tilting and motion of the player terminal 1 or a microphone that detects the voice of the player. In other words, the input unit 22 widely includes devices capable of receiving the input of player's intention in an identifiable manner.

The output unit 24 includes a display device and a loudspeaker. The output unit 24 may be connected (externally) to the player terminal 1. In this embodiment, the player terminal 1 includes a display 26 as the output unit 24 and a touchscreen, as the input unit 22, superposed on the display 26.

[Details of Game]

Next, the game provided by the information processing system S and the gaming device G according to this embodiment will be described. A player can own a character obtained by lottery called "gacha" or a character distributed from the administrator side. The player can also own a support card obtained by lottery or a support card distributed from the administrator side.

As will be described in detail later, in the game according to this embodiment, a raising game is provided. In the raising game, the player can raise a character that the player owns. Furthermore, the raising game according to this embodiment has gameplay involving raising the character while allowing the character to participate in a race that mimics a horse race.

Figures 3A, 3B, 3C, 3D:
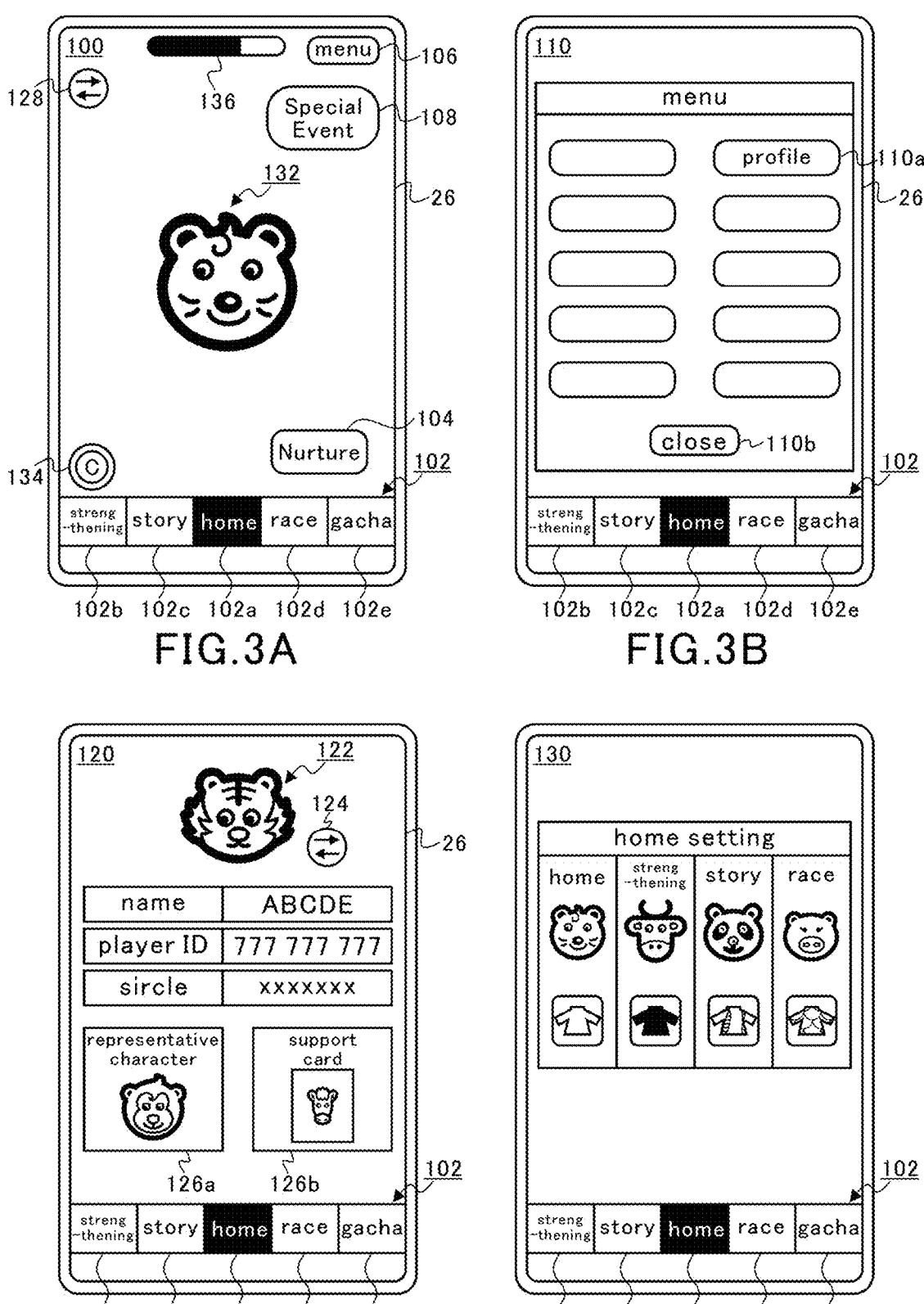
FIG. 3A illustrates an example of a home screen.
FIG. 3B illustrates an example of an option setting screen.
FIG. 3C illustrates an example of a profile setting screen.
FIG. 3D illustrates an example of a home setting screen.

FIG. 3A illustrates an example of a home screen 100. When a game application is activated in the player terminal 1, the home screen 100 is displayed on the display 26. The lower part of the home screen 100 displays a menu bar 102. The menu bar 102 is provided with a plurality of operation sections that can be operated (tapped) by the player.

In this case, the menu bar 102 is provided with a home-screen selection operation section 102*a*, an enhancement-screen selection operation section 102*b*, a story-screen selection operation section 102*c*, a race-game selection operation section 102*d*, and a gacha-screen selection operation section 102*e*. On the menu bar 102, the operation section corresponding to the screen being displayed on the display 26 is highlighted so that the screen being displayed can be identified.

When the home-screen selection operation section 102*a* is tapped, the home screen 100 shown in FIG. 3A is displayed on the display 26.

When the enhancement-screen selection operation section 102*b* is tapped, an enhancement screen (not shown) is displayed. On the enhancement screen, a character or a support card owned by the player can be enhanced. By enhancing the character or the support card, the player can increase the set level of the character or the support card. The character and the support card have various parameters set therefor, and each parameter increases with increasing level. By increasing the parameters of the character and the support card, the player can raise the character having a higher status in the raising game.

When the story-screen selection operation section 102*c* is tapped, a story screen (not shown) is displayed. A story image is provided for each character appearing in the game. On the story screen, the player can select and view the character and the story image.

When the race-game selection operation section 102*d* is tapped, a race-game selection screen (not shown) is displayed. This embodiment provides various race games in which a raised character raised in the raising game, to be described later, is allowed to participate. On the race-game selection screen, the player can select a race game that the raised character is to participate in. One race game is a team competition game involving competition between a team consisting of multiple raised characters and another player's team selected by a computer. The team competition game has gameplay involving competing with another player for rankings.

When the gacha-screen selection operation section 102*e* is tapped, a gacha screen (not shown) is displayed. On the gacha screen, the player can consume an in-game currency to perform a so-called gacha lottery that involves obtaining a character or a support card by lottery.

The home screen 100 is also provided with a raising-game operation section 104 above the menu bar 102. When the raising-game operation section 104 is tapped, a raising game screen is displayed, and the raising game, to be described later, starts. The raising game is roughly divided into a preparation stage and a raising stage. First, in the preparation stage, the player selects a single character from characters that the player owns, so as to set the selected character as a raising target character.

Furthermore, in the preparation stage, the player sets a deck to be used when raising the raising target character. The deck includes multiple inheritance characters, to be described in detail later, and multiple support cards. Therefore, in the raising game, the inheritance characters and the support cards included in the deck are used.

When the raising target character and the deck (inheritance characters and support cards) are completely set, the preparation stage transitions to the raising stage, and the game for raising the raising target character starts. In the raising game, the parameters of the raising target character can be changed. The raising target character completely raised in the raising game becomes a raised character. The player can own multiple raised characters. As mentioned above, the player can include a raised character that the player owns in a team and use the raised character in, for example, a team competition game.

Accordingly, the main objective of the game according to this embodiment is to create a raised character in accordance with the raising game and to move up the rankings in the team competition game by using the raised character.

This embodiment is provided with a function for sharing a raised character or a support card between players and a function for sharing information between multiple players. The player can set a raised character and a support card that are usable by another player in the raising game. In detail, as shown in FIG. 3A, a setting operation section 106 is provided at the upper right part of the home screen 100. When the setting operation section 106 is tapped, an option setting screen 110 is displayed.

FIG. 3B illustrates an example of the option setting screen 110. The option setting screen 110 can be used for checking and setting various types of information. The option setting screen 110 is provided with a plurality of operation sections. When any of the operation sections is tapped, information corresponding to the operation section can be checked and set.

The operation sections on the option setting screen 110 include a profile-setting operation section 110*a* and a close operation section 110*b*. When the close operation section 110*b* is tapped, the option setting screen 110 is closed, and the home screen 100 is displayed. When the profile-setting operation section 110*a* is tapped, a profile setting screen 120 is displayed.

FIG. 3C illustrates an example of the profile setting screen 120. The player can check and set profile information of the player on the profile setting screen 120. The profile information includes a profile character, a player name, a player ID, an affiliated club, a representative character, and a rental card.

The profile character functions as a character to be displayed when information about the player is browsed by another player. For example, the profile character is displayed when a club function serving as a place where information is shared with another player is being used. The profile setting screen 120 displays a currently-set profile character image 122. A change button 124 is provided near the profile character image 122. When the change button 124 is tapped, a profile-character change screen (not shown) is displayed. The player can change the profile character on the profile-character change screen.

The profile setting screen 120 also displays the player name set by the player, the player ID given to the player, and the name of the club to which the player belongs. Furthermore, the profile setting screen 120 is provided with a representative-character setting operation section 126*a* and a rental-card setting operation section 126*b*.

When the representative-character setting operation section 126*a* is tapped, a representative-character setting screen (not shown) is displayed. On the representative-character setting screen, the player can set any one of the raised characters raised by the player as a representative character. The representative-character setting operation section 126*a* displays an icon image indicating the currently-set representative character. As will be described in detail later, the representative character can be included as an inheritance character in a deck in a raising game played by another player.

When the rental-card setting operation section 126*b* is tapped, a rental-card setting screen (not shown) is displayed.

On the rental-card setting screen, the player can set any one of the support cards owned by the player as a rental card. The rental-card setting operation section 126b displays an icon image indicating the currently-set rental card. As mentioned above, the support card set as the rental card can be included in a deck by another player and can be used in a raising game played by another player.

Although a detailed description will be omitted, when the setting of the profile information is changed on the profile setting screen 120, the changed setting information is transmitted to the server 1000. The server 1000 stores the profile information for every player.

Furthermore, as shown in FIG. 3A, the home screen 100 displays a setting icon 128. When the setting icon 128 is tapped, a home setting screen 130 is displayed.

FIG. 3D illustrates an example of the home setting screen 130. On the home setting screen 130, the player can set a home-screen setting character 132 to be displayed on the home screen 100. The player can set four home-screen setting characters 132 to be displayed on the home screen 100.

Although not shown in the drawings, when a horizontal flicking operation is input to the home screen 100, the screen displayed on the display 26, that is, the home screen 100, is switched. The home screen 100 displays the four currently-set home-screen setting characters 132. The functions of the respective operation sections displayed on the menu bar 102 are allocated to the home-screen setting characters 132. Therefore, when any of the home-screen setting characters 132 displayed on the home screen 100 is tapped, the screen switches similarly to when the corresponding operation section on the menu bar 102 is tapped.

The home setting screen 130 displays character images respectively corresponding to the four currently-set home-screen setting characters 132 and the corresponding operation sections in a distinguishable manner. When any of the character images displayed on the home setting screen 130 is tapped, a character selection screen (not shown) is displayed. On the character selection screen, the player can select the corresponding home-screen setting character 132. Furthermore, on the home setting screen 130, the player can set a costume for the home-screen setting character 132.

As shown in FIG. 3A, the home screen 100 displays a club icon 134. When the club icon 134 is tapped, a club screen is displayed. On the club screen, the player can exchange information with another player belonging to the same club.

In this embodiment, various limited time events are held irregularly. During the period of a limited time event, a limited time event icon 108 is displayed on the home screen 100. When the limited time event icon 108 is tapped, a limited time event screen (not shown) is displayed. On the limited time event screen, for example, the player can exchange event points offered in a limited time period for various rewards.

When the raising-game operation section 104 is tapped on the home screen 100, a raising game screen is displayed, and the raising game starts. The player can play the raising game by consuming game points. With regard to the game points, a predetermined value (e.g., +1) is given to the player every predetermined period (e.g., 10 minutes). An upper limit value (e.g., 100) is set for the game points that each player can possess, such that each player can possess the game points within the range of the upper limit value. The upper part of the home screen 100 is provided with a game-point display bar 136 that visually displays the percentage of the currently-possessed game points relative to the upper limit value.

With regard to the game points, a predetermined value (e.g., −30) is subtracted therefrom when the raising game starts. Therefore, if the player does not possess the required game points, the player cannot start the raising game. However, if the player possesses an item for restoring the game points, the player can restore the game points by using the item. For example, this item can be given as a reward of the raising game or the team competition game or can be obtained by consuming the in-game currency. The raising game will be described in detail below.

[Raising Game]

Figure 4:
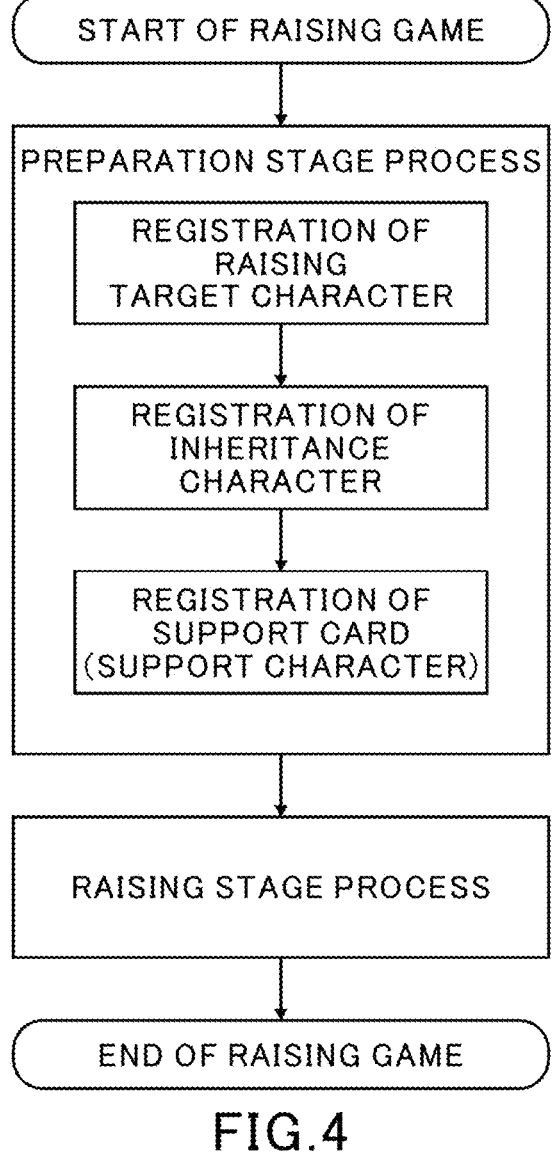
FIG. 4 illustrates the general flow of a raising game.

FIG. 4 illustrates the general flow of the raising game. The raising game is roughly divided into a setting game and a main raising game. As will be described in detail later, the main raising game involves raising one raising target character selected from the characters owned by the player. The setting game involves the player registering the raising target character and the deck (inheritance character and support card), and corresponds to the preparation stage of the raising game. A process executed in the setting game will be referred to as a preparation stage process, and a process executed in the main raising game will be referred to as a raising stage process. In order to facilitate the understanding, the general flow of the preparation stage process and the raising stage process will be described first.

[Preparation Stage Process]

The preparation stage process mainly involves registering a raising target character and registering a deck (inheritance character and support card). A support card is used for assisting with the raising of the raising target character. Each support card is always associated with at least one character, and the character associated with the support card registered in the preparation stage process assists with the raising of the raising target character. A character associated with a support card will be referred to as a support character hereinafter.

[Registration of Raising Target Character]

When the player taps on the raising-game operation section 104 on the home screen 100, a scenario selection screen (not shown) is displayed. In this embodiment, multiple scenarios of the main raising game are provided. Each scenario of the main raising game has, for example, an ultimate target or a mid-game target set therein, and the player needs to sequentially clear the set target. Each target and the period required for achieving the target vary from scenario to scenario. On the scenario selection screen, the player can select any one of the multiple scenarios. The following description relates to a case where a predetermined scenario is selected.

Figures 5A, 5B:
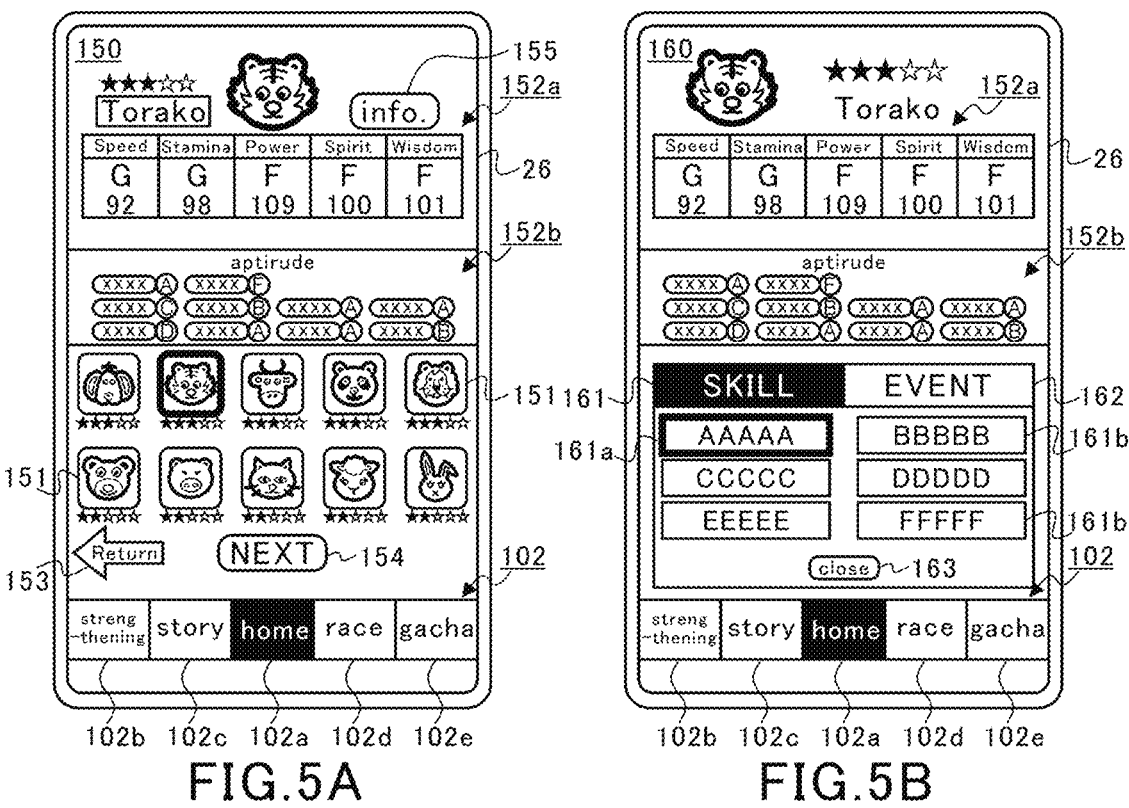
FIG. 5A illustrates a raising-target-character selection screen.
FIG. 5B is a first diagram illustrating a character details screen.

FIG. 5A illustrates a raising-target-character selection screen 150. The central part of the raising-target-character selection screen 150 displays multiple character icons 151 to display a list of characters owned by the player. The upper part of the raising-target-character selection screen 150 displays an attribute-parameter display section 152a and an aptitude-parameter display section 152b. The lower part of the raising-target-character selection screen 150 displays a return operation section 153 indicated as "Return" and a next operation section 154 indicated as "NEXT".

In this embodiment, initial attribute-parameter values are set for each character, and the attribute-parameter display section 152a numerically displays the initial attribute-parameter values of the character corresponding to the character icon 151 selected by the player. In this embodiment, the larger the numerical value of an attribute parameter, the higher the attribute.

FIG. 6A illustrates an attribute parameter (initial value) table. In this embodiment, as shown in FIG. 6A, initial attribute-parameter values are stored for each character in the attribute parameter (initial value) table. Based on the initial attribute-parameter values stored in the attribute parameter (initial value) table, the initial attribute-parameter values are displayed in the attribute-parameter display section 152a.

In this embodiment, an initial attribute-parameter value is set for every one of multiple kinds of attributes of each character. In detail, five kinds of the attribute parameters are provided and include speed, stamina, power, spirit, and wisdom attribute parameters respectively indicated as "Speed", "Stamina", "Power", "Spirit", and "Wisdom" in the attribute-parameter display section 152a.

The initial attribute-parameter values of each character may increase in response to, for example, an operation by the player. For example, five levels may be provided for each character, and the player may increase the level of the character by consuming the in-game currency or a predetermined item. In this case, the initial attribute-parameter values may increase in accordance with the increase in the level of the character. FIG. 6A illustrates an initial value when the character is at a predetermined level. The player can increase an attribute parameter value in the main raising game. Specifically, the objective of the main raising game is to raise a character having higher numerical values of attribute parameters.

Furthermore, in this embodiment, aptitude parameters (initial values) are set for each character. As shown in FIG. 5A, the aptitude-parameter display section 152b alphabetically displays initial aptitude-parameter values of the character corresponding to the character icon 151 selected by the player.

FIG. 6B illustrates an aptitude parameter (initial value) table. In this embodiment, as shown in FIG. 6B, initial aptitude-parameter values are stored for each character in the aptitude parameter (initial value) table. Each initial aptitude-parameter value is set to any of seven levels using the letters A to G. With regard to each initial aptitude-parameter value, A indicates that the aptitude is at the highest level, whereas G indicates that the aptitude is at the lowest level. Based on the initial aptitude-parameter values stored in the aptitude parameter (initial value) table, the initial aptitude-parameter values are displayed in the aptitude-parameter display section 152b.

In this embodiment, an initial aptitude-parameter value is set for every one of multiple kinds of aptitudes of each character. In detail, the aptitude parameters provided include aptitude parameters related to racetrack aptitudes for turf and dirt racetracks, aptitude parameters related to distance aptitudes for short-distance, mile, mid-distance, and long-distance, and aptitude parameters related to running-style aptitudes for pace-maker, front-runner, stalker, and closer.

In the raising game, the player can have the raising target character participate in various races. In this case, the raising target character has a greater advantage in a race as the aptitudes of the raising target character matching the details of the race become higher.

An initial aptitude-parameter value of each character may be increased by consuming the in-game currency. Moreover, an aptitude parameter value may be changed in the main raising game. Furthermore, in the main raising game, an aptitude parameter may be set to an aptitude level of S, which is higher than A.

Figure 5C:
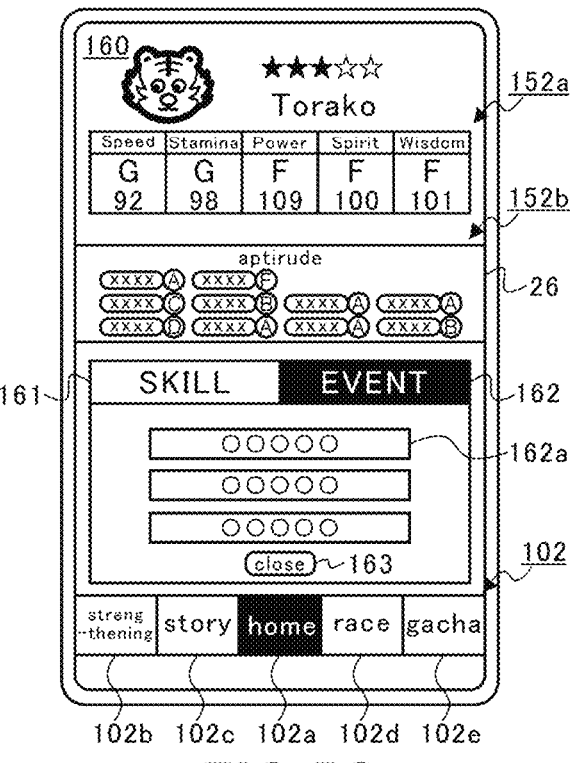
FIG. 5C is a second diagram illustrating the character details screen.

FIG. 5B is a first diagram illustrating a character details screen 160. FIG. 5C is a second diagram illustrating the character details screen 160. When one of the character icons 151 on the raising-target-character selection screen 150 is long-pressed, the character details screen 160 is displayed on the display 26. The character details screen 160 displays the details of the attributes of the character corresponding to the character icon 151 long-pressed on the raising-target-character selection screen 150.

The central part of the character details screen 160 displays a skill operation section 161 and an event operation section 162. As shown in FIG. 5B, when the character details screen 160 is first displayed, the skill operation section 161 is highlighted, and skills set for the respective characters are displayed. A skill is an attribute that may be activated when a predetermined condition is satisfied during an individual race, to be described later. Each character has a greater advantage in a race as a skill is activated.

FIG. 6C illustrates a skill table. As shown in FIG. 6C, the skill table stores skills of each character owned by the player. As shown in FIG. 5B, the skills are displayed on the character details screen 160 based on the skills stored in the skill table. A skill is not activated by simply possessing it, but can be activated only by being acquired. A skill that can be activated by a character will be referred to as "acquired skill" hereinafter.

A character has one acquired skill set from the start of the main raising game. In addition to the acquired skill, a character has multiple possessed skills set therefor. A possessed skill can be acquired by consuming skill points, to be described later, after the start of the main raising game. In other words, a possessed skill may become an acquired skill in exchange for skill points.

In this embodiment, a skill corresponding to a double circle in the skill table shown in FIG. 6C is displayed as an acquired skill on the character details screen 160 in FIG. 5B. A skill corresponding to a single circle in the skill table shown in FIG. 6C is displayed as a possessed skill on the character details screen 160 in FIG. 5B. In this embodiment, an acquired skill is highlighted so that the acquired skill and a possessed skill can be readily distinguished from each other, as indicated on the character details screen 160 in FIG. 5B.

In FIG. 5B, the skills provided for each character include one acquired skill displayed in an acquired-skill display field 161a and seven possessed skills displayed in a possessed-skill display field 161b. However, the embodiment is not limited to this. For example, the number of acquired skills and possessed skills may vary from character to character. Furthermore, for example, the number of acquired skills or possessed skills of each character may increase in accordance with an increase in the level of the character or consumption of the in-game currency or an item.

When the player taps on the event operation section 162 on the character details screen 160, the details of the character details screen 160 change, so that an owned-character-event display field 162a indicating owned character events provided for each character is displayed, as shown in FIG. 5C. In this case, as shown in FIG. 5C, the event operation section 162 is highlighted. An owned character event occurs when a predetermined condition is satisfied in the main raising game, and involves displaying a story related to a character appearing in the raising game or changing an attribute parameter value.

FIG. 6D illustrates an owned-character-event table. As shown in FIG. 6D, the owned-character-event table stores owned character events for each character owned by the player. Based on the owned character events stored in the owned-character-event table, the owned character events are displayed on the character details screen 160, as shown in FIG. 5C. The owned character events may include a hint event that allows for possession or acquisition of a skill and an attribute event for increasing or decreasing a numerical value of an attribute parameter of a character.

Regarding the owned character events displayed on the character details screen 160 shown in FIG. 5C, all of them may be executed during the main raising game, at least some of them may be executed during the main raising game, or none of them may be executed during the main raising game if a predetermined condition is not satisfied. Furthermore, for example, the number of owned character events provided for each character may increase in accordance with an increase in the level of the character or consumption of the in-game currency or an item. Moreover, when the predeter- mined condition is satisfied, an owned character event not displayed as an owned character event may be executed during the main raising game.

As shown in FIG. 5B and FIG. 5C, the lower part of the character details screen 160 displays a close operation section 163 indicated as "close". When the close operation section 163 on the character details screen 160 is tapped, the displaying of the character details screen 160 is terminated, and the raising-target-character selection screen 150 is displayed on the display 26.

When the return operation section 153 is tapped on the raising-target-character selection screen 150 shown in FIG. 5A, the home screen 100 shown in FIG. 3A is displayed on the display 26. The raising-target-character selection screen 150 is provided with a raising-information display button 155. When the raising-information display button 155 is tapped, a raising-information display screen (not shown) is displayed. On the raising-information display screen, the player can check information related to the character selected on the raising-target-character selection screen 150.

The raising-information display screen is provided with a target tab. Although a detailed description will be provided later, the main raising game has multiple turns, and the player needs to have the raising target character train and participate in a race during each turn.

Multiple targets to be cleared are set for each character. When the target tab is tapped, the raising-information display screen displays a list of targets to be cleared that are set for the selected character. Each turn has a preset race in which the raising target character can participate.

When the raising target character to be raised participates in a race, the raising target character can acquire fans, victory points, and special currency. Each race has the base number of acquired fans, the base number of acquired victory points, and the base number of acquired special currency set for every finished place, such that the higher the finished place, the larger the numerical values of acquired fans, acquired victory points, and acquired special currency.

Moreover, each race has a difficulty level set therefor, such that the higher the difficulty level of the race, the larger the number of fans, victory points, and special currency that can be acquired. For example, the races provided include so-called high-stakes races with the grades GI, GII, and GIII. The grades become higher in the following order: GIII, GII, and GI. The difficulty level increases as the grade of the race becomes higher, and a larger number of fans, victory points, and special currency can be acquired.

The number of fans acquirable by participating in a race is calculated by adding the bonus number of acquired fans to the base number of acquired fans set for each finished place. In detail, a correction value is determined based on a race result, and the bonus number of acquired fans is calculated by multiplying the base number of acquired fans by the correction value. The sum of the bonus number of acquired fans and the base number of acquired fans is the number of fans acquired by the raising target character. For example, if the race result indicates first place, the correction value increases with increasing difference between the raising target character and the character in second place. If the race result ranges between second place and fifth place, the correction value increases with decreasing difference between the raising target character and the character in first place.

The raising target character activates skills with a predetermined probability during the race. In this case, the correction value increases with increasing number of activated skills. Accordingly, an addition condition for the number of fans is set for each race, and the number of fans to be acquired increases in accordance with various race results and halfway progress of the race other than the finished places. It should be noted that the number of fans acquired by the raising target character is at least larger than or equal to the base number of acquired fans corresponding to the finished place.

Depending on the race, a certain number of fans may be required as a participation condition. If the number of fans acquired by the raising target character does not satisfy the certain number of fans required as the participation condition, the player cannot have the raising target character participate in the race. The higher the difficulty level of the race, the larger the number of fans required for the participation.

Accordingly, multiple targets to be cleared are set for each character. By achieving the targets to be cleared, the player can continue playing the main raising game until the final turn. In contrast, if the targets to be cleared cannot be achieved, the main raising game ends on the relevant turn.

Accordingly, the player can select the raising target character while checking various information about each character on the raising-target-character selection screen 150 shown in FIG. 5A. Then, when the next operation section 154 is tapped on the raising-target-character selection screen 150, the selected character is set as the raising target character, and an inheritance-character selection screen 170 is displayed on the display 26.

[Registration of Inheritance Character]

Figures 7A, 7B, 7C, 7D:
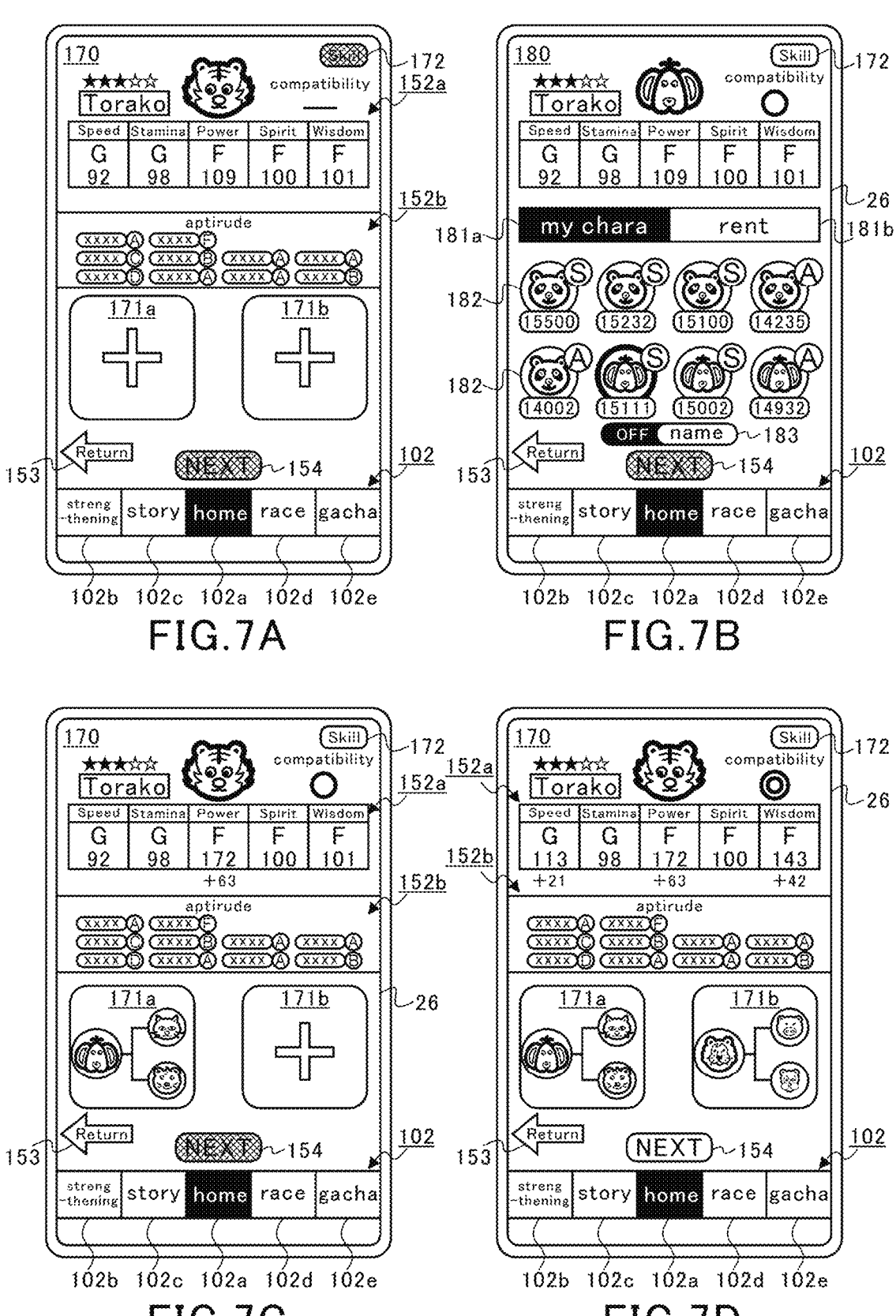
FIG. 7A is a first diagram illustrating an inheritance-character selection screen.
FIG. 7B is a first diagram illustrating a raised-character-list screen.
FIG. 7C is a second diagram illustrating the inheritance-character selection screen.
FIG. 7D is a third diagram illustrating the inheritance-character selection screen.

FIG. 7A is a first diagram illustrating the inheritance-character selection screen 170. FIG. 7B is a first diagram illustrating a raised-character-list screen 180. FIG. 7C is a second diagram illustrating the inheritance-character selection screen 170. FIG. 7D is a third diagram illustrating the inheritance-character selection screen 170. The inheritance-character selection screen 170 is a screen used by the player for registering an inheritance character.

An inheritance character is a character that inherits, for example, attribute values and skills from the raising target character. The player can select two inheritance characters from a raised character owned by the player and a representative character of another player, such as a representative character of a friend, for example, a follower, extracted in accordance with a predetermined extraction condition, so as to form and register a deck. With regard to the representative character of another player, only one representative character can be included at a maximum as an inheritance character in the deck in a single raising game.

The inheritance-character selection screen 170 is provided with the attribute-parameter display section 152a, the aptitude-parameter display section 152b, a first-inheritance-character selection region 171a, and a second-inheritancecharacter selection region 171*b*. When the screen transitions from the raising-target-character selection screen 150 to the inheritance-character selection screen 170, the first-inheritance-character selection region 171*a* and the second-inheritance-character selection region 171*b* are displayed as blank fields, as shown in FIG. 7A.

When the first-inheritance-character selection region 171*a* or the second-inheritance-character selection region 171*b* is tapped, the raised-character-list screen 180 shown in FIG. 7B is displayed. The raised-character-list screen 180 is provided with a my-character tab 181*a* and a rental tab 181*b*. Furthermore, a raised-character-list display region is provided below the my-character tab 181*a* and the rental tab 181*b*. The raised-character-list display region displays raised character icons 182.

In a state where the my-character tab 181*a* is selected, the raised character icons 182 corresponding to the raised characters owned by the player are displayed, as shown in FIG. 7B. Although not shown, in a state where the rental tab 181*b* is selected, raised character icons 182 corresponding to representative characters of a friend, that is, raised characters raised by the friend, are displayed.

When any of the raised character icons 182 is tapped, the raised character corresponding to the raised character icon 182 transitions to a provisionally selected state. Furthermore, when the raised character icon 182 is tapped, the inheritance-character selection screen 170 is displayed, as shown in FIG. 7C. In this case, for example, when the raised-character-list screen 180 is displayed in response to tapping on the first-inheritance-character selection region 171*a*, and the raised character icon 182 is tapped on the raised-character-list screen 180, an image indicating the raised character in the provisionally selected state is displayed in the first-inheritance-character selection region 171*a*.

In this state, for example, when the raised-character-list screen 180 is displayed in response to tapping on the second-inheritance-character selection region 171*b*, and the raised character icon 182 is tapped on the raised-character-list screen 180, the image indicating the raised character in the provisionally selected state is displayed in the second-inheritance-character selection region 171*b*, as shown in FIG. 7D.

A raised character is associated with and has stored therein information related to inheritance characters used during the raising. The first-inheritance-character selection region 171*a* displays the information related to the inheritance characters used during the raising of the raised character.

Figure 8:
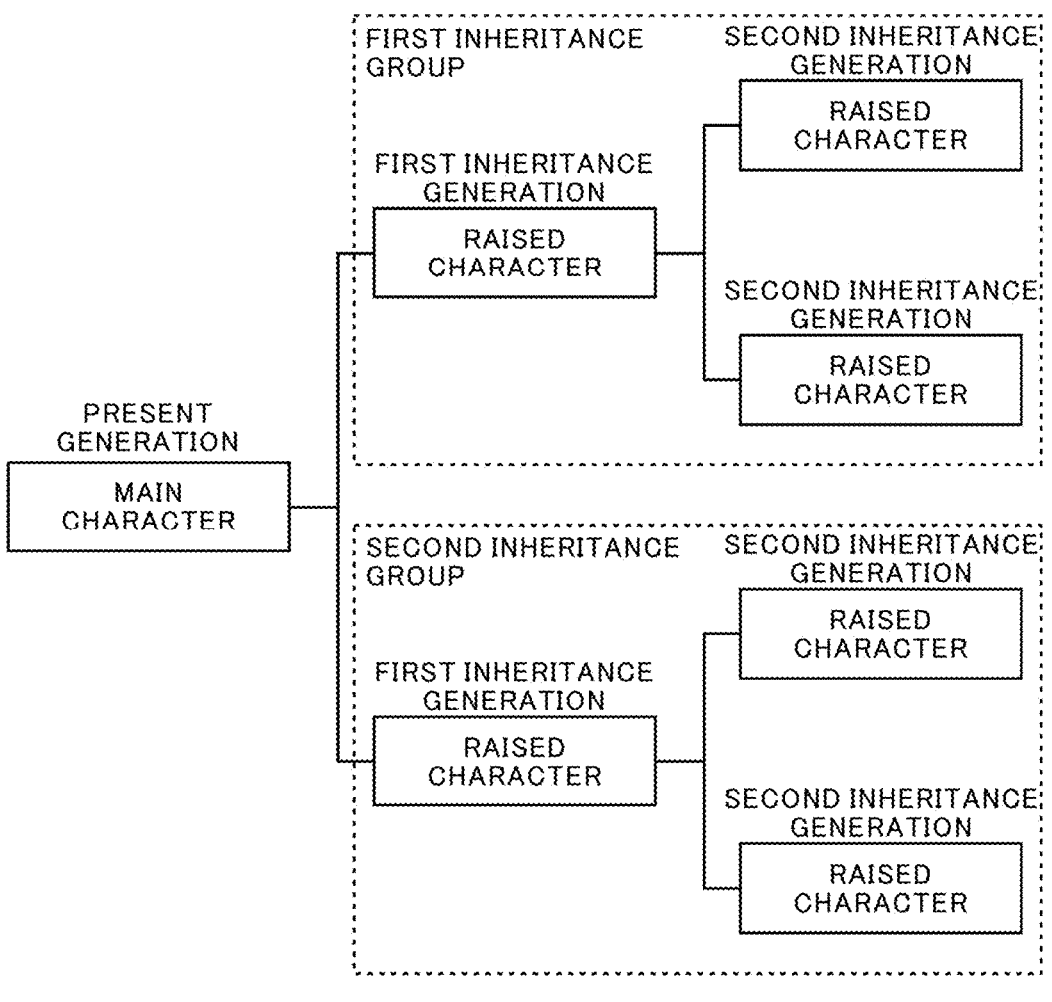
FIG. 8 illustrates an inheritance lineage.

FIG. 8 illustrates an inheritance lineage. The raising game brings about various effects, such as increases in attribute parameter values and aptitude parameter values of the raising target character, based on factor information that the inheritance character has. Although two inheritance characters are set for one raising target character, these inheritance characters are raised characters generated previously. Therefore, even when a raised character set as an inheritance character is generated, two inheritance characters are set for the raised character.

As shown in FIG. 8, the raising target character to be raised in the main raising game to be commenced is defined as the present generation. Two raised characters set as inheritance characters relative to the raising target character of the present generation are defined as the first inheritance generation. Furthermore, with regard to raised characters of the first inheritance generation, two raised characters are set as inheritance characters at the start of the raising. When the raised characters of the first inheritance generation are generated, two raised characters set as inheritance characters are defined as the second inheritance generation.

In this case, raised characters of the first inheritance generation and the second inheritance generation bring about an effect on the raising target character of the present generation, as shown in FIG. 8. As mentioned above, since two inheritance characters (of the first inheritance generation) are set for one raising target character, a total of six raised characters bring about an effect on one raising target character.

For example, one of the two raised characters of the first inheritance generation and two raised characters of the second inheritance generation serving as inheritance characters of the above raised character constitute a first inheritance group. Likewise, the other one of the two raised characters of the first inheritance generation and two raised characters of the second inheritance generation serving as inheritance characters of the above raised character constitute a second inheritance group.

As shown in FIG. 7D, the first-inheritance-character selection region 171*a* indicates icons corresponding to one raised character of the first inheritance generation and two raised characters of the second inheritance generation that constitute the first inheritance group. Likewise, the second-inheritance-character selection region 171*b* indicates icons corresponding to one raised character of the first inheritance generation and two raised characters of the second inheritance generation that constitute the second inheritance group.

FIG. 9 illustrates the factor information. As will be described in detail later, when the raising game is completed, the raising target character to be raised is registered as a raised character, and the raised character has factor information stored in association therewith. In detail, at the time of completion of raising of the raised character, factors to be acquired by the raised character are determined by lottery. Factor information indicating the factors selected by lottery are associated with the raised character. In other words, at the time of completion of the raising game, the raised character can acquire the factors selected by lottery.

However, the factors acquired by the raised character do not affect the attributes of the raised character. For example, the raised character can participate in a race game, such as a team competition game. In this case, the race involves performing a simulation for determining the finished places and the race outcome, that is, a computational process, based on, for example, the attribute parameters, aptitude parameters, and acquired skills of all the participating raised characters. Since the factors that the raised character has are not used in the computational process, the raised character does not advantageously proceed with the race even if the raised character supposedly has a large number of factors.

If the raised character is set as an inheritance character, the factors that the raised character has only affect the raising target character to be raised. The factors acquirable by the raised character are classified into multiple types. FIG. 9 illustrates a basic attribute factor, an aptitude factor, a race factor, a character factor, and a skill factor as the types of factors. Each factor has any one of multiple levels set therefor. The factor levels provided here are three factor levels, namely, level 1, level 2, and level 3.

The factor level is determined by lottery. In this case, after the factors acquired by the raised character are determined, the factor level may be determined by lottery for each of the acquired factors. Alternatively, a selection ratio may be set for every combination pattern between a factor and a factor level, and any of the combination patterns may be determined based on the set selection ratio. In this case, the factor to be acquired and the factor level are determined at the same time.

With regard to the factor levels, level 3 has the highest effect, whereas level 1 has the lowest effect. In the lottery for determining the factor level, the selection probability of level 3 is set to be the lowest, whereas the selection probability of level 1 is set to be the highest. However, depending on the result of the raising game, the selection probability of a factor to be acquired and the selection probability of a factor level may change. In this case, for example, a higher factor level may be set for a raised character with a higher attribute parameter or a higher score.

The basic attribute factor increases an attribute parameter of the raising target character. There are five basic attribute factors provided, which include a speed factor, a stamina factor, a power factor, a spirit factor, and a wisdom factor. Of the five basic attribute factors, the raised character always acquires one basic attribute factor. The five basic attribute factors respectively correspond to the five attribute parameters of speed, stamina, power, spirit, and wisdom. For example, if a raised character of the first inheritance generation or the second inheritance generation has a speed factor, the speed attribute parameter of the raising target character increases.

In this case, an increase value of the speed attribute parameter varies depending on the factor level of the speed factor. For example, the speed attribute parameter of the raising target character increases by "7" when the factor level of the speed factor is level 1, the attribute parameter increases by "13" in the case of level 2, and the attribute parameter increases by "21" in the case of level 3. Therefore, supposing that a total of six raised characters including two raised characters of the first inheritance generation and four raised characters of the second inheritance generation all have a speed factor at level 3, the speed attribute parameter of the raising target character increases by a maximum of 126 (increase value of 21×6).

However, each factor has a set activation timing and a set activation condition. Therefore, even if an inheritance character has a factor, the raising target character does not receive the effect if the activation condition is not satisfied at the activation timing.

As mentioned above, the main raising game has multiple turns that include a predetermined turn set as a factor activation turn. For example, it is assumed that three turns, namely, the first turn, the 30th turn, and the 54th turn, in the main raising game are set as factor activation turns. On each of these factor activation turns, it is determined whether or not the factor is to be activated. If it is determined that the factor is to be activated, the activation condition for the factor is satisfied, and an effect corresponding to the factor is brought about.

Determination of whether or not a basic attribute factor is to be activated is performed by lottery. In this case, the selection probability in the lottery for determining whether or not the basic attribute factor is to be activated, that is, the probability of activating the basic attribute factor (referred to as "activation probability" hereinafter), may vary among the three factor activation turns. For the first turn, the activation probability of the basic attribute factor is set to 100% regardless of the factor level. For each of the 30th turn and the 54th turn, the activation probability of the basic attribute factor varies depending on the factor level. For example, for each of the 30th turn and the 54th turn, the activation probability of the basic attribute factor at level 3 is set to 100%, the activation probability of the basic attribute factor at level 2 is set to 90%, and the activation probability of the basic attribute factor at level 1 is set to 80%.

The inheritance-character selection screen 170 displays an increase value by which an attribute parameter increases on the first turn. For example, in FIG. 7C, one inheritance character included in the first inheritance group is provisionally selected. In this case, the type of attribute parameter that increases on the first turn and the increase value thereof are displayed in accordance with the one provisionally-selected inheritance character. In this case, "+63" is displayed below the power attribute parameter and indicates that the power attribute parameter increases by 63 points on the first turn. The attribute-parameter display section 152a displays a value to which the increase value has been added on the first turn.

Furthermore, in FIG. 7D, two inheritance characters included in the first inheritance group and the second inheritance group are provisionally selected. In this case, the types of attribute parameters that increase on the first turn and the increase values thereof are displayed in accordance with the two provisionally-selected inheritance characters. In this case, "+21", "+63", and "+42" are respectively displayed below the speed, power, and wisdom attribute parameters and indicate that the speed, power, and wisdom attribute parameters increase by 21 points, 63 points, and 42 points, respectively, on the first turn.

On the inheritance-character selection screen 170, the increase value of the attribute parameter that increases in accordance with the inheritance character included in the first inheritance group and the increase value of the attribute parameter that increases in accordance with the inheritance character included in the second inheritance group are displayed in a distinguishable manner. For example, in FIG. 7D, "+63" displayed below the power attribute parameter is indicated in a color different from that of "+21" and "+42" displayed below the speed and wisdom attribute parameters.

The aptitude factor shown in FIG. 9 increases an aptitude parameter of the raising target character. There are six aptitude factors provided, which include a turf-racetrack factor, a dirt-racetrack factor, a short-distance factor, a mile factor, a mid-distance factor, and a long-distance factor. Of the six aptitude factors, the raised character always acquires one aptitude factor. The six aptitude factors respectively correspond to the turf-racetrack aptitude, the dirt-racetrack aptitude, the short-distance aptitude, the mile aptitude, the mid-distance aptitude, and the long-distance aptitude. For example, if the raised characters of the first inheritance generation or the second inheritance generation include a raised character having a turf-racetrack factor, the turf-racetrack aptitude parameter of the raising target character increases.

Each aptitude factor also has a set activation timing and a set activation condition. During each of factor activation turns identical to those of the basic attribute factors, it is determined whether or not the corresponding aptitude factor is to be activated. If it is determined that the aptitude factor is to be activated, the corresponding aptitude parameter increases by one level. For example, for the first turn, the activation probability of the aptitude factor is set to 100% regardless of the factor level.

For example, the aptitude factors of the three raised characters belonging to the first inheritance group are a turf-racetrack factor, a short-distance factor, and a mile factor, respectively, and the aptitude factors of the three raised characters belonging to the second inheritance group are a turf-racetrack factor, a short-distance factor, and a mid-distance factor, respectively. In this case, the turf-racetrack aptitude and the short-distance aptitude of the raising target character increase by two levels, and the mile aptitude and the mid-distance aptitude increase by one level.

Furthermore, for example, it is assumed that the aptitude factors of the three raised characters belonging to the first inheritance group are all turf-racetrack factors and that the aptitude factors of the three raised characters belonging to the second inheritance group are all short-distance factors. In this case, the turf-racetrack aptitude and the short-distance aptitude of the raising target character increase by three levels. As another example, it is assumed that the aptitude factors of the three raised characters belonging to the first inheritance group are all turf-racetrack factors and that the aptitude factors of the three raised characters belonging to the second inheritance group are a turf-racetrack factor, a short-distance factor, and a mile factor, respectively. In this case, the turf-racetrack aptitude of the raising target character increases by four levels, and the short-distance aptitude and the mile aptitude increase by one level.

However, for the first turn, there is a limit provided for the increase value of each aptitude parameter. In detail, for the first turn, an upper limit for all the aptitude parameters is set to A. Therefore, supposing that an initial value for the turf-racetrack aptitude of the raising target character is A, the turf-racetrack aptitude does not increase on the first turn even if an inheritance character has a turf-racetrack factor.

In contrast, for the 30th turn and the 54th turn, it is determined by lottery whether or not each aptitude factor is to be activated based on the factor level. For example, for each of the 30th turn and the 54th turn, the activation probability of an aptitude factor at level 3 is set to 5%, the activation probability of an aptitude factor at level 2 is set to 3%, and the activation probability of an aptitude factor at level 1 is set to 1%. When it is determined by lottery that an aptitude factor is to be activated on the 30th turn or the 54th turn, the aptitude parameter corresponding to the aptitude factor increases. For the 30th turn and the 54th turn, the upper limit for each aptitude is raised from A to S. Therefore, on each of the 30th turn and the 54th turn, the aptitude factors are activated so that the values of the aptitude parameters can be increased to S.

The aptitude-parameter display section 152*b* of the inheritance-character selection screen 170 displays the aptitude parameter values that have increased on the first turn.

A race factor increases an attribute parameter of the raising target character. For example, a race factor is provided for each highly difficult race (referred to as "factor target race" hereinafter), such as GI, among participable races in the main raising game. Upon completion of the raising game, it is determined by lottery whether or not a race factor is to be acquired for every factor target race in which the raising target character has finished in first place. By being selected in this lottery, a raised character can acquire the race factor.

A race factor is also provided with factor levels. For every race factor set to be acquired, a factor level is determined by lottery. In this case, there is no limit to the number of race factors that a single raised character can acquire, such that each raised character can acquire multiple race factors.

For each race factor, an attribute parameter to be increased by activation and an increase value thereof are set in advance. For example, the race factors include a race factor that increases the speed attribute parameter and a race factor that increases the power attribute parameter. In this case, the increase value of each attribute parameter increases as the factor level becomes higher.

Each race factor also has a set activation timing and a set activation condition. During every factor activation turn, it is determined whether or not the corresponding race factor is to be activated. If it is determined that the race factor is to be activated, the attribute parameter corresponding to the race factor increases. The factor activation turns of the race factor are limited to the 30th turn and the 54th turn. The activation probability of the race factor on each factor activation turn varies depending on the factor level. The activation probability increases as the factor level becomes higher.

A character factor is a character-specific factor. For example, a character factor set for a character enhanced to a predetermined level is always given to a raised character upon completion of the raising game only when the character is raised as a raising target character. Since only one character factor is set for each character, the maximum number of character factors that a single raised character can acquire is one. If a raised character is generated based on a character not enhanced to the predetermined level, a character factor is not acquirable.

Each character factor can be activated on a preset factor activation turn, and is activated by being selected in a lottery executed on the factor activation turn. When the character factor is activated, a hint event set for every character factor occurs, and a hint for a skill can be acquired, as mentioned above.

A skill factor is given based on an acquired skill acquired by a raised character. In detail, upon completion of the raising game, it is determined by lottery whether a skill factor is to be acquired for every acquired skill acquired by a raised character. By being selected in this lottery, the skill factor is given to the raised character. Specifically, the raised character can partially or entirely acquire the skill factor corresponding to the acquired skill. When it is determined that the skill factor is to be acquired, the factor level of the skill factor is determined by lottery.

Each skill factor can be activated on a preset factor activation turn, and is activated by being selected in a lottery executed on the factor activation turn. The selection probability increases as the factor level becomes higher. When the skill factor is activated, a hint event set for every skill factor occurs, and a hint for a skill can be acquired. Accordingly, the raising target character can acquire a skill similar to an acquired skill acquired by, for example, an inheritance character.

Accordingly, the determination of whether or not a skill factor is to be acquired is performed within a range of an acquired skill acquired by a raised character. Therefore, the possibility of acquiring a skill factor increases for a raised character having a larger number of acquired skills. However, because the determination of whether or not a skill factor is to be acquired is performed by lottery, a skill factor is sometimes not acquirable even when the number of acquired skills is large.

In this case, a raised character acquires a skill factor separately from an acquired skill. Alternatively, a skill factor need not be provided, and a skill acquirable by the raising target character may be determined based on an acquired skill that a raised character has by being an inheritance character.

Accordingly, the attribute parameters of the raising target character vary significantly depending on the inheritance characters included in the deck. Even when a raised character has high attributes, since the determination of whether or not a factor is to be acquired is performed by lottery, the raised character with high attributes is not necessarily suitable as an inheritance character. On the other hand, even when a raised character does not have high attributes, the raised character may sometimes effectively function as an inheritance character by acquiring a large number of factors at a high factor level. The ability to organize the inheritance characters into a deck in this manner brings about the enjoyment of not only simply raising superior raised characters but also raising raised characters effective as inheritance characters.

Furthermore, in this embodiment, the compatibility among the raising target character, the raised characters of the first inheritance generation, and the raised characters of the second inheritance generation is determined. A combination of highly-compatible characters contributes to an advantageous factor activation condition.

FIG. 10A illustrates compatibility determination targets, and FIG. 10B illustrates compatibility determination items. As shown in FIG. 10A, in this embodiment, seven determination targets from No. 1 to No. 7 are provided. A first determination target (No. 1) includes the raising target character of the present generation and the raised character of the first inheritance generation in the first inheritance group. A second determination target (No. 2) includes the raising target character of the present generation and the raised character of the first inheritance generation in the second inheritance group.

A third determination target (No. 3) includes the raised character of the first inheritance generation in the first inheritance group and the raised character of the first inheritance generation in the second inheritance group. A fourth determination target (No. 4) includes the raising target character of the present generation, the raised character of the first inheritance generation in the first inheritance group, and one (raised character A) of the raised characters of the second inheritance generation in the first inheritance group. A fifth determination target (No. 5) includes the raising target character of the present generation, the raised character of the first inheritance generation in the first inheritance group, and the other one (raised character B) of the raised characters of the second inheritance generation in the first inheritance group.

A sixth determination target (No. 6) includes the raising target character of the present generation, the raised character of the first inheritance generation in the second inheritance group, and one (raised character A) of the raised characters of the second inheritance generation in the second inheritance group. A seventh determination target (No. 7) includes the raising target character of the present generation, the raised character of the first inheritance generation in the second inheritance group, and the other one (raised character B) of the raised characters of the second inheritance generation in the second inheritance group.

For every determination target described above, it is determined whether or not a condition for each of multiple determination items is satisfied. FIG. 10B illustrates an example of the determination items. In this embodiment, the setting of the game is such that a character selectable as the raising target character is a student and that each character trains at a school.

As shown in FIG. 10B, preset characters include a student, a colleague, and a good friend. The determination items include, for example, details indicating whether two or three characters as determination targets are students in the same grade, are colleagues, or are good friends. The determination items also include an indication of whether or not the specialty running style of a character as a determination target, the distance aptitude, and the racetrack aptitude match.

Each determination item is associated with a compatibility expectation value. The compatibility expectation values of the determination items satisfied among the characters serving as determination targets are accumulated. In this case, although the compatibility expectation value varies from determination item to determination item, the compatibility expectation value may be the same for all the determination items.

For example, when determining the compatibility, it is first determined whether or not all the determination items are satisfied between the raising target character of the present generation serving as the first determination target and the raised character of the first inheritance generation in the first inheritance group. In this case, the compatibility expectation values associated with the satisfied determination items are accumulated and counted. The compatibility expectation values are counted sequentially from the first determination target to the seventh determination target in this manner. Based on an ultimately-calculated compatibility expectation value, the factor activation probability is corrected. Specifically, the activation probability of all the factors increases with increasing compatibility expectation value, whereas the activation probability of all the factors decreases with decreasing compatibility expectation value.

An activation probability may be calculated by using the calculated compatibility expectation value as a correction value. Furthermore, for example, a correction value for correcting the factor activation probability may be set for every compatibility level, and the compatibility level may be determined in accordance with the calculated compatibility expectation value.

Accordingly, since the factor activation probability varies depending on the compatibility between the raising target character and an inheritance character or the compatibility between inheritance characters, the combination of two inheritance characters brings about a significant effect on the raising of the raising target character. Specifically, the compatibility between characters is important information for determining which inheritance character is to be selected.

As shown in FIG. 7B, FIG. 7C, and FIG. 7D, in a state where an inheritance character is selected, a compatibility mark indicating the level of compatibility is displayed at the upper right side of the inheritance-character selection screen 170 and the raised-character-list screen 180.

In this case, the compatibility level of the selected character is indicated with one of three compatibility marks denoted by a double circle, a single circle, and a triangle. In a state where an inheritance character is not selected, as shown in FIG. 7A, a compatibility mark is not displayed.

As shown in FIG. 7B, the raised-character-list screen 180 is provided with a display switch button 183. When the display switch button 183 is operated, a display-condition setting screen (not shown) is displayed. On the display-condition setting screen, the player can rearrange or filter the raised character icons 182 displayed on the raised-character-list screen 180, that is, the raised characters selectable as inheritance characters.

FIG. 11A illustrates sorting conditions. FIG. 11B illustrates filtering conditions. On the display-condition setting screen, the player can select and set any of the sorting conditions shown in FIG. 11A. In this case, the sorting conditions that can be selected and set include the score, factor, number of skills, name, racetrack aptitude, registration date, running-style aptitude, compatibility level, distance aptitude, and memo. When the sorting conditions are set, the raised-character-list screen 180 is displayed. In this case, the display order of the raised character icons 182 is changed on the raised-character-list screen 180 in accordance with the sorting conditions.

On the display-condition setting screen, the player can select and set any of the filtering conditions shown in FIG. 11B. The filtering conditions provided include the basic attribute factor, aptitude factor, and compatibility level. When the basic attribute factor or the aptitude factor is set as a filtering condition, the raised-character-list screen 180 displays only the raised character or characters having the factor selected by the player.

In this case, the player can set the factor level. For example, when the filtering is performed by setting the factor level to level 3, the raised-character-list screen 180 displays only the raised character or characters having the factor with the factor level of level 3 between the factors selected by the player. The player can filter the raised characters by selecting whether a raised character itself has the factor or whether an inheritance character of the raised character has the factor.

The player can also perform the filtering based on the compatibility level. It is possible to filter a raised character with the compatibility level denoted by the double circle, a raised character with the compatibility level denoted by the single circle, and a raised character with the compatibility level denoted by the triangle. Accordingly, the sorting and the filtering can be performed based on various conditions, thereby achieving enhanced player friendliness.

When any of the raised character icons 182 is long-pressed on the raised-character-list screen 180 shown in FIG. 7B, detailed information about the raised character corresponding to the raised character icon 182 is displayed.

Figure 12:
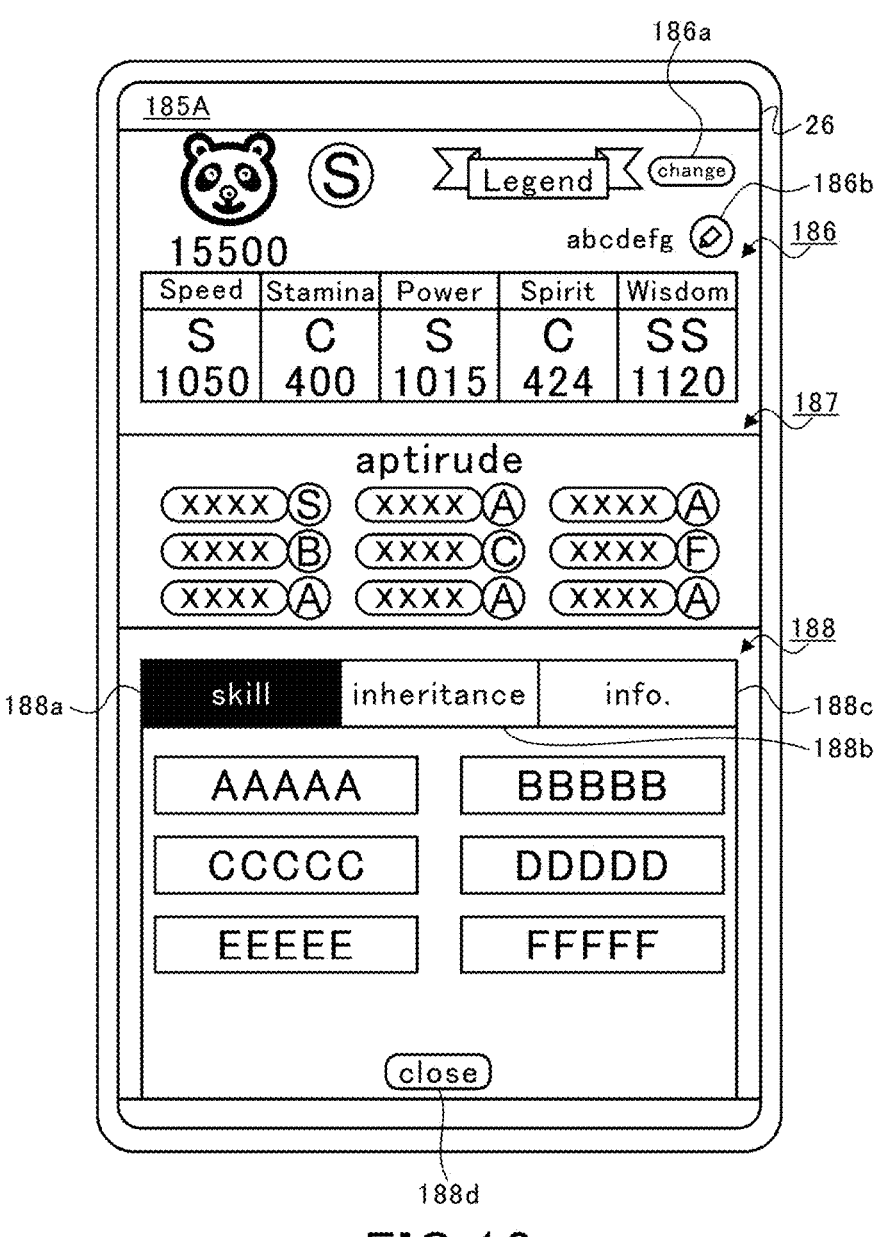
FIG. 12 is a first diagram illustrating a character details dialog.
Figure 13:
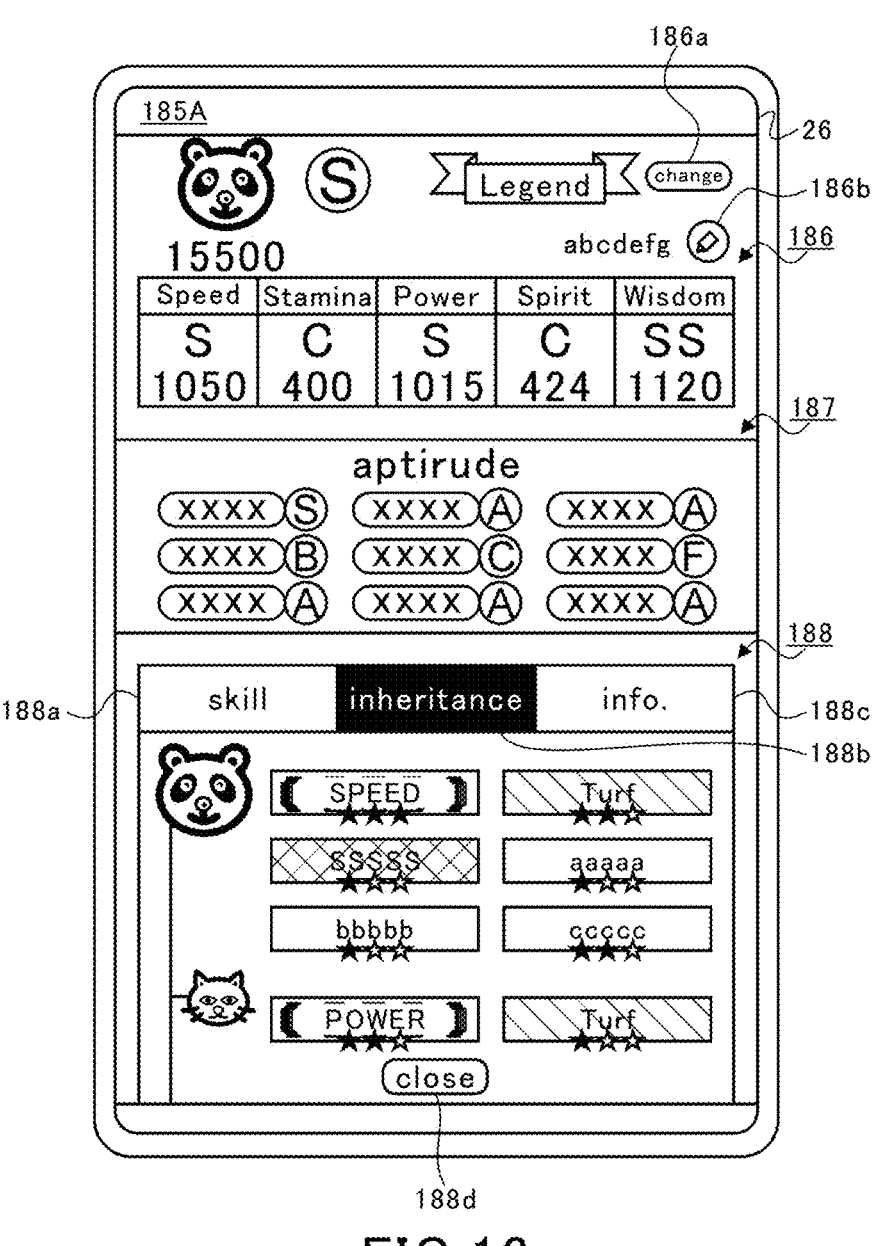
FIG. 13 is a second diagram illustrating the character details dialog.
Figure 14:
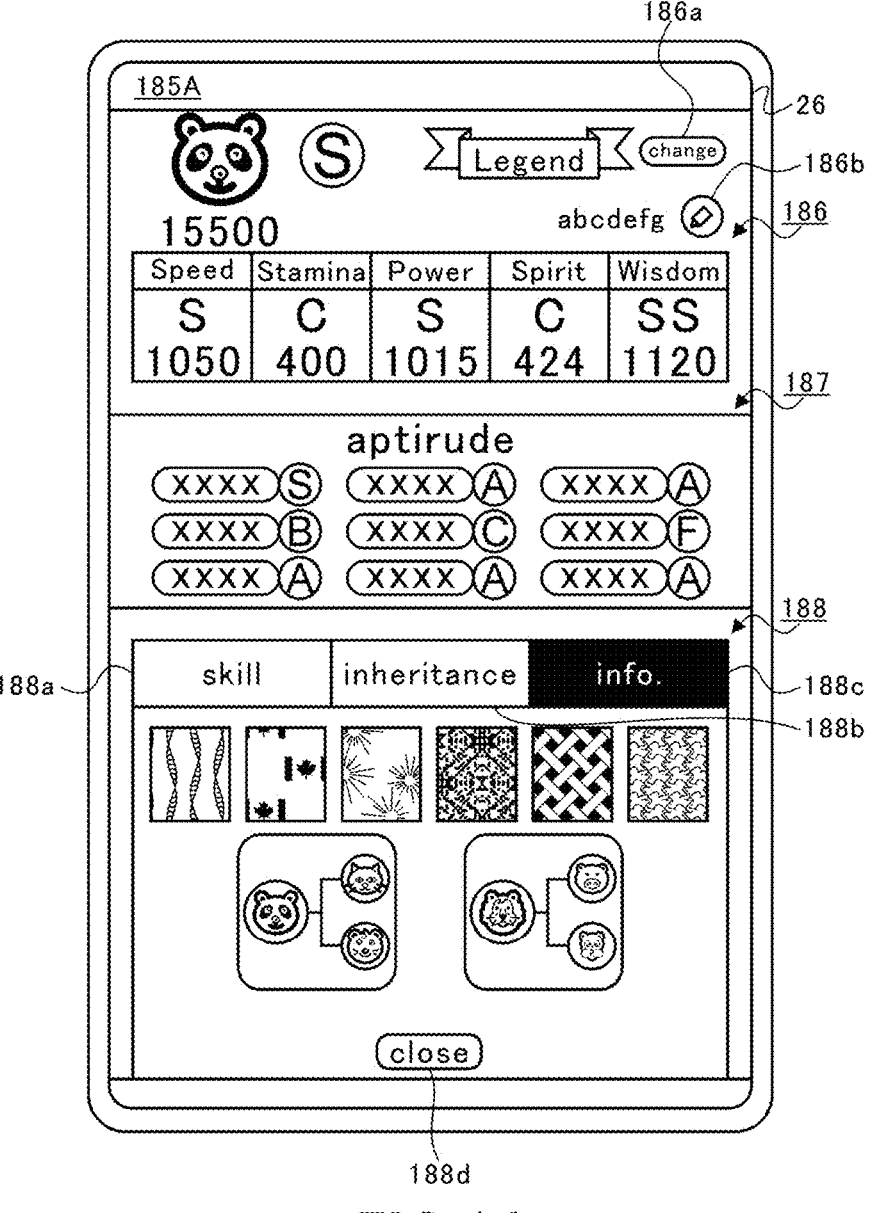
FIG. 14 is a third diagram illustrating the character details dialog.

FIG. 12 is a first diagram illustrating a character details dialog 185A. FIG. 13 is a second diagram illustrating the character details dialog 185A. FIG. 14 is a third diagram illustrating the character details dialog 185A. The character details dialog 185A displays detailed information about the raised character. The upper part of the character details dialog 185A displays an attribute-parameter display field 186 indicating the attribute parameters of the raised character.

An icon indicating the character serving as a basis for the raised character, as well as the score and the raising rank of the raised character, are displayed at the upper left side of the attribute-parameter display field 186.

Furthermore, a second-name change button 186*a* and a memo input button 186*b* are provided at the upper right side of the attribute-parameter display field 186. When the second-name change button 186*a* is tapped, a second-name-list screen (not shown) is displayed. The second-name-list screen displays a list of second names acquired by the raised character. In the main raising game, a large number of second names are provided, and an acquisition condition is set for all the second names.

In the main raising game, a second name that has satisfied the acquisition condition is given to the raised character. The player can select any one of the second names acquired by the raised character and can set the second name for the raised character. On the second-name-list screen, the player can change the second name set for the raised character. A currently-set second name (in this case, "Legend") is displayed to the left of the second-name change button 186*a*.

Examples of the second-name acquisition condition include acquisition of a predetermined number of fans by the raising target character, an attribute parameter or an aptitude parameter being a predetermined value or more, acquisition of a predetermined skill, the number of wins in races being a predetermined value or more, and acquisition of a predetermined finished place (e.g., first place) in a specific race.

When the memo input button 186*b* is tapped, a text input screen (not shown) is displayed. The text input screen accepts nine characters or fewer of, for example, Hiragana characters, Katakana characters, numerals, and Roman characters. The text input to the text input screen is stored as a memo in association with the raised character. If the raised character has a memo stored therein, the memo (in this case, "abcdefg") is displayed to the left of the memo input button 186*b*.

The sorting conditions for the raised character icons 182 on the raised-character-list screen 180 include the aforementioned memo. Therefore, by registering the memo in association with the raised character, the player can search for the raised character to be used as an inheritance character more readily.

An aptitude-information display field 187 is displayed below the attribute-parameter display field 186. The aptitude-information display field 187 displays the aptitude parameters related to racetrack aptitudes for turf and dirt racetracks, the aptitude parameters related to distance aptitudes for short-distance, mile, mid-distance, and long-distance, and the aptitude parameters related to running-style aptitudes for pace-maker, front-runner, stalker, and closer.

A various-information display field 188 is displayed below the aptitude-information display field 187. The various-information display field 188 is provided with a skill display tab 188*a*, an inheritance-information display tab 188*b*, a raising-information display tab 188*c*, and a close operation section 188*d*. When the skill display tab 188*a* is tapped, the acquired skills of the raised character are displayed in the various-information display field 188, as shown in FIG. 12. When the inheritance-information display tab 188*b* is tapped, the inheritance information of the raised character is displayed, as shown in FIG. 13.

The various-information display field 188 displays inheritance information based on a raised character settable as an inheritance character and an inheritance character used for raising the raised character. The inheritance information includes information about the inheritance character used for raising the raised character, factor information that the raised character has, and factor information that the inheritance character has. A list of inheritance information is displayed for each raised character.

In detail, the factor information associated with the raised character and the factor information associated with the inheritance character of the raised character are displayed for each character. Therefore, by scrolling the various-information display field 188 in the vertical direction, the player can check the factor information that each of the three characters has.

The various-information display field 188 displays the basic attribute factor, the aptitude factor, and the character factor in different colors. For example, the basic attribute factor is displayed in blue, the aptitude factor is displayed in red, and the character factor is displayed in green. The various-information display field 188 displays the race factor and the skill factor in white. Stars indicating the factor levels are superposed and displayed on each piece of factor information.

When the raising-information display tab 188*c* is tapped, the raising information of the raised character is displayed, as shown in FIG. 14. The raising information includes the type of support card used when raising the raised character, the characters of the first inheritance generation and the second inheritance generation, the record of individual races in the raising game, and the score.

Accordingly, the player can check various types of information related to the raised character in the character details dialog 185A. Therefore, the player can readily ascertain information associated with each inheritance character included in the deck, thereby achieving enhanced player friendliness.

When the close operation section 188d is tapped on the character details dialog 185A, the character details dialog 185A is closed, and the raised-character-list screen 180 is displayed on the display 26. As shown in FIGS. 7A, 7B, 7C, and 7D, a skill display button 172 is provided at the upper right side of the inheritance-character selection screen 170 and the raised-character-list screen 180. When the skill display button 172 is tapped, a list of skills to be possibly acquired is displayed in accordance with the raised character provisionally selected as an inheritance character.

Figure 15:
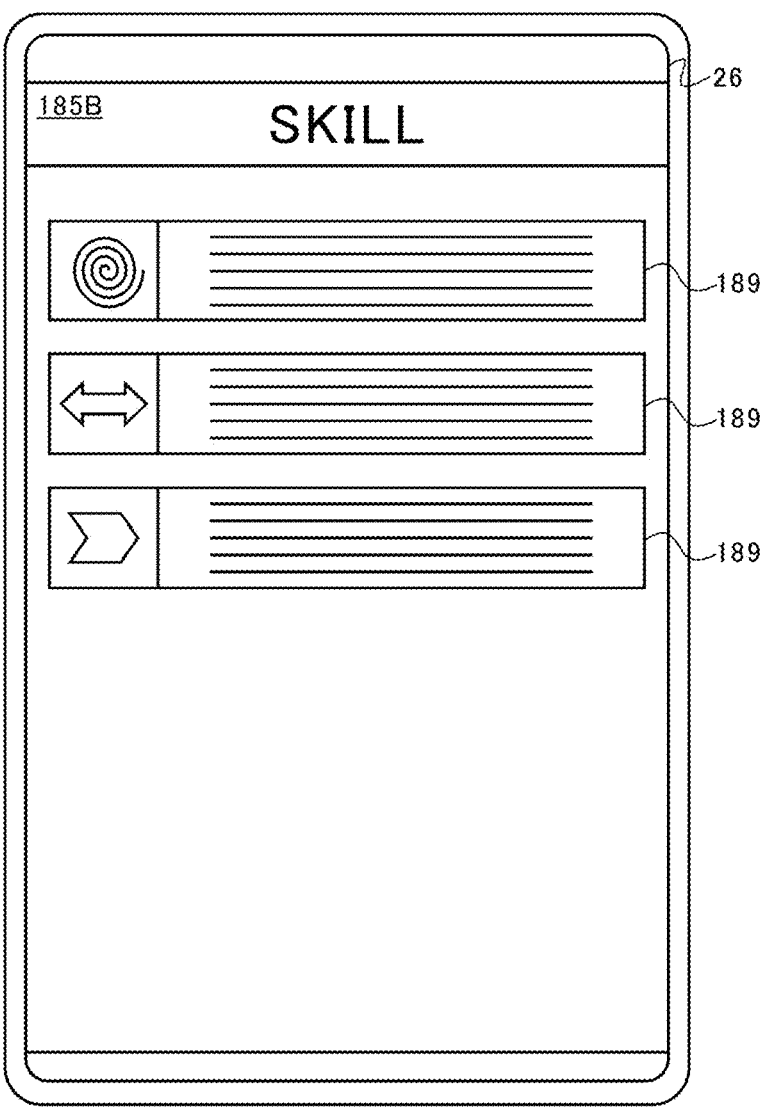
FIG. 15 illustrates a skill display dialog.

FIG. 15 illustrates a skill display dialog 185B. The skill display dialog 185B displays a skill-description display field 189 indicating an icon corresponding to a skill and the details of the skill. With regard to the skill displayed in the skill-description display field 189, if the currently-selected raised character is used as an inheritance character, a list of all the skills that the raising target character may possibly acquire is displayed.

Specifically, the skill display dialog 185B displays a list of information related to the skills associated with the character factor or the skill factor that the raised character has. As shown in FIG. 7C, when the skill display button 172 is tapped in a state where one raised character is selected as an inheritance character, the skills associated with the character factor and the race factor that this one raised character (inheritance character) has are displayed in the skill display dialog 185B.

On the other hand, as shown in FIG. 7D, when the skill display button 172 is tapped in a state where two raised characters are selected as inheritance characters, the skills associated with the character factors and the race factors that the two raised characters (inheritance characters) have are displayed in the skill display dialog 185B.

Accordingly, in this embodiment, a list of inheritance information (factor information) is displayed in the character details dialog 185A for every raised character settable as an inheritance character. Moreover, a list of information (skills) associated with the inheritance information (factor information) is displayed in the skill display dialog 185B. In this case, the character details dialog 185A and the skill display dialog 185B are displayed based on the raised character settable as an inheritance character and the inheritance character used for generating the raised character. By displaying the character details dialog 185A and the skill display dialog 185B, enhanced player friendliness is achieved.

In this case, the skill display dialog 185B displays a skill that is acquirable by activating a factor. Alternatively, instead of displaying skill-related information, the skill display dialog 185B may display factor information from which a hint of a skill is obtainable. In either case, the inheritance information (factor information) may be classified into multiple types (factor types), and the skill display dialog 185B may display inheritance information (character factor and race factor) classified as a predetermined type or information (skill-related information) associated with the inheritance information. Accordingly, in the skill display dialog 185B, the inheritance information is partially extracted, and the extracted inheritance information is displayed.

When two raised characters are provisionally selected, the next operation section 154 provided on the inheritance-character selection screen 170 is enabled. When the enabled next operation section 154 is tapped, the provisionally-selected raised characters are provisionally registered as inheritance characters in the deck, and a support-card organization screen 190 to be described later is displayed.

The player must always select two raised characters as inheritance characters on the inheritance-character selection screen 170. If two inheritance characters are not in a provisionally selected state, the next operation section 154 is grayed out and cannot accept an operation from the player, as shown in FIG. 7A and FIG. 7C. The inheritance-character selection screen 170 is also provided with the return operation section 153. When the return operation section 153 is tapped, the raising-target-character selection screen 150 is displayed.

[Registration of Support Card]

Figures 16A, 16B, 16C:
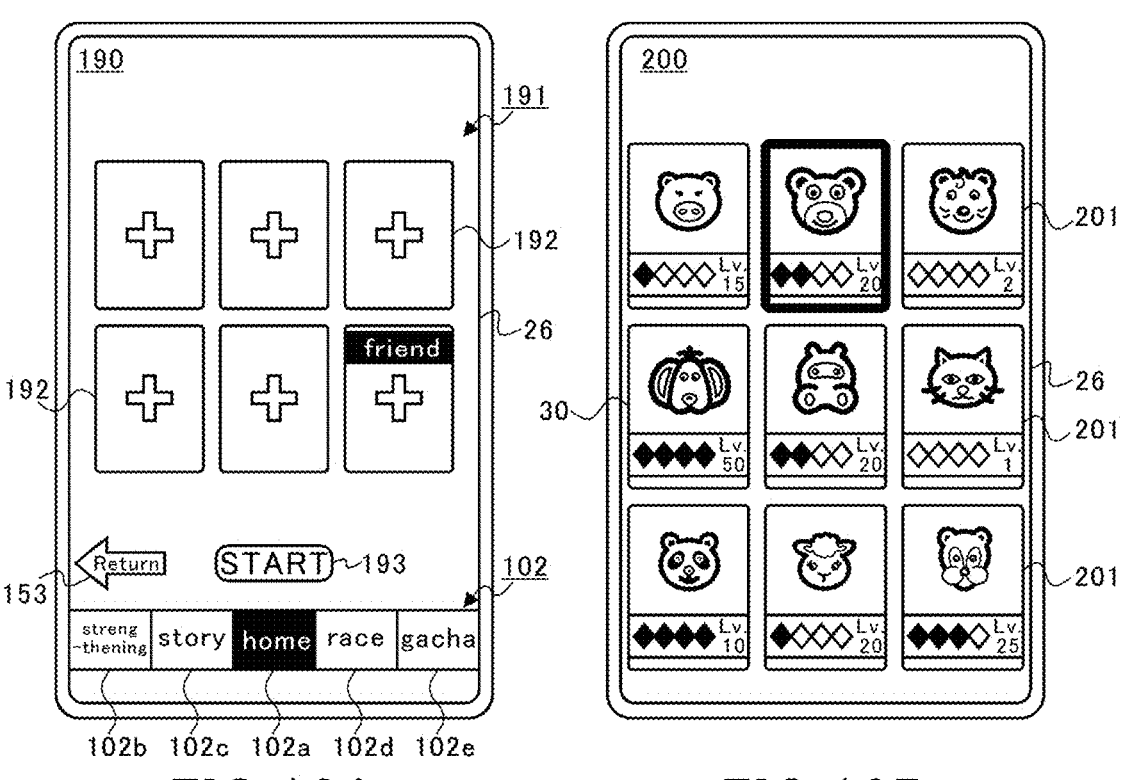
FIG. 16A is a first diagram illustrating a support-card organization screen.
FIG. 16B illustrates a support-card selection screen.
FIG. 16C is a second diagram illustrating the support-card organization screen.

FIG. 16A is a first diagram illustrating the support-card organization screen 190. When two inheritance characters are registered on the inheritance-character selection screen 170, the support-card organization screen 190 shown in FIG. 16A is displayed. The central part of the support-card organization screen 190 is provided with a support-card display region 191. The support-card display region 191 includes a plurality of support-card display frames 192. The lower part of the support-card organization screen 190 displays the return operation section 153 indicated as "Return" and a start operation section 193 indicated as "START".

The support-card display region 191 displays a plurality of (in this case, six) support-card display frames 192. The number of support-card display frames 192 displayed is equal to the number of support cards settable by the player. When the support-card organization screen 190 is first displayed, the support-card display frames 192 are displayed as blank fields.

In this embodiment, the player can set six types of support cards in a deck. Of the six types settable by the player, one or more (e.g., five types) are selectable from support cards owned by the player. A remaining one or more (e.g., one type) of the six types settable by the player are selectable from support cards set as rental cards by another player, such as a friend.

FIG. 16B illustrates a support-card selection screen 200. When any of the support-card display frames 192 (excluding the support-card display frame 192 displayed at the lower right corner) is tapped on the support-card organization screen 190 in FIG. 16A, the support-card selection screen 200 shown in FIG. 16B is displayed on the display 26. The support-card selection screen 200 displays a list of card icons 201 corresponding to the support cards owned by the player. By tapping on any of the card icons 201 displayed on the support-card selection screen 200, the player can select a support card.

Although not shown, when the support-card display frame 192 displayed at the lower right corner is tapped on the support-card organization screen 190, a support card set as a rental card by a friend or by a player extracted based on a predetermined condition, such as a lottery, is displayed on the support-card selection screen 200. By tapping on this support card displayed on the support-card selection screen 200, the player can select one support card of the friend.

Accordingly, in the raising game, the player can use a support card owned by another player.

FIG. 17A illustrates a support card table. As shown in FIG. 17A, for every type (i.e., support card ID) of support card owned by the player, the support card table has stored therein the type (i.e., character ID) of support character, rarity level, level, and specialty training in association with one another.

Each support card is associated with at least one support character (character ID). In other words, at least one character ID is always associated with a support card ID. In this case, a support card associated with one support character and a support card associated with five support characters are provided. Alternatively, a support card may be associated with, for example, two to four support characters or six or more support characters.

Support cards of the types A1, A2, and A3 shown in FIG. 17A are each associated with character A. A support card of the type G is associated with five characters, namely, characters A, C, E, H, and K. A support card associated with multiple characters, like the support card of the type G, may sometimes be referred to as "group support card" hereinafter. Specialty training is not set for the group support card. Alternatively, similar to the other support cards, specialty training may be set for the group support card.

In this embodiment, a rarity level is set for every support card. There are three rarity levels provided, which are R (rare), SR (super rare), and SSR (super special rare). R is set to be the lowest rarity level, whereas SSR is set to be the highest rarity level. In this embodiment, a support card with a higher rarity level tends to have a higher support effect, to be described later. Furthermore, in this embodiment, a support card with a higher rarity level tends to have a larger number of possessed skills and a larger number of support events, to be described later.

Each support card is provided with 50 levels from level 1 to level 50. The level of each support card can be increased by the player, and the level increased by the player is stored in each support card. The level of each support card can be increased by using, for example, the in-game currency or an item. The level of each support card is provided with an upper limit depending on the rarity level.

For example, a support card with the rarity level of R has level 20 set as an upper limit, a support card with the rarity level of SR has level 25 set as an upper limit, and a support card with the rarity level of SSR has level 30 set as an upper limit.

The upper limit for each level can be increased in a stepwise fashion when a predetermined condition is satisfied. For example, with regard to a support card with the rarity level of R, the upper limit can be increased to a maximum of level 40. With regard to a support card with the rarity level of SR, the upper limit can be increased to a maximum of level 45. With regard to a support card with the rarity level of SSR, the upper limit can be increased to a maximum of level 50.

FIG. 17B illustrates a support effect table. As shown in FIG. 17B, the support effect table has stored therein a support effect for every type of support card owned by the player.

A support effect increases each type of status in the main raising game. Each support card is provided with a plurality of support-effect targets. Examples of support-effect targets include endurance, speed, stamina, power, spirit, and wisdom.

FIG. 17C illustrates a possessed skill table. As shown in FIG. 17C, in the possessed skill table, possessed skills are set for every support card owned by the player. In this embodiment, possessed skills are set for each support card such that a character settable as the raising target character possesses the possessed skills. In the main raising game, the possessed skills set for each support card can be possessed by the raising target character when a hint event occurs.

FIG. 17D illustrates a support event table. As shown in FIG. 17D, the support event table has stored therein a support event or events that may occur for every support card owned by the player. A support event may possibly occur while the main raising game is being executed. If a support event occurs, the value of each status of the raising target character may increase or decrease.

For example, a support event that occurs in accordance with the number of turns may be set, or a support event that occurs in accordance with a predetermined lottery may be set. Furthermore, multiple occurring support events may be selected on a single turn. In either case, an occurring support event or events may be set in accordance with a predetermined setting method set in advance.

A support event may include a first hint event that may occur at the start of a turn in the raising game, a second hint event that may occur upon execution of training, to be described later, in the raising game, a first attribute event that may occur at the start of a turn in the raising game, and a second attribute event that may occur upon execution of training in the raising game. In each of the first hint event and the second hint event, a skill can be possessed or acquired. Each of the first attribute event and the second attribute event involves increasing or decreasing the numerical value of an attribute parameter of a character. The first hint event and the first attribute event will collectively be referred to as "first event" hereinafter, and the second hint event and the second attribute event will be referred to as "second event" hereinafter.

FIG. 16C is a second diagram illustrating the support-card organization screen 190. In this embodiment, when all of the six support cards are selected, the start operation section 193 becomes operable, as shown in FIG. 16C. On the other hand, when all of the six support cards are not selected, the start operation section 193 is inoperable, as shown in FIG. 16A.

When the return operation section 153 is operated on the support-card organization screen 190, the inheritance-character selection screen 170 shown in FIG. 7D is displayed on the display 26. Furthermore, when the start operation section 193 is tapped on the support-card organization screen 190, as shown in FIG. 16C, the selected support cards are provisionally registered, and a final confirmation screen 205 (FIG. 18A) is displayed.

Figure 18A:
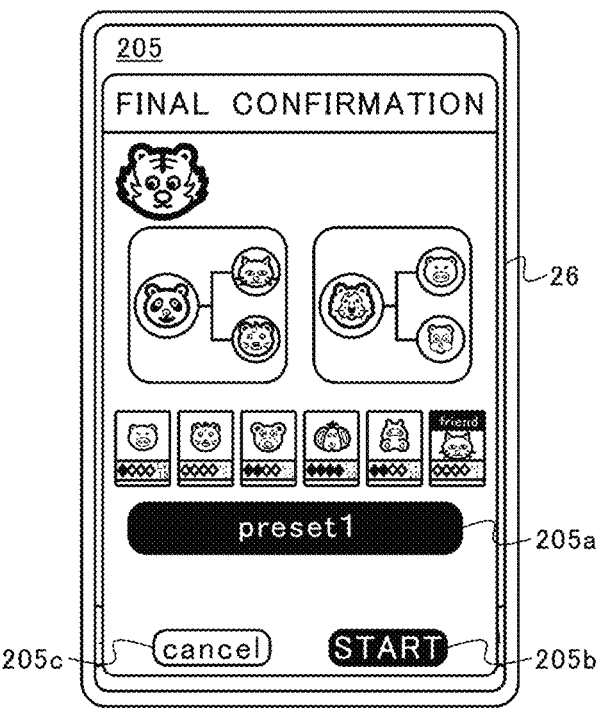
FIG. 18A illustrates a final confirmation screen.
Figure 18B:
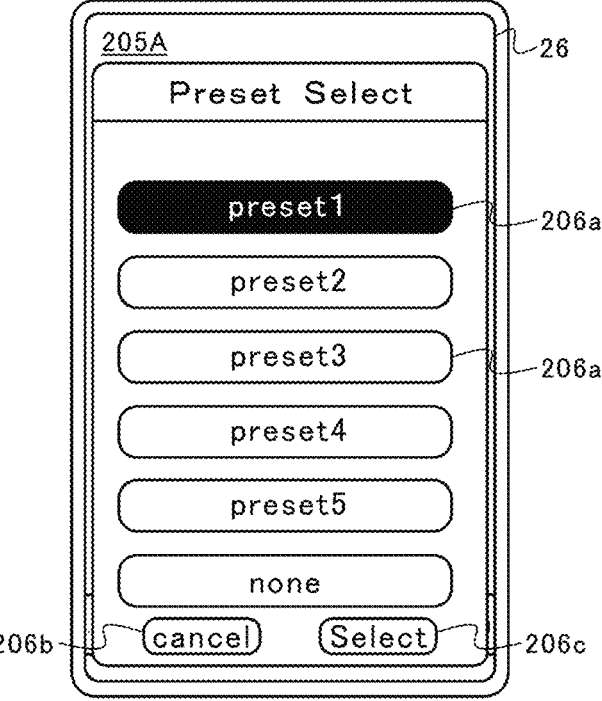
FIG. 18B illustrates a preset selection screen.

FIG. 18A illustrates the final confirmation screen 205. FIG. 18B illustrates a preset selection screen 205A. The final confirmation screen 205 displays the raising target character selected by the player, the raised characters included in the first inheritance group, the raised characters included in the second inheritance group, and the support cards. The final confirmation screen 205 also displays a preset display section 205a. The preset display section 205a indicates the number of a currently-selected preset.

A preset is reservation information of a race in which the raising target character is to participate in the main raising game. The player can create a preset by selecting an arbitrary race from all the races. Multiple presets can be saved, and one preset can be selected from the saved presets on the final confirmation screen 205. In detail, when the preset display section 205a is tapped, the preset selection screen 205A shown in FIG. 18B is displayed.

The preset selection screen 205A displays preset load buttons 206a corresponding to the saved presets. The player can set a preset by tapping on any of the preset load buttons 206a and then tapping on a select operation section 206c. When the select operation section 206c is tapped, the preset selection screen 205A is closed, and the final confirmation screen 205 is displayed. When a cancel operation section 206b on the preset selection screen 205A is tapped, the preset selection screen 205A is displayed without the preset being changed.

When a cancel operation section 205c is tapped on the final confirmation screen 205, the support-card organization screen 190 is displayed. On the other hand, when a start operation section 205b is tapped, a game screen 210 (FIG. 20A) is displayed on the display 26.

In this embodiment, the support card registration is limited such that the type of character set as a raising target character and the type of character set as a support character are not redundant with respect to each other. In detail, a character settable as a raising target character is associated with a character ID. A support card is always associated with at least one character ID of a character serving as a support character.

In this case, one raising target character and six support cards are registered. The character ID of the raising target character and the character ID of the support character must not be redundant with respect to each other. Therefore, for example, the player cannot organize a support card associated with the same character as the raising target character into a deck. Moreover, the player cannot organize multiple support cards associated with the same character into a deck.

Furthermore, multiple character IDs associated with one group support card all differ from each other without being redundant with respect to each other. If a group support card is included in a deck, all of the character IDs associated with the group support card, the character ID associated with another support card, and the character ID associated with the raising target character must not be redundant with respect to each other. Accordingly, the player must organize a deck such that the character IDs are not redundant with respect to each other between the raising target character and a support character, as well as between support characters.

When the raising target character, the inheritance characters, and the support cards are registered, the preparation stage process ends.

[Raising Stage Process]

When the preparation stage process ends, the raising stage process starts. In the raising stage process, a raising target character can be raised. In order to facilitate the understanding, the basic flow of the main raising game will be described first.

FIG. 19 illustrates a selection item table. A common selection item table is used for all raising target characters. Alternatively, a selection item table may be provided for each type of raising target character. As shown in FIG. 19, the raising game includes the first turn to the 78th turn and has gameplay where the various parameters are updated in accordance with a selection result of the player on each turn. According to the selection item table, items selectable by the player are preliminarily set for every turn.

Figure 20A:
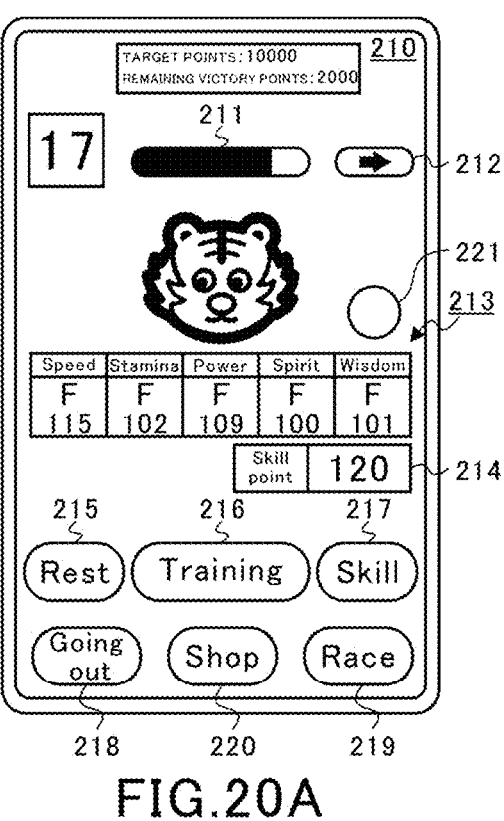
FIG. 20A illustrates a game screen.
Figure 20B:
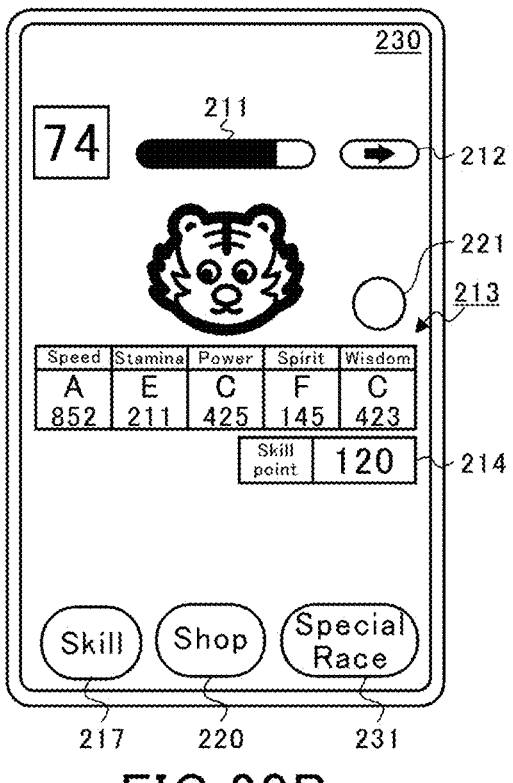
FIG. 20B illustrates a special race screen.

FIG. 20A illustrates the game screen 210. FIG. 20B illustrates a special race screen 230. When the process transitions to the raising stage process, the game screen 210 shown in FIG. 20A is displayed on the display 26. The upper part of the game screen 210 displays an endurance display section 211 and a condition display section 212. The raising target character is provided with an "endurance" parameter.

The "endurance" parameter is mainly used for calculating a failure rate as a probability of failing in training, to be described later. The endurance display section 211 displays the currently remaining "endurance" of the raising target character relative to an upper limit value for the "endurance" in a visually ascertainable manner.

The raising target character is also provided with a "condition" parameter. The condition display section 212 displays the current "condition" of the raising target character in multiple levels (i.e., five levels, which are very poor, poor, normal, good, and very good) in a visually ascertainable manner. As the "condition" parameter increases, the raising target character becomes more advantageous in the race, and the increase value of each attribute parameter as a result of training increases.

As shown in FIG. 20A, the central part of the game screen 210 displays an image of the raising target character, a status display section 213, and a skill-point display section 214. The status display section 213 indicates the current status of the raising target character by using numerical values and ranks in multiple levels (i.e., 16 levels, which are $G^+$, F, $F^+$, E, $E^+$, D, $D^+$, C, $C^+$, B, $B^+$, A, $A^+$, S, SS, and $SS^+$). In detail, in this embodiment, the numerical values and the ranks with respect to the attribute parameters "Speed", "Stamina", "Power", "Spirit", and "Wisdom" are displayed. The skill-point display section 214 numerically indicates the remaining skill points possessed by the raising target character in the raising game.

Furthermore, as shown in FIG. 20A, the lower part of the game screen 210 displays a rest operation section 215 indicated as "Rest", a training operation section 216 indicated as "Training", a skill operation section 217 indicated as "Skill", an outing operation section 218 indicated as "Going Out", an individual-race operation section 219 indicated as "Race", and a shop operation section 220 indicated as "Shop". The upper part of the game screen 210 displays the number of the current turn. The central part of the game screen 210 displays an item operation section 221.

As shown in FIG. 19, on each turn, the player can select any of the items from "Rest" (rest operation section 215), "Training" (training operation section 216), "Going Out" (outing operation section 218), "Race" (individual-race operation section 219), and "Special Race" (special-race operation section 231), to be described later. In this case, as shown in FIG. 19, the items selectable on each turn are set in advance.

When the "Rest" item is selected, endurance is recovered. When the "Going Out" item is selected, either one of or each of the endurance and the condition increases. When the "Training" item is selected, training, to be described later, becomes executable. When the "Race" item is selected, the raising target character can participate in an individual race. When the "Special Race" item is selected, the raising target character can participate in a special race, to be described later. When a game result is derived by selecting any of the "Rest", "Training", "Going Out", "Race", and "Special Race" items, the current turn ends and transitions to the next turn.

In this embodiment, there are set turns where the items of the rest operation section 215, the training operation section 216, the outing operation section 218, and the individual-race operation section 219 are non-selectable, as in the case of the 74th turn, the 76th turn, and the 78th turn shown in FIG. 19. On these turns, the special race screen 230 is displayed on the display 26, as shown in FIG. 20B.

The special race screen 230 displays the special-race operation section 231 indicated as "Special Race", the skill operation section 217, the shop operation section 220, and the item operation section 221, and any of the operation sections is selectable by the player. When the special-race operation section 231 is selected, a special race different from the individual race to be executed in response to selection of the individual-race operation section 219 is executed. With regard to a special race, a total of three races are performed on the 74th turn, the 76th turn, and the 78th turn, respectively, and a champion is determined based on a cumulative value of victory points, to be described later.

On the other hand, the skill operation section 217, the shop operation section 220, and the item operation section 221 are set to be always selectable on every turn. Although a detailed description will be provided later, even if a skill is acquired, a shop is used, or an item is used in response to an operation performed on the skill operation section 217, the shop operation section 220, or the item operation section 221, the relevant turn does not end.

In this embodiment, when an individual race or a special race is executed, the raising target character can acquire victory points and a special currency in accordance with the finished place in the race. For each race, the number of victory points and special currency that can be acquired is set for every finished place. The higher the finished place, the larger the numerical values of victory points and special currency that can be acquired.

Moreover, the higher the difficulty level of the race, the larger the number of victory points and special currency that can be acquired. For example, with regard to the grades GI, GII, and GIII, the higher the grade of the race, the larger the number of victory points and special currency that can be acquired.

In the raising game according to this embodiment, predetermined target points are set for every prescribed turn segment. As mentioned above, in this embodiment, the raising game includes the first turn to the 78th turn. A turn segment from the first turn to the 24th turn will be referred to as "initial-phase turn segment", a turn segment from the 25th turn to the 48th turn will be referred to as "middle-phase turn segment", a turn segment from the 49th turn to the 72nd turn will be referred to as "later-phase turn segment", and a turn segment from the 73rd turn to the 78th turn will be referred to as "final-phase turn segment".

For each of the initial-phase turn segment, the middle-phase turn segment, and the later-phase turn segment, target points are set. The target points set for each turn segment may be the same or may be different. The player can proceed with the raising game until the final-phase turn segment by causing the cumulative value of the victory points acquired in each turn segment to sequentially reach the target points.

The target points are set based on the aptitude parameters related to the racetrack aptitudes of the raising target character and the aptitude parameters related to the distance aptitudes. For example, the target points of a raising target character whose turf-racetrack aptitude parameter is higher than the dirt-racetrack aptitude parameter are set to be higher than the target points of a raising target character whose dirt-racetrack aptitude parameter is higher than the turf-racetrack aptitude parameter. Furthermore, for example, the target points may be set to vary in accordance with the type of the highest parameter among the short-distance, mile, mid-distance, and long-distance aptitude parameters. Moreover, the target points may be set to vary in accordance with a combination of aptitude parameters related to racetrack and distance aptitudes. Accordingly, the target points set for each raising target character may vary in accordance with the aptitude parameters related to racetrack and distance aptitudes. In addition to the racetrack and distance aptitudes of the raising target character, the target points may be set based on the aptitude parameters related to running-style aptitudes.

The upper part of the game screen 210 shown in FIG. 20A displays the target points in the current turn segment and remaining victory points as remaining victory points required for reaching the target points. By displaying the target points and the remaining victory points, the player can ascertain the victory points to be acquired in the current turn segment.

The victory points acquired by the player are reset in each of the initial-phase turn segment, the middle-phase turn segment, and the later-phase turn segment. Alternatively, the victory points acquired by the player may be sequentially accumulated without being reset for every turn segment.

When the target points are reached in all of the initial-phase turn segment, the middle-phase turn segment, and the later-phase turn segment, it is possible to proceed to the raising game in the final-phase turn segment. In the final-phase turn segment, all three special races (first race, second race, and third race) are executed, and a champion is determined based on the cumulative value of the victory points according to the race result.

As the special races progress, the value of acquirable victory points increases. In detail, of the total of three races, the value of victory points acquirable when first place is obtained in the second race is larger than the value of victory points acquirable when first place is obtained in the first race, and the value of victory points acquirable when first place is obtained in the third race is larger than the value of victory points acquirable when first place is obtained in the second race.

A so-called non-player character (referred to as "NPC" hereinafter) that participates in all of the three races for competing with the raising target character is an NPC having the same character ID. However, as the special races progress, the parameters of the NPC are set to increase. For example, a correction value to be added to each attribute parameter of the NPC is increased sequentially in the first race, the second race, and the third race, thereby increasing the attribute parameter of the NPC. In the final-phase turn segment, even if the finished place in each special race is lower than or equal to a predetermined finished place (e.g., second place or lower), the special race can continue without terminating the raising game.

Figures 21A, 21B, 21C, 21D:
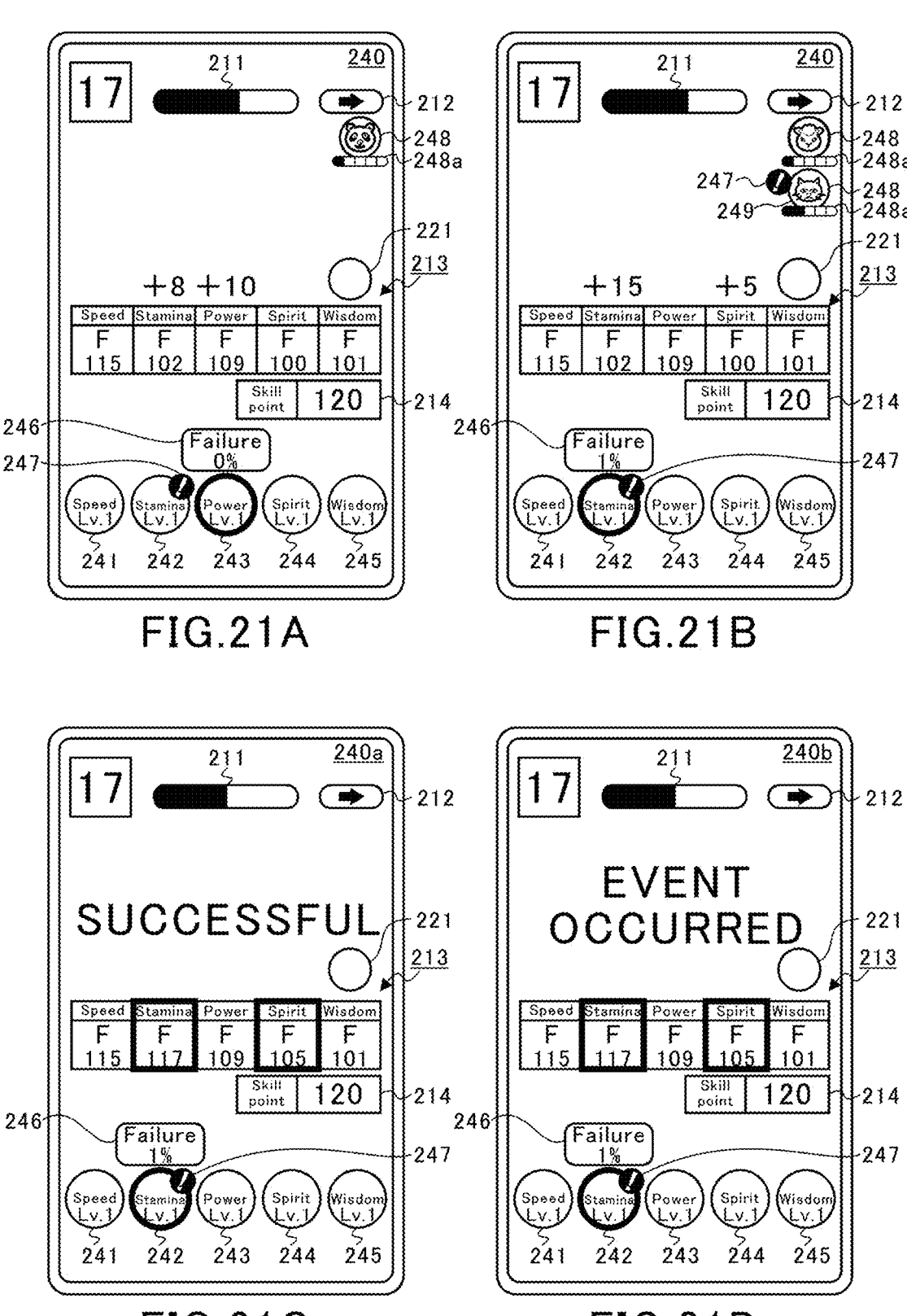
FIG. 21A is a first diagram illustrating a training screen.
FIG. 21B is a second diagram illustrating the training screen.
FIG. 21C illustrates a training-result notification screen.
FIG. 21D illustrates an event screen.

FIG. 21A is a first diagram illustrating a training screen 240. FIG. 21B is a second diagram illustrating the training screen 240. When the training operation section 216 on the game screen 210 is operated, the training screen 240 is displayed on the display 26.

As shown in FIG. 21A, the lower part of the training screen 240 displays training items. In this case, a speed operation section 241 indicated as "Speed", a stamina operation section 242 indicated as "Stamina", a power operation section 243 indicated as "Power", a spirit operation section 244 indicated as "Spirit", and a wisdom operation section 245 indicated as "Wisdom" are displayed.

When the player single-taps on any one of the operation sections 241 to 245, the training item corresponding to the tapped one of the operation sections 241 to 245 is provisionally selected. In this case, the one of the operation sections 241 to 245 corresponding to the provisionally-selected training item is highlighted. FIG. 21A illustrates a state where the power operation section 243 is provisionally selected. FIG. 21B illustrates a state where the stamina operation section 242 is provisionally selected.

Each of the operation sections 241 to 245 has a training level displayed together therewith for the corresponding training item. A training level is a parameter that increases in accordance with the number of times the corresponding training item is selected. As the training level becomes higher, the increase value of the attribute parameter when the training is executed increases. The training level is originally set to level 1 and increases to a maximum of level 5.

A failure-rate display section 246 indicated as "Failure" is displayed on the provisionally-selected one of the operation sections 241 to 245. A failure rate displayed as a numerical value in the failure-rate display section 246 is set to increase in inverse proportion to the remaining endurance displayed in the endurance display section 211.

The status display section 213 displays a value of an attribute parameter that increases when training corresponding to the provisionally-selected one of the operation sections 241 to 245 has been successfully executed. For example, in the example shown in FIG. 21A, the power operation section 243 is provisionally selected, and "+8" is displayed under "Stamina" and "+10" is displayed under "Power" in the status display section 213. In the example shown in FIG. 21B, the stamina operation section 242 is provisionally selected, and "+15" is displayed under "Stamina" and "+5" is displayed under "Spirit" in the status display section 213.

When training is successfully executed, an event notification indication 247 is displayed in any of the operation sections 241 to 245 corresponding to a training item where a predetermined event occurs. The event notification indication 247 can be displayed in different display modes in accordance with the types of events.

On each of turns other than the 74th turn, the 76th turn, and the 78th turn where special races are executed in the final-phase turn segment, it is determined at the start of the turn whether or not a support character associated with a support card included in the deck is to be allocated to each training item. In other words, it is determined whether or not a support card or a support character is to be associated with a training item.

If a support character is to be associated with a training item, the support character is associated with any one of five training items. As shown in FIG. 21B, the upper right part of the training screen 240 displays an allocated character icon 248 indicating a support character allocated to training for every training item of the provisionally-selected one of the operation sections 241 to 245. Once the support character is allocated, the increase value of the attribute parameter when the training is successful increases.

Each support character has a bond gauge set therefor. For example, a bond gauge is a value ranging between 0 and 100. The current value of the bond gauge is visually ascertainable in accordance with a bond-gauge display section 248a displayed for each allocated character icon 248.

The bond gauge has an initial value of 0 and a maximum value of 100. However, depending on the support card, a support effect that increases the initial value of the bond gauge may be set, as in increasing the initial value by +10. In this case, with regard to the support character associated with the support card having this support effect, the initial value of the bond gauge is higher than 0 from the start of the main raising game.

Furthermore, the bond gauge increases when a predetermined increase condition is satisfied. An example of the increase condition is selection of training to which a support character is allocated (i.e., successful training). Another example of the increase condition is usage of a predetermined item purchased from a shop, to be described later, or the occurrence of a first event or a second event, to be described later.

The increase value of the attribute parameter upon successful training to which the support character is allocated (referred to as "joint training" hereinafter) increases with increasing value of the bond gauge of the allocated support character. In the joint training to which the support character is allocated, friendship training may sometimes occur. When friendship training occurs, the increase value of the attribute parameter upon successful training increases by, for example, 10% to 50%.

Friendship training can occur simultaneously for multiple support characters. Therefore, for example, when friendship training occurs simultaneously for multiple support characters on one turn, the attribute parameter can be increased significantly in one training session.

However, an occurrence condition is set for friendship training. Although a detailed description will be provided later, the occurrence condition for friendship training varies between a group support card and other support cards. A support card other than a group support card has set therein a friendship-training occurrence condition indicating that the value of the bond gauge of a support character is larger than or equal to a predetermine value (e.g., 80) and that a support character is allocated to a predetermined training set for each support card.

With regard to a support card other than a group support card, specialty training is set as the predetermined training serving as the friendship-training occurrence condition. Specifically, with regard to a support card associated with only one support character, friendship training may occur only when a support character is allocated to the specialty training. For example, with regard to a support card in which speed training is set as the specialty training, friendship training may occur only when a support character associated with the support card is allocated to speed training.

In contrast, for a group support card associated with multiple support characters, a friendship-training occurrence condition different from that of other support cards is set. Although a detailed description will be provided later, a bonus zone is sometimes set in the main raising game. In the bonus zone, friendship training may occur based on the group support card. In the bonus zone, friendship training occurs regardless of the training item to which the group support card is allocated. In other words, in the bonus zone, training to which the group support card is allocated is executed, so that friendship training occurs based on the group support card regardless of the training item.

As mentioned above, a group support card is associated with multiple characters as support characters. However, each training item is associated with one group support card, and the multiple support characters are not necessarily respectively associated with multiple training items.

When joint training is successful, a predetermined event may occur in correspondence with a character displayed in the allocated character icon 248. In this case, an event notification indication 247 is displayed in the corresponding allocated character icon 248. The allocated character icon 248 displaying the event notification indication 247 will be referred to as "event-allocated character icon 249" hereinafter.

A character allocated to training may include a character other than a support character corresponding to a support card registered by the player in the preparation stage process. For example, a character allocated to training may be a character randomly selected by lottery from all of the support characters included in the game. In that case, the training screen 240 displays the allocated character icon 248 indicating the character other than the registered support character.

When joint training is executed, an event associated with the character other than the support character registered by the player may occur. The rate of occurrence of an event associated with a character not registered by the player is lower than the rate of occurrence of an event associated with a support character registered by the player. In this case, the allocated character icon 248 displayed on the training screen 240 may display the event notification indication 247.

FIG. 21C illustrates a training-result notification screen 240a. When any provisionally selected one of the operation sections 241 to 245 is tapped again, training corresponding to the tapped one of the operation sections 241 to 245 is executed. When the training is executed, the training-result notification screen 240a providing a notification about whether the training has been successful or has failed is displayed on the display 26. In this case, text indicating "SUCCESS" is displayed, so that the player is notified that the training has been successful.

In this case, the attribute parameters displayed in the status display section 213 are updated based on the successful training. Specifically, each attribute parameter of the raising target character corresponding to the training item selected by the player is updated.

In this case, the attribute parameter value that increases when the training displayed in the status display section 213 in FIG. 21A or FIG. 21B has been successful is added. Moreover, the display in the endurance display section 211 is updated in accordance with the executed training item. When training for any one of speed, stamina, power, and spirit is successfully executed, the endurance decreases. On the other hand, when training for wisdom is successfully executed, the endurance is recovered.

If the training fails, a predetermined penalty is given. Specifically, the details of a penalty include a decrease in endurance, a numerical decrease in the attribute parameter value, and a decrease in condition. For example, a penalty given when the failure rate is high may be more disadvantageous (e.g., a larger numerical decrease in the endurance, a larger numerical decrease in the attribute parameter, or a larger numerical decrease in the condition level) than a penalty given when the failure rate is low.

The details of a penalty may be determined in accordance with the training item. For example, if training for speed fails, the speed attribute-parameter value may decrease. If training for power fails, the power attribute-parameter value may decrease. For some of the training items (e.g., wisdom), it is possible not to give a penalty even if the training fails.

FIG. 21D illustrates an event screen 240b. When the display of the training-result notification screen 240a ends, the event screen 240b may sometimes be displayed on the display 26. Various events are executed on the event screen 240b. During each turn, multiple events may sometimes occur.

For example, when the first hint event or the second hint event occurs, a hint for a skill is obtained. When a hint for a skill is obtained, the player can acquire the skill by consuming skill points. There are various types of skills provided, and a predetermined attribute may be activated for each skill. Each skill has a set activation condition and a set effect. When the activation condition is satisfied, the predetermined effect is activated. A skill may sometimes be activated during an individual race or a special race, to be described later.

In addition to the first hint event and the second hint event for possessing skills, examples of the events include an endurance recovery event, an endurance decreasing event, a first attribute event and a second attribute event where attribute parameters increase or decrease, a condition increasing event, and a condition decreasing event. As will be described in detail later, the events include an event where an occurring turn is set in advance and an event occurring when selection is made in a predetermined lottery. There are also an event that occurs at the start of a turn and an event that occurs before the end of a turn. When all of the events determined to occur are completed, the game screen 210 related to the next turn is displayed.

Figure 22A:
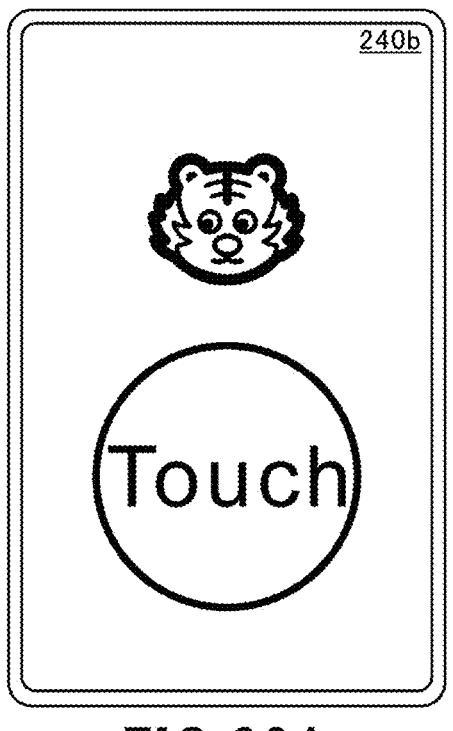
FIG. 22A is a first diagram illustrating an inheritance event.
Figure 22B:
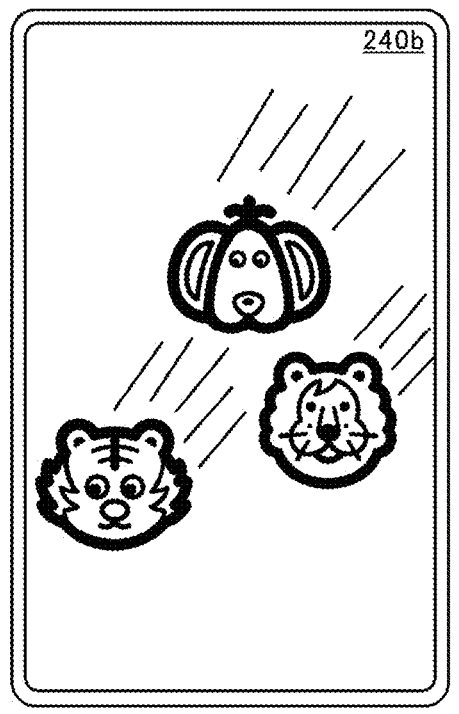
FIG. 22B is a second diagram illustrating the inheritance event.
Figure 22C:
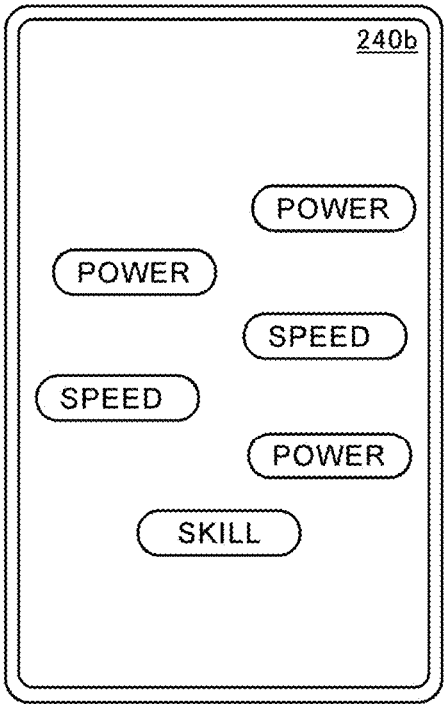
FIG. 22C is a third diagram illustrating the inheritance event.
Figure 22D:
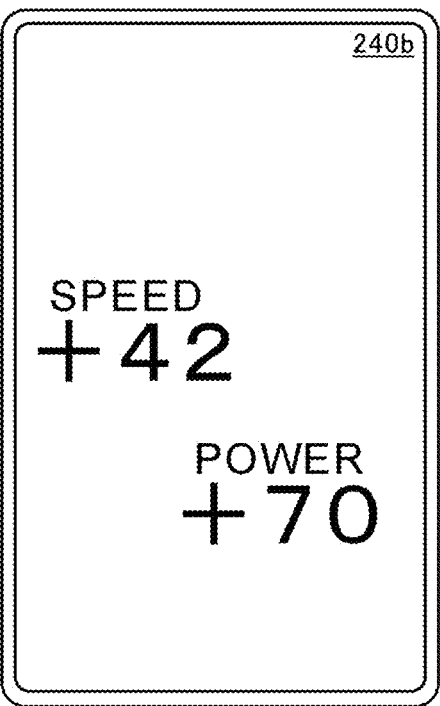
FIG. 22D is a fourth diagram illustrating the inheritance event.

FIG. 22A is a first diagram illustrating an inheritance event. FIG. 22B is a second diagram illustrating the inheritance event. FIG. 22C is a third diagram illustrating the inheritance event. FIG. 22D is a fourth diagram illustrating the inheritance event. On each factor activation turn mentioned above, an inheritance event occurs as the turn commences. This inheritance event is a scenario-common event, to be described later, and always occurs on the same turn regardless of a scenario selected by the player. Although the first turn, the 31st turn, and the 55th turn are set as the factor activation turns in this embodiment, the following description relates to a case where the inheritance event occurs on the 31st turn.

When the 31st turn commences, the raising target character and an operation section indicated as "Touch" are first displayed on the event screen 240b, as shown in FIG. 22A. When the operation section displayed on the event screen 240b is tapped, an animation image including the raising target character and two inheritance characters is displayed, as shown in FIG. 22B. Furthermore, when the operation section is tapped, a lottery for determining whether or not all the factors that the total of six raised characters of the first inheritance generation and the second inheritance generation have are to be activated is performed.

Then, as shown in FIG. 22C, the factors that have been selected by the lottery for activation and that are set to be activated are displayed. Subsequently, as shown in FIG. 22D, the types of attribute parameters and aptitude parameters that increase as a result of the activation of the factors and the increase values thereof are displayed, and the parameters are updated. When the inheritance event ends, the game screen 210 shown in FIG. 20A is displayed, so that the player can select any one of the items. In this case, in the status display section 213, the increase values of the attribute parameters and aptitude parameters displayed during the inheritance event have been added.

Figure 23A:
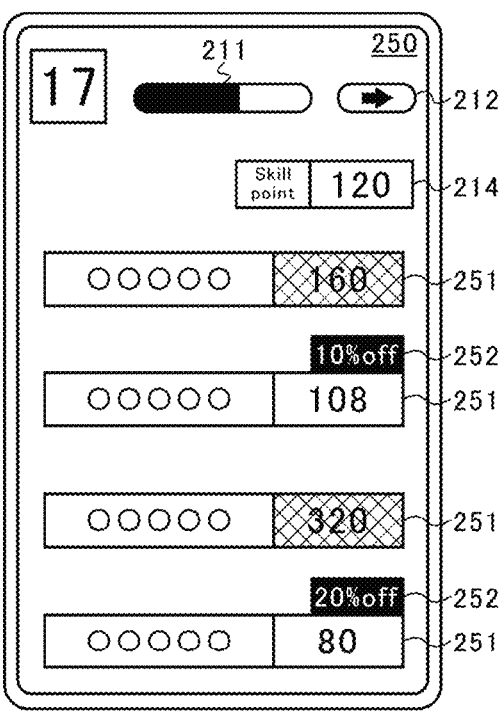
FIG. 23A is a first diagram illustrating a skill screen.
Figure 23B:
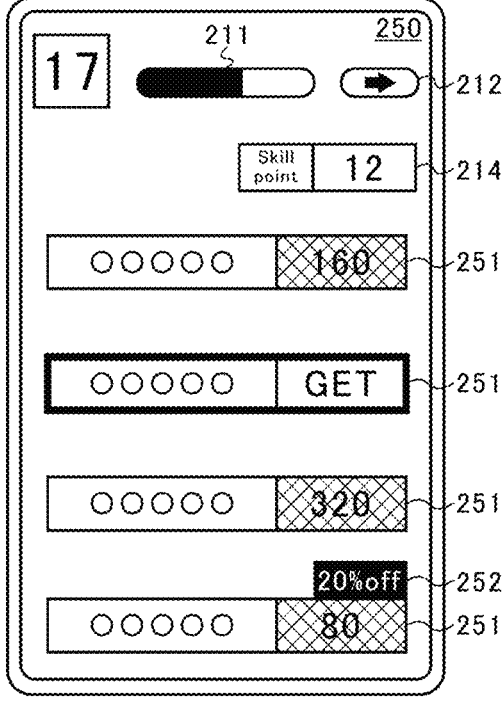
FIG. 23B is a second diagram illustrating the skill screen.

FIG. 23A is a first diagram illustrating a skill screen 250. FIG. 23B is a second diagram illustrating the skill screen 250. When the skill operation section 217 on the game screen 210 is operated, the skill screen 250 shown in FIG. 23A is displayed on the display 26.

The skill screen 250 displays a skill display field 251. The skill display field 251 displays an acquired skill, a possessed skill preliminarily set for the raising target character, and a possessed skill possessed in accordance with the occurrence of each of various events. If a first hint event or a second hint event occurs with respect to a possessed skill, skill points to be consumed for acquiring this possessed skill are discounted. In this case, skill points required for acquiring a possessed skill corresponding to an acquired hint are displayed in a discounted state. A discount-rate display icon 252 indicating the discount rate is displayed together with the skill display field 251.

For each skill displayed on the skill screen 250, the activation condition for the skill and the effect when the skill is activated are displayed. The upper part of the skill screen 250 displays the endurance display section 211, the condition display section 212, and the skill-point display section 214. The upper part of the skill screen 250 also displays the number of the current turn.

When a possessed skill is acquired by consuming skill points based on an operation performed by the player, "GET" is displayed for the acquired skill so that a notification indicating that the possessed skill has been acquired is provided, as shown in FIG. 23B. In the skill-point display section 214, the consumed skill points are subtracted from the displayed skill points.

Figure 24A:
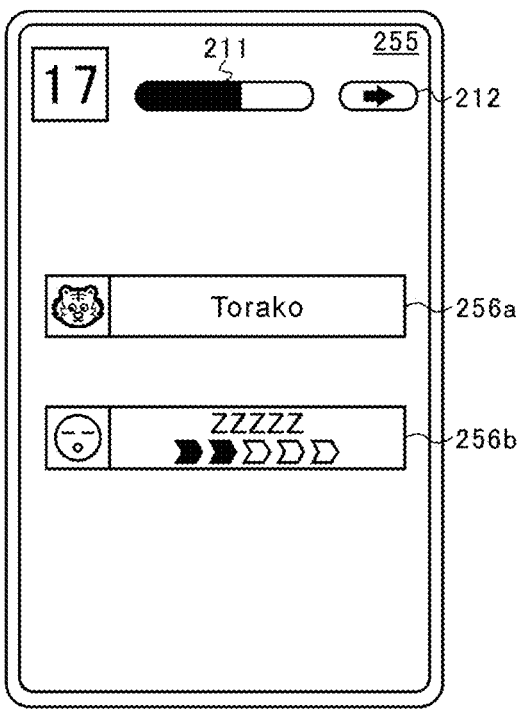
FIG. 24A is a first diagram illustrating an outing screen.

FIG. 24A is a first diagram illustrating an outing screen 255. When the outing operation section 218 on the game screen 210 is operated, the outing screen 255 shown in FIG. 24A is displayed on the display 26. For example, the outing screen 255 displays a raising-target-character selection operation section 256a and a support-character selection operation section 256b.

A support card other than a group support card is categorized into a normal character type and a friend character type. A support card of the normal character type is associated with a character settable as a raising target character. On the other hand, a support card of the friend character type is associated with a character different from a character settable as a raising target character. In other words, a support card of the friend character type is associated with a character not settable as a raising target character. A character associated with a support card of the friend character type and not settable as a raising target character will be referred to as "friend character" hereinafter.

If a support card of the friend character type is included in the deck, the outing screen 255 is displayed, as shown in FIG. 24A. The raising-target-character selection operation section 256a displayed on the outing screen 255 corresponds to a raising target character. When the raising-target-character selection operation section 256a is tapped, a solo outing event where the raising target character goes out alone occurs. When the solo outing event occurs, a solo outing screen (not shown) is displayed.

There are multiple (e.g., three) execution patterns provided for the solo outing event. When the raising-target-character selection operation section 256a is tapped, the execution pattern for the solo outing event is selected by, for example, lottery, and the solo outing screen corresponding to the selected execution pattern is displayed. The details of each solo outing screen are such that the raising target character goes out to a different destination.

Accordingly, when the solo outing event occurs, the parameters of the raising target character increase. The types and values of the parameters that increase in accordance with the solo outing event are set for every execution pattern of the solo outing event. In this case, the execution patterns include an execution pattern where the condition of the raising target character increases by two levels, and an execution pattern where the condition of the raising target character increases by one level and the endurance thereof increases by a predetermined value. Alternatively, multiple execution patterns where the increase values for the condition and the endurance are different from each other may be provided. Moreover, when the solo outing event occurs, the increase values for the condition and the endurance may be determined by lottery.

Figure 24B:
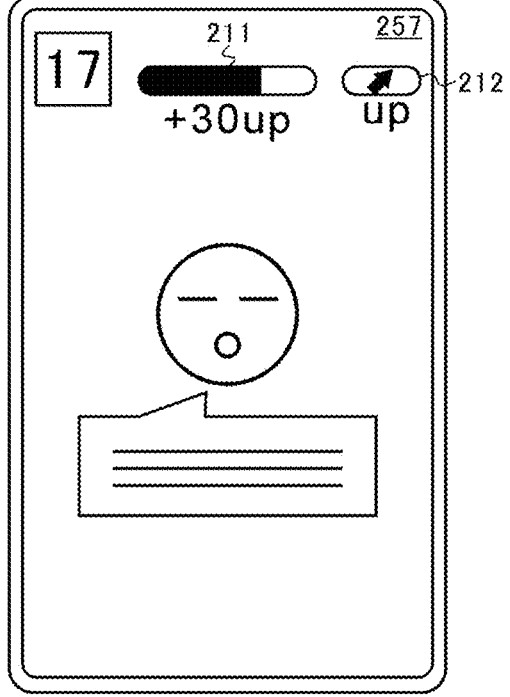
FIG. 24B illustrates a friend outing event screen.

FIG. 24B illustrates a friend outing event screen 257. When the support-character selection operation section 256b is tapped on the outing screen 255, a friend outing event occurs. When the friend outing event occurs, the friend outing event screen 257 is displayed, as shown in FIG. 24B. The friend outing event screen 257 displays a friend character.

FIG. 25 illustrates execution patterns of the friend outing event. In this case, an execution pattern of the friend outing event to be determined is set for every number of occurrences of the friend outing event, that is, every number of outings with a friend character. For each execution pattern of the friend outing event, an effect (bonus) is set, as shown in FIG. 25. The parameters subjected to the effect of the friend outing event are the endurance and condition, similar to the solo outing event.

However, the effect brought about by the friend outing event is greater than the effect brought about by the solo outing event. The effects brought about by the friend outing event and the solo outing event are merely examples. For example, the parameters subjected to the effects of both events may be different from each other. Alternatively, the effects of both events may be the same. Moreover, the effect brought about by the friend outing event may be set to be smaller than the effect brought about by the solo outing event.

As shown in FIG. 24B, the friend outing event screen 257 displays a friend character associated with a support card. On the friend outing event screen 257, the effect brought about by the occurrence of the friend outing event is displayed (i.e., "+30 up" and "up").

There are provided multiple support cards of the friend character type. The friend outing event screen 257 displays different friend characters depending on the types of support cards. Moreover, the execution pattern of the friend outing event that occurs varies depending on the type of support card. However, the effect brought about by the friend outing event may be the same or different among all of the support cards.

The player can organize multiple support cards of the friend character type into a deck. In this case, the outing screen 255 is provided with the support-character selection operation section 256b for each support card of the friend character type.

When a group support card is included in the deck, the player can select a partner to go out with from support characters associated with the group support card. The support characters associated with the group support card will be referred to as "affiliated characters" hereinafter. One group support card is associated with five affiliated characters. These five affiliated characters will be referred to as "first affiliated character", "second affiliated character", "third affiliated character", "fourth affiliated character, and "fifth affiliated character", respectively.

Figure 26A:
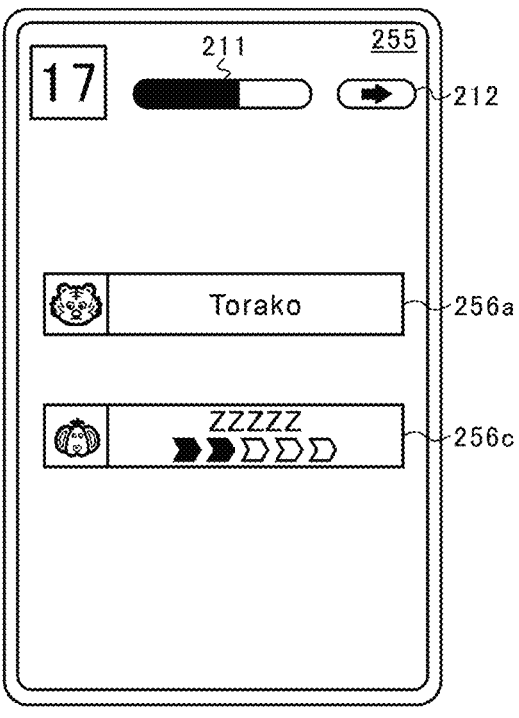
FIG. 26A is a second diagram illustrating the outing screen.
Figures 26B, 26C:
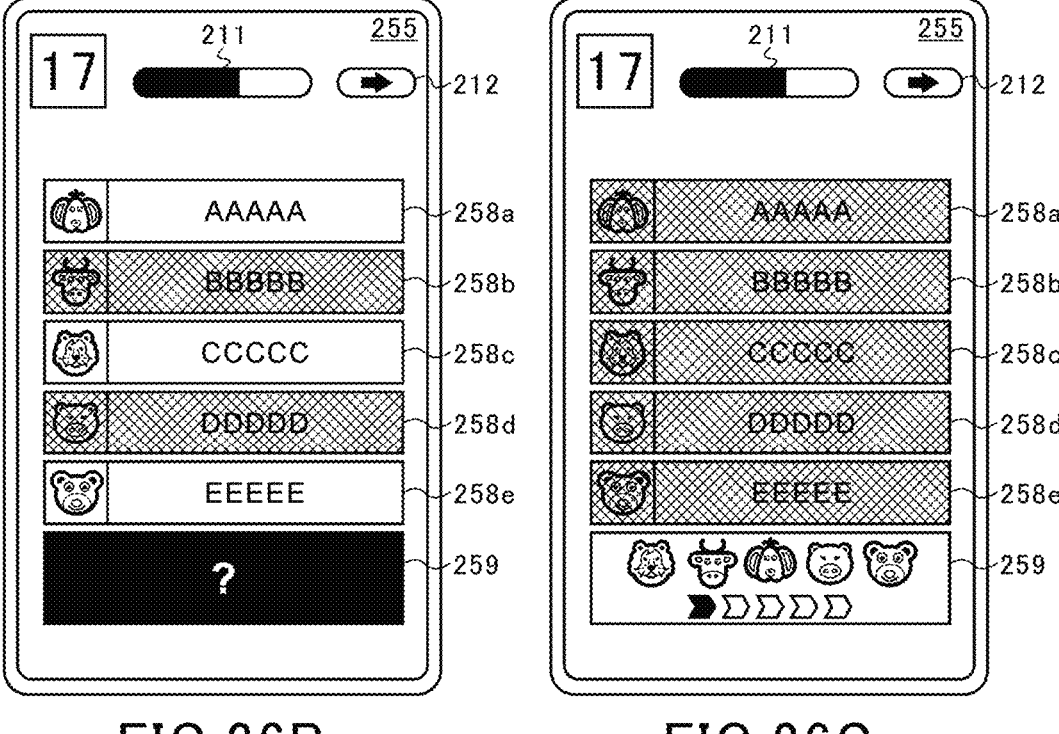
FIG. 26B is a third diagram illustrating the outing screen.
FIG. 26C is a fourth diagram illustrating the outing screen.

FIG. 26A is a second diagram illustrating the outing screen 255. FIG. 26B is a third diagram illustrating the outing screen 255. FIG. 26C is a fourth diagram illustrating the outing screen 255. The outing screen 255 shown in FIG. 26A corresponds to a case where support cards of the friend character type are not included in the deck, and a group support card is included in the deck.

When the group support card is included in the deck, the outing screen 255 displays the raising-target-character selection operation section 256a and a group-support-card selection operation section 256c, as shown in FIG. 26A. When the group-support-card selection operation section 256c is tapped, the outing screen 255 displays a first-affiliated-character selection operation section 258a, a second-affiliated-character selection operation section 258b, a thirdaffiliated-character selection operation section 258c, a fourth-affiliated-character selection operation section 258d, a fifth-affiliated-character selection operation section 258e, and an all-affiliated-character selection operation section 259, as shown in FIG. 26B.

The first-affiliated-character selection operation section 258a, the second-affiliated-character selection operation section 258b, the third-affiliated-character selection operation section 258c, the fourth-affiliated-character selection operation section 258d, and the fifth-affiliated-character selection operation section 258e correspond to the first affiliated character, the second affiliated character, the third affiliated character, the fourth affiliated character, and the fifth affiliated character, respectively. On the other hand, the all-affiliated-character selection operation section 259 corresponds to all of the affiliated characters.

The player can select individual-affiliated-character events that are to occur by tapping on the first-affiliated-character selection operation section 258a to the fifth-affiliated-character selection operation section 258e. In each individual-affiliated-character event, the corresponding affiliated character goes out with the raising target character. However, during a single raising game, one affiliated character can be selected only once. For example, if an outing with the second affiliated character and the fourth affiliated character has already been performed, the second-affiliated-character selection operation section 258b and the fourth-affiliated-character selection operation section 258d are displayed in a grayed-out fashion, as shown in FIG. 26B. The grayed-out operation sections do not accept operations from the player.

Alternatively, the number of times each affiliated character is selectable is not limited to one, and may be two or more. Moreover, the number of times an affiliated character is selectable may vary from affiliated character to affiliated character.

This embodiment is provided with a specific condition based on which the all-affiliated-character selection operation section 259 is selectable. In this case, the specific condition provided is the occurrence of all of the individual-affiliated-character events, that is, an outing with all of the affiliated characters. When the specific condition is not satisfied, the all-affiliated-character selection operation section 259 displays a "?" mark, as shown in FIG. 26B. In this state, the all-affiliated-character selection operation section 259 does not accept an operation from the player.

When the specific condition is satisfied, the all-affiliated-character selection operation section 259 displays all of the affiliated characters, as shown in FIG. 26C. In this state, input of an operation to the all-affiliated-character selection operation section 259 is enabled. The player can repeatedly select the all-affiliated-character selection operation section 259. In other words, the player first needs to go out once with each of the first affiliated character to the fifth affiliated character. Then, when the outing is performed once with all of the affiliated characters, it is subsequently possible to go out with all of the affiliated characters any number of times.

The all-affiliated-character selection operation section 259 indicates the number of times the all-affiliated-character selection operation section 259 has been selected, that is, the number of outings with all of the affiliated characters, by using rightward arrows. As mentioned above, in the case where each affiliated character is selectable two or more times, the number of outings with each affiliated character may be indicated on each of the first-affiliated-character selection operation section 258a to the fifth-affiliated-character selection operation section 258e, similar to the all-affiliated-character selection operation section 259.

Figure 27A:
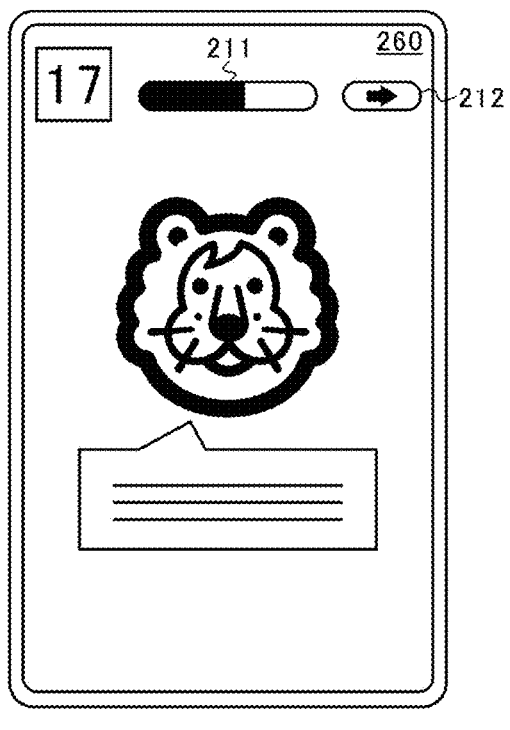
FIG. 27A is a first diagram illustrating an individual-affiliated-character event screen.
Figure 27B:
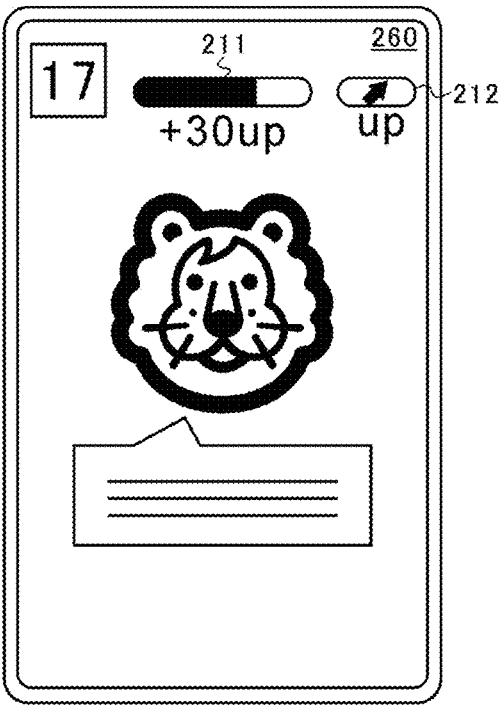
FIG. 27B is a second diagram illustrating the individual-affiliated-character event screen.

FIG. 27A is a first diagram illustrating an individual-affiliated-character event screen 260. FIG. 27B is a second diagram illustrating the individual-affiliated-character event screen 260. For example, it is assumed that the third affiliated character is selected in response to tapping on the third-affiliated-character selection operation section 258c. In this case, as shown in FIG. 27A, the individual-affiliated-character event screen 260 displays the third affiliated character selected by the player. As shown in FIG. 27B, the individual-affiliated-character event screen 260 displays an effect brought about by the occurrence of an individual-affiliated-character event (i.e., "+30 up" and "up").

Since multiple affiliated characters are provided, the number of individual-affiliated-character event screens 260 provided is equal to the number of affiliated characters. In other words, the execution pattern of the individual-affiliated-character event that occurs varies depending on the affiliated character selected by the player.

Figure 27C:
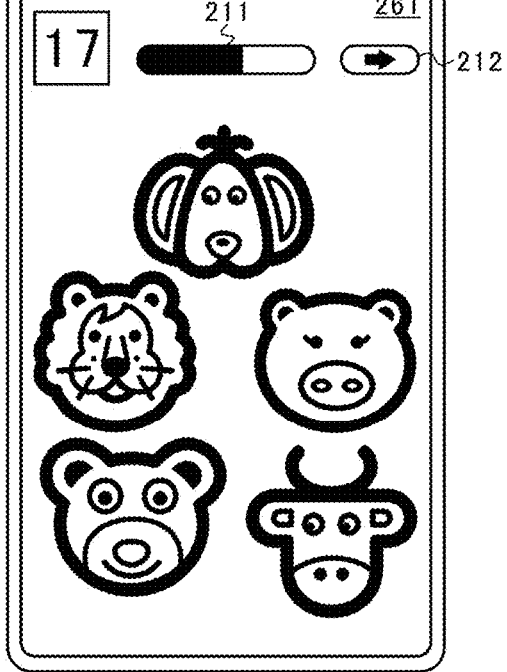
FIG. 27C is a first diagram illustrating an all-affiliated-character event screen.
Figure 27D:
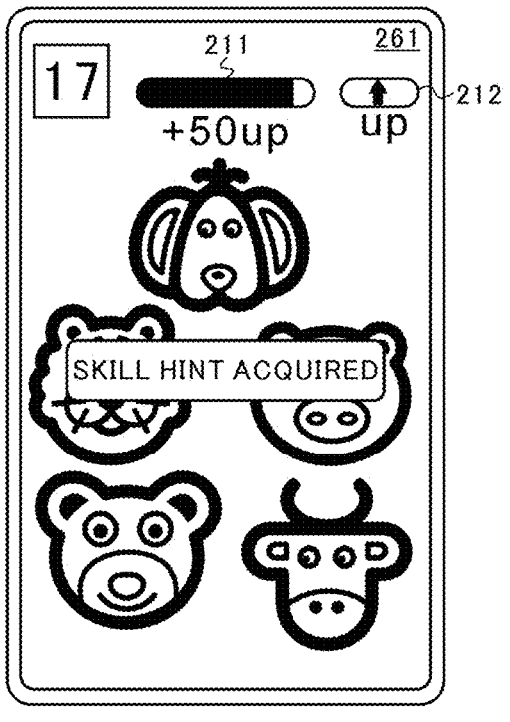
FIG. 27D is a second diagram illustrating the all-affiliated-character event screen.

FIG. 27C is a first diagram illustrating an all-affiliated-character event screen 261. FIG. 27D is a second diagram illustrating the all-affiliated-character event screen 261. It is assumed that all of the affiliated characters are selected in response to tapping on the all-affiliated-character selection operation section 259. In this case, an all-affiliated-character event occurs. When the all-affiliated-character event occurs, the all-affiliated-character event screen 261 is displayed, as shown in FIG. 27C. The all-affiliated-character event screen 261 displays all of the affiliated characters associated with the group support card.

As shown in FIG. 27D, the all-affiliated-character event screen 261 displays the effect brought about by the occurrence of the all-affiliated-character event (i.e., "+50 up, "up", and "skill hint acquired"). Although acquisition of a skill hint by the raising target character is described as the effect brought about by the all-affiliated-character event, possession or acquisition of a skill is also possible.

In this case, the all-affiliated-character event screen 261 displays all of the affiliated characters. However, the details on the all-affiliated-character event screen 261 are not particularly limited. For example, only one of the affiliated characters may be displayed on the all-affiliated-character event screen 261, or two or more of the affiliated characters may be displayed thereon.

FIG. 28 illustrates execution patterns of individual-affiliated-character events and an all-affiliated-character event. As shown in FIG. 28, in each individual-affiliated-character event, the affiliated character selected by the player is displayed on the individual-affiliated-character event screen 260. In the all-affiliated-character event, all of the affiliated characters are displayed on the all-affiliated-character event screen 261.

For each of the execution patterns of the individual-affiliated-character events and the all-affiliated-character event, an effect (bonus) is set, as shown in the drawings. Although a different effect is brought about depending on the execution pattern, the same effect may be brought about by all of the execution patterns. When the all-affiliated-character event occurs, a predetermined skill can be possessed. When the all-affiliated-character event first occurs, a predetermined possessed skill is given. Accordingly, the effect brought about by the all-affiliated-character event is greater than the effect brought about by each individual-affiliated-character event. Alternatively, the effect brought about by the all-affiliated-character event may be the same as or smaller than the effect brought about by each individual-affiliated-character event.

Figure 29A:
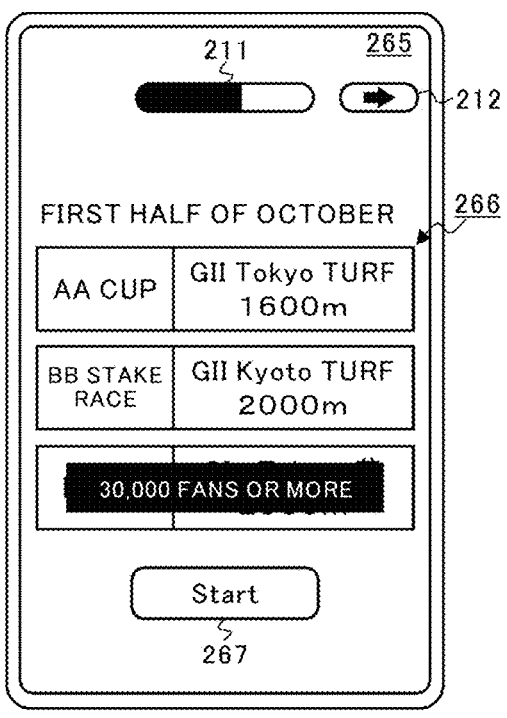
FIG. 29A is a first diagram illustrating an individual-race selection screen.

FIG. 29A is a first diagram illustrating an individual-race selection screen 265. When the individual-race operation section 219 on the game screen 210 is operated, the individual-race selection screen 265 shown in FIG. 29A is displayed. An individual race has gameplay where the raising target character races with an NPC.

The upper part of the individual-race selection screen 265 displays the endurance display section 211 and the condition display section 212. The central part of the individual-race selection screen 265 displays an individual-race selection operation section 266 used for selecting a race category that the raising target character is to participate in. If the individual-race selection screen 265 displays multiple individual-race selection operation sections (sub commands) 261, different individual races are set to the multiple individual-race selection operation sections 266. The lower part of the individual-race selection screen 265 displays a start operation section 267 indicated as "Start". A race that can be selected by using the individual-race selection operation section 266 on the individual-race selection screen 265 is preliminarily set for each turn.

Figure 29B:
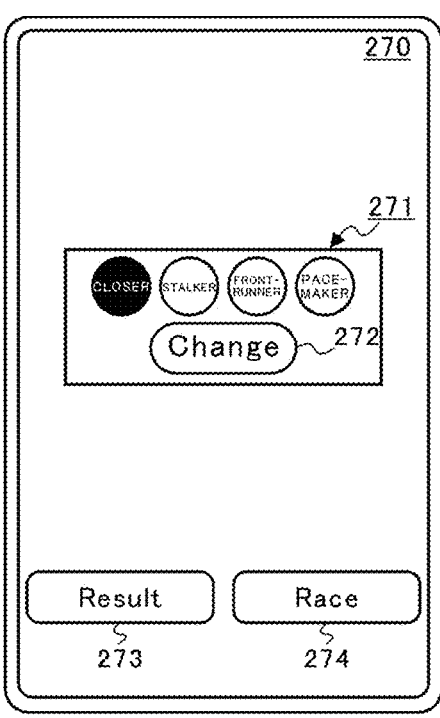
FIG. 29B illustrates an individual-race start screen.

Each race has a preliminarily-set participation condition, and the player can have the raising target character participate in the race so long as the participation condition is satisfied. As mentioned above, some races require a certain number of fans as a participation condition. With regard to a race not satisfying the required number of fans, the participation condition is displayed in the individual-race selection operation section 266, as shown in FIG. 29A, and a notification indicating that the race is not selectable is provided. On a turn where a target race to be cleared is set, only the target race is displayed in a selectable manner on the individual-race selection screen 265. FIG. 29B illustrates an individual-race start screen 270. When the start operation section 267 is operated in a state where the race category of an individual race to participate in is selected in the individual-race selection operation section 266, the individual-race start screen 270 shown in FIG. 29B is displayed. The central part of the individual-race start screen 270 displays a strategy display section 271. The strategy display section 271 displays a currently-selected strategy (closer, stalker, front-runner, or pace-maker) in a highlighted fashion, and also displays a change operation section 272 indicated as "Change". When the change operation section 272 is operated, a strategy change screen (not shown) is displayed on the display 26. By performing an operation on the strategy change screen, the player can change the strategy in the individual race to an arbitrary strategy.

The lower part of the individual-race start screen 270 displays a result operation section 273 indicated as "Result" and a race operation section 274 indicated as "Race".

When the race operation section 274 is operated, a race screen (not shown) is displayed on the display 26. The display 26 displays a video (referred to as "race video" hereinafter) showing the progress of the race.

Figure 29C:
FIG. 29C is a first diagram illustrating an individual-race-result screen.
Figure 29D:
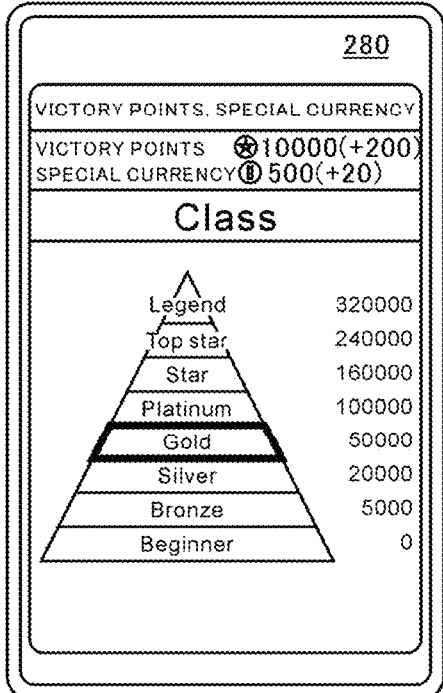
FIG. 29D is a second diagram illustrating the individual-race-result screen.

FIG. 29C is a first diagram illustrating an individual-race-result screen 280. FIG. 29D is a second diagram illustrating the individual-race-result screen 280. When the playback of the aforementioned race video ends and the result operation section 273 is operated, the individual-race-result screen 280 is displayed on the display 26. As shown in FIG. 29C, the individual-race-result screen 280 displays the finished place of the raising target character in the individual race. Furthermore, as shown in FIG. 29D, the individual-race-result screen 280 displays the current class of the raising target character.

In this embodiment, class placement of the raising target character is performed in accordance with the number of acquired fans. Each class has a set range for the number of fans, and the raising target character is classified into any of eight levels of classes in accordance with the number of fans. The individual-race-result screen 280 displays the number of fans, victory points, and special currency acquired in the current individual race. Furthermore, the individual-race-result screen 280 displays the cumulative number of fans obtained by adding the number of newly-acquired fans to the number of previously-acquired fans. Moreover, the current class corresponding to the cumulative number of fans is displayed in a distinguishable manner. The individual-race-result screen 280 also displays cumulative victory points obtained by adding the newly-acquired victory points to the previously-acquired victory points, as well as a cumulative special-currency numerical value obtained by adding the newly-acquired special currency to the previously-acquired special currency.

Figure 30:
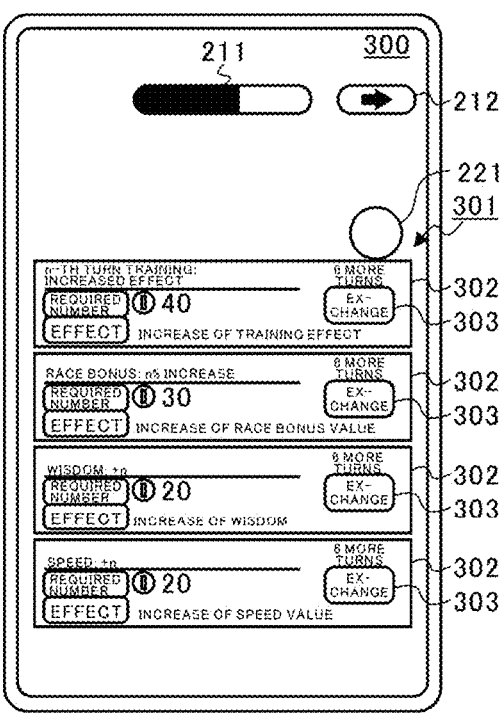
FIG. 30 illustrates an example of an item exchange screen.

FIG. 30 illustrates an example of an item exchange screen 300. For example, when the shop operation section 220 is tapped on the game screen 210 shown in FIG. 20A, the item exchange screen 300 shown in FIG. 30 is displayed. On the item exchange screen 300, the player can exchange the special currency acquired by the player with a predetermined item displayed on the item exchange screen 300. On the game screen 210 shown in FIG. 20A, the sum total of the special currency possessed by the player may be displayed in a superposed fashion at the lower part of the shop operation section 220.

As shown in FIG. 30, the item exchange screen 300 displays the item operation section 221 and an item exchange list 301. The item exchange list 301 displays one or more item exchange tabs 302.

Each item exchange tab 302 displays the name (item name) of an item exchangeable by the player, the effect of the item, the required number of special currency required for the exchange, an indication of the exchange deadline, and an item-exchange operation section 303. The exchange deadline is indicated in each item exchange tab 302 and is indicated as, for example, the number of remaining turns where exchange is possible by the player from the current turn. On the item exchange screen 300, items are interchanged every fixed time period (predetermined turn). The exchange deadline is the number of remaining turns until this interchanging of items is performed. Furthermore, in the item exchange, a lottery may be performed on every turn during the raising game, and a sale may occur at a fixed probability. A time period in which a sale occurs is, for example, a period between a turn where the sale occurs and a turn where the subsequent interchanging of the items is performed. During the sale period, the required number of special currency required for the item exchange is smaller than that outside the sale period.

Examples of the items exchangeable by the player include a parameter changing item, a status adding item, a training-level changing item, a skill-hint acquiring item, a character reallocation item, a training-effect changing item, an endurance consumption item, a failure-rate changing item, and an event-parameter changing item.

The parameter changing item is an item for changing a parameter of the raising target character. For example, the parameter changing item increases the value of a target parameter of the raising target character among the parameters related to speed, stamina, power, spirit, wisdom, endurance, endurance upper limit value, condition, skill points, and the number of fans by a predetermined value.

The status adding item is an item for adding a status to the raising target character. For example, the status adding item adds an advantageous status or a disadvantageous status to the raising target character. Examples of an advantageous status include a status that increases an increase amount of each parameter of the raising target character and a status that decreases the consumption amount of skill points required for acquiring a skill. Examples of a disadvantageous status include a status that causes an event to occur, such as a decrease of each parameter of the raising target character, and a status that impedes an increase of each parameter.

The training-level changing item is an item for changing the training level of each training item. For example, the training-level changing item increases the training level of a target training item among the training items related to speed, stamina, power, spirit, and wisdom by a predetermined value.

The skill-hint acquiring item is an item that causes the raising target character to possess or acquire a skill by causing a skill event to occur. For example, the skill-hint acquiring item can cause the raising target character to possess or acquire various skills shown in FIG. 6C.

The character reallocation item is an item for reallocating a character allocated to predetermined training shown in FIGS. 21A and 21B to another training. Character reallocation will be described later.

The training-effect changing item is an item for changing the training effect of training during a fixed time period. In detail, the training-effect changing item increases a fixed increase value, to be described later, of an attribute parameter of the raising target character in accordance with training by a predetermined value during a fixed period. For example, the training-effect changing item increases the fixed increase value of an attribute parameter in accordance with target training among the training items (speed, power, spirit, stamina, and wisdom) by n % during an n-th turn.

The endurance consumption item is an item for increasing the training effect by increasing the consumption amount of endurance consumed in training. In detail, the endurance consumption item increases a fixed increase value, to be described later, of an attribute parameter of the raising target character in accordance with training by a predetermined value. The endurance consumption item can increase the training effect by being used together with the training-effect changing item.

The failure-rate changing item is an item for changing the failure rate of a target training item. For example, the failure-rate changing item decreases the failure rate of target training among the training items (speed, power, spirit, stamina, and wisdom) by a predetermined value.

The event-parameter changing item is an item for changing a parameter change value of the raising target character. The parameter change value is to be added when an event occurs after a race. For example, the event-parameter changing item increases a target parameter change value of the raising target character among the parameters related to speed, stamina, power, spirit, wisdom, endurance, endurance upper limit value, condition, skill points, and the number of fans by a predetermined value.

The item exchange list 301 shown in FIG. 30 displays an example of the training-effect changing item, the event-parameter changing item, and the parameter changing item. When the item-exchange operation section 303 in each item exchange tab 302 is tapped, the required number of special currency indicated in the item exchange tabs 302 is subtracted from the cumulative value of the special currency acquired by the player. At the same time, the item indicated in the item exchange tab 302 is given to the player.

The items exchangeable using the item exchange tabs 302 include items whose number of exchanges (i.e., number of purchases) are limited to a predetermined value or smaller. When the number of additions of a limited item reaches an upper limit, the player cannot exchange the special currency with the limited item even if the player has the special currency.

When the item operation section 221 is tapped, an item usage screen (not shown) is displayed on the display 26. The item usage screen displays a list of items possessed by the player. The list of items includes an item exchanged on the item exchange screen 300. In other words, the item usage screen displays an item given to the player in exchange for the special currency. The item usage screen may display an item obtained in each event. The player can tap on each item displayed on the item usage screen to use the item.

In this embodiment, the player can use various items exchanged for the special currency by operating the item operation section 221. When each item is used, for example, the training screen 240 shown in FIG. 21A may display an icon indicating the effect currently exhibited as a result of using the item. In this case, the lower part of the icon may also display the effect-exhibiting turn number on which the effect is exhibited as a result of using the item. As shown in FIG. 30, each item has an exchangeable period set therefor. The player can exchange each item and the special currency with each other within the exchangeable period set for the item. Alternatively, each item does not have to be provided with an exchangeable period.

Figure 31:
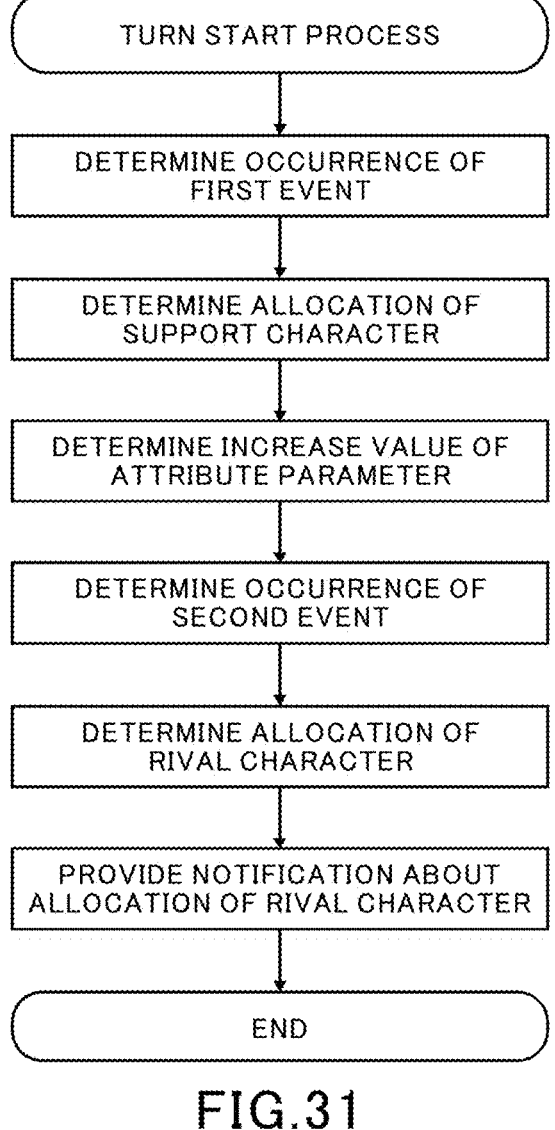
FIG. 31 illustrates the general flow of a turn start process.

FIG. 31 illustrates the general flow of a turn start process. The raising stage process includes the turn start process to be executed at the start of each turn in the raising game. Although the turn start process will be described in detail later, the general flow of the turn start process will be described here.

During the main raising game, a process for determining whether or not to cause each event to emerge is performed on each turn. Each event is generally classified as one of three types, which are a scenario event, the aforementioned owned character event provided for each raising target character, and a support event. For each scenario, a scenario event, an owned character event, and a support event that may emerge during the main raising game are set in advance.

A scenario event refers to an event set for every scenario of the main raising game. In this embodiment, multiple scenarios are provided, and the player can select any of the scenarios. A scenario event emerges in every scenario selected by the player. In other words, a scenario event emerging in the main raising game is determined based on the scenario selected by the player.

A scenario-specific event and a scenario-common event may be provided as scenario events. A scenario-specific event refers to an event associated with only one scenario. For example, a scenario-specific event associated with a first scenario emerges only when the first scenario is selected and does not emerge when other scenarios are selected.

A scenario-common event refers to an event that emerges commonly among multiple scenarios. Therefore, a scenario-common event emerges both when a first scenario is selected and when a second scenario is selected.

It is assumed here that the scenario-specific event and the scenario-common event are provided as the scenario events.

Alternatively, only one of the scenario-specific event and the scenario-common event may be provided.

As mentioned above, an owned character event refers to an event preliminarily set for every character. In the main raising game, an owned character event for a character registered by the player as the raising target character in the setting game, that is, the preparation stage process, emerges.

As mentioned above, a support event refers to an event preliminarily set for every support card. In the main raising game, a support event associated with a support card registered by the player in the setting game emerges. A support event includes a first event that may occur at the start of a turn and a second event that may occur upon execution of training. It is determined at the start of a turn whether or not the first event is to occur based on a randomly-acquired random number and a first event table.

It is determined whether or not the second event is to occur based on a randomly-acquired random number and a second event table after a process for determining each support character allocated to training is performed. It is determined whether or not the second event is to occur with respect to an allocated support character only when the support character is allocated to training.

In this embodiment, it is assumed that the first event is selected by lottery from the support events associated with the support cards registered in the deck by the player in the preparation stage process. Alternatively, a support event associated with a support card selected by lottery from all of the support cards included in the game may be selected. In this case, the selection probability of a support event associated with a support card registered in the deck may be higher than the selection probability of a support card event associated with a support card not registered in the deck.

Accordingly, with regard to the scenario event, the emergence thereof is determined based on the scenario. With regard to each of the owned character event and the support event, the emergence thereof is determined based on the raising target character or the support card. Each event type is classified in accordance with information to be referred to when determining the emergence of the event.

In contrast, in this embodiment, each event is classified as any of six event categories in accordance with the details brought about by the emergence of the event. In this case, each event is classified as any of event categories including a first hint event, a second hint event, a first attribute event, a second attribute event, an aptitude event, and a story event.

As mentioned above, each of the first hint event and the second hint event refers to an event that allows for possession or acquisition of a skill. Each of the first attribute event and the second attribute event refers to an event that causes an attribute parameter of the raising target character to increase or decrease. The aptitude event refers to an event that causes an aptitude parameter of the raising target character to increase or decrease. The story event refers to an event involving displaying a story related to a character appearing in the raising game. In addition to displaying a story, the story event may involve changing an attribute parameter or an aptitude parameter. The aforementioned outing event (the solo outing event, the friend outing event, the individual-affiliated-character event, or the all-affiliated-character event) corresponds to the story event.

In addition to the process for determining a scenario event and the process for determining an owned character event, the turn start process in this embodiment includes a "process for determining the occurrence of a first event", a "process for determining support-character allocation", a "process for determining an increase value of an attribute parameter", a "process for determining the occurrence of a second event", a "process for determining rival-character allocation", and a "process for providing a notification about rival-character allocation" that are shown in FIG. 31. Although other various processes are executed in the turn start process, the processes shown in FIG. 31 will be sequentially described here.

[Process for Determining Occurrence of First Event]

The first event is selected by lottery from the support events (first events) associated with the support cards registered by the player in the preparation stage process. In detail, at the start of a turn, a random number is randomly acquired, and the occurrence or non-occurrence of the first event and the details of the first event are determined based on the acquired random number and the first event table.

[Process for Determining Support-Character Allocation]

FIG. 32 illustrates an allocation table. As shown in FIG. 32, the allocation table has a selection ratio of training-item allocation ("allocate to training item" or "not allocate") for a support character. In this embodiment, it is determined whether or not allocation is to be completed for all of the support cards (support characters) registered by the player in the preparation stage process based on the allocation table shown in FIG. 32.

In detail, as shown in FIG. 32, in this embodiment, for the support character, an "allocate" option to any of the training items "speed", "stamina", "power", "spirit", and "wisdom" is selected at a probability of 16%, and a "not allocate" option to any of the training items is selected at a probability of 20%. As mentioned above, for a support card set to specialty training, a correction is performed such that the specialty training is selected at a higher probability than the other training items.

When the training item to which the support character is allocated is set, the support character set for the allocation and the set training item may be associated with each other and be stored in the server 1000. In more detail, association information in which a training ID indicating the type of the training item is associated with the character ID of the support character or the support card ID of the support card associated with the support character may be stored in the server 1000.

[Process for Determining Increase Value of Attribute Parameter]

FIG. 33A illustrates a training level table. As shown in FIG. 33A, a training level is set to increase in accordance with the number of times each type of training is selected. In detail, when the number of times each type of training is selected is three or smaller, the training level related to "Speed", "Stamina", "Power", "Spirit", and "Wisdom" is set to "Level 1". When the number of times each type of training is selected is four or larger and seven or smaller, the training level is set to "Level 2". When the number of times each type of training is selected is eight or larger and 11 or smaller, the training level is set to "Level 3". When the number of times each type of training is selected is 12 or larger and 15 or smaller, the training level is set to "Level 4". When the number of times each type of training is selected is 16 or larger, the training level is set to "Level 5".

In this embodiment, when training selected by the player is successfully executed, predetermined attribute parameter values increase in accordance with the executed training item.

In detail, in this embodiment, when training for "Speed" is successfully executed, the attribute parameter values of "Speed" and "Power" increase.

When training for "Stamina" is successfully executed, the attribute parameter values of "Stamina" and "Spirit" increase.

When training for "Power" is successfully executed, the attribute parameter values of "Stamina" and "Power" increase.

When training for "Spirit" is successfully executed, the attribute parameter values of "Speed", "Power", and "Spirit" increase.

When training for "Wisdom" is successfully executed, the attribute parameter values of "Speed" and "Wisdom" increase.

In this embodiment, each attribute parameter value that increases when the corresponding training is successful is calculated by adding the fixed increase value to a value that is obtained by multiplying a fixed increase value determined in correspondence with the executed training item and the training level by a bonus addition rate, to be described later.

FIG. 33B illustrates a fixed-increase-value (speed) table. FIG. 33C illustrates a fixed-increase-value (power) table. Specifically, FIG. 33B indicates fixed increase values when the training item is "Speed". FIG. 33C indicates fixed increase values when the training item is "Power".

As shown in FIG. 33B and FIG. 33C, the fixed-increase-value tables have stored therein fixed increase values determined in correspondence with the executed training items and the training levels. In this embodiment, as shown in FIG. 33B and FIG. 33C, each attribute parameter is set to increase significantly as the training level becomes higher. Although descriptions will be omitted here, fixed-increase-value tables for when "Stamina", "Spirit", and "Wisdom" are selected as training items are also provided.

In addition to the fixed increase value mentioned above, a bonus addition rate is determined based on the support card (support character) allocated to each training item. A bonus addition rate is set when the aforementioned friendship training occurs.

FIG. 33D illustrates the bonus addition rate. In this embodiment, it is determined whether or not the friendship-training occurrence condition is satisfied for every support card (support character) determined as being allocated to each type of training. For a support card having undergone the determination that the friendship-training occurrence condition is satisfied, a bonus addition rate is set.

In detail, for a group support card, a bonus addition rate of 10% is set in accordance with the occurrence of friendship training. For a support card other than a group support card, a bonus addition rate of 20% is set. The bonus addition rate may vary based on the type of support card and the bond gauge value. For example, the bonus addition rate may increase with increasing bond gauge value.

Then, a value obtained by multiplying the fixed increase value determined in accordance with the fixed-increase-value table by the bonus addition rate is derived as a bonus addition value. A value obtained by adding the bonus addition value to the fixed increase value is determined as the amount of increase in the attribute parameter value when the training is successful. With regard to training to which multiple support characters are allocated, the bonus addition value of each of the multiple allocated support characters is added to the fixed increase value. Accordingly, the amount of increase in each attribute parameter of the raising target character when the training is successful is determined for all types of training.

[Process for Determining Occurrence of Second Event]

FIG. 34 illustrates the second event table. The second event is selected by lottery from the support events (second events) associated with the support cards corresponding to the support characters allocated to the respective training items. In detail, after the "process for determining support-character allocation", a random number is randomly acquired, and the occurrence or non-occurrence of the second event is determined based on the acquired random number and the second event table. The second event table has set therein a selection ratio for causing the second event to "occur" or "not occur".

For example, as shown in FIG. 34, a second event associated with a predetermined support card includes four types of events, namely, event A, event B, event C, and event D. For example, in the second event table, a probability for causing each of the events (events A to D) to "occur" is set to 5%, and a probability for causing the second event to "not occur" is set to 80%. The selection ratio for the second event may be set individually for every support card, that is, every support character.

In this embodiment, after the "process for determining support-character allocation", a process for determining the occurrence of the second event is performed for all of the support characters allocated to the respective training items. Based on the determination about the occurrence of the second event, the event notification indication 247 is displayed on the training screen 240.

If the player selects training to which a support character having undergone the determination about the occurrence of the second event is allocated, the second event occurs upon execution of the training. For example, if it is determined that the second hint event of the support character allocated to speed training is to emerge, when the speed training is executed, the second hint event always emerges upon execution of the training.

However, when another type of training other than speed training is executed, this second hint event does not emerge upon execution of the training. If it is determined that second events are to occur for two or more support characters allocated to the same type of training, it is determined which of the second events is caused to occur by lottery or in accordance with preset priority levels for the support events. In other words, multiple second events do not occur on a single turn.

For example, it is determined which of multiple second events is to occur at an equal probability. Alternatively, weights may be set in accordance with the types of second events, and it may be determined which of multiple second events is to occur in accordance with the set weights. If it is determined that second events are to occur for two or more characters, all of the second events having undergone the determination may be caused to occur.

For example, when it is determined that a second event is to emerge, emergence information indicating the emergence or non-emergence of a support event may be associated with a support card or support character associated with the second event, and may be stored in the server 1000. In more detail, association information in which the emergence information is associated with the character ID of the support character or with the support card ID of the support card associated with the support character may be stored in the server 1000.

When the "process for determining the occurrence of a first event", the "process for determining support-character allocation", the "process for determining an increase value of an attribute parameter", and the "process for determining the occurrence of a second event" described above are executed and the training operation section 216 is operated, for example, the training screen 240 shown in FIG. 21B is displayed on the display 26.

As mentioned above, the training screen 240 shown in FIG. 21B displays two types of allocated character icons 248 allocated to the stamina training item in accordance with the "process for determining support-character allocation".

On the training screen 240, the increase value of each attribute parameter determined in accordance with the "process for determining an increase value of an attribute parameter" is displayed in the status display section 213. Moreover, the training screen 240 displays the event notification indication 247 for providing a notification about the second event determined in the "process for determining the occurrence of a second event".

Accordingly, each support card is provided with at least a first event and a second event as support events. However, depending on the type of support card, another event may be further provided in addition to the first event and the second event. In this embodiment, the group support card is associated with the following events.

FIG. 35 illustrates events associated with the group support card. The events associated with the group support card are categorized into a first event, an initial event, a continuous event, an outing event, and a second event. The occurrence conditions and the effects of the events shown in FIG. 35 are merely examples.

Similar to the other support cards, the first event of the group support card occurs by being selected by lottery at the start of a turn. When this first event occurs, various parameters, such as an attribute parameter, increase. Although a detailed description will be omitted, the first event of the group support card is roughly divided into a repetitive event and a single event. A repetitive event may occur multiple times during a single raising game. A single event may occur only once during a single raising game.

The initial event of the group support card is an event that allows a continuous event, to be described later, to occur. The initial event is provided with two occurrence conditions, namely, a first occurrence condition and a second occurrence condition. As the first occurrence condition, the initial event has not occurred, and training to which the group support card is allocated is executed. As the second occurrence condition, the initial event has not occurred, and the initial event is selected by lottery.

In other words, the initial event occurs when joint training to which the group support card is allocated is executed or the initial event is selected by lottery in a state where the initial event has not occurred in the main raising game. Therefore, the initial event occurs only once during a single raising game. According to the first occurrence condition, the initial event always occurs when the joint training is executed first. The initial-event lottery is executed on every turn in a state where the initial event has not occurred. The initial-event lottery is also executed when the group support card is not included in the deck.

The initial-event lottery may be executed only if the group support card is included in the deck. If not included in the deck, the group support card may be allocated to any type of training by being selected by predetermined lottery.

The continuous event of the group support card is an event in which an outing mode can be set. In the outing mode, it is possible to go out with an affiliated character associated with the group support card. As an occurrence condition for the continuous event, the initial event has already occurred, and the continuous event is selected by lottery. The selection probability in the continuous-event lottery varies depending on the bond gauge value of the group support card. For example, the selection probability in the continuous-event lottery is 5% when the bond gauge value is smaller than 40, 10% when the bond gauge value is 40 or larger and smaller than 80, and 15% when the bond gauge value is 80 or larger.

Although a detailed description will be omitted, the continuous event is a story event and allows the player to select any of multiple options in a story. When a predetermined option is selected, the outing mode is set thereafter until the main raising game being played ends.

However, the details of the continuous event are not limited to the above. For example, when the continuous event occurs, the outing mode may always be set. The continuous event may occur repeatedly or may occur only once. If the continuous event is set to occur only once, unless the player selects the predetermined option when the continuous event occurs, the outing mode is not set thereafter.

The outing event of the group support card includes the individual-affiliated-character event and the all-affiliated-character event described above. As an occurrence condition for the individual-affiliated-character event, any of the first-affiliated-character selection operation section 258a to the fifth-affiliated-character selection operation section 258e is selected on the outing screen 255 in the outing mode. In other words, the individual-affiliated-character event occurs when any of the affiliated characters is selected after the outing mode is set. The occurrence of the individual-affiliated-character event causes the endurance and the condition of the raising target character to increase.

As an occurrence condition set for the all-affiliated-character event, all of the affiliated characters are selected, that is, an outing with all of the affiliated characters has been performed. The occurrence of the all-affiliated-character event causes the endurance and the condition of the raising target character to increase. When the all-affiliated-character event occurs for the first time, the raising target character possesses a possessed skill.

Accordingly, in order to cause the outing event of the group support card to occur, it is necessary to cause the initial event and the continuous event to occur sequentially. As the continuous event occurs, the outing mode is set, so that it becomes possible to go out with an affiliated character thereafter.

In order to cause the outing event to occur, it is necessary to cause the initial event and the continuous event to occur, and to further set to the outing mode. Alternatively, for example, if the group support card is included in the deck, an outing event associated with the group support card may occur from the start of the main raising game or from a predetermined turn number.

The second event of the group support card has a different occurrence condition from the other support cards. In detail, as an occurrence condition for the second event, a continuous event has occurred, training to which the group support card is allocated is executed, and the occurrence thereof is selected by lottery. As an alternative to or in addition to the condition where the continuous event has occurred, the occurrence condition may include a condition where the outing mode is set. The occurrence of the second event causes various parameters, such as an attribute parameter, to increase. Similar to the first event, the second event is also roughly divided into a repetitive event and a single event.

Accordingly, the support events of the group support card are provided with an initial event, a continuous event, and an outing event that are different from those of the other support cards. The outing event includes an individual-affiliated-character event provided for every affiliated character, and the player can select any of the individual-affiliated-character events. Accordingly, the player can cause a preferred affiliated character to be displayed in the individual-affiliated-character event. In particular, the group support card is associated with multiple affiliated characters. Therefore, in a state where the number of support cards that can be included in the deck is limited, a larger number of characters can be displayed. This diversifies the game outcome and enhances the player's motivation for playing the game.

When an outing with all of the affiliated characters is performed, an all-affiliated-character event can occur. Accordingly, the player is motivated to cause all of the individual-affiliated-character events to occur, thereby further enhancing the enjoyment of the game.

Furthermore, in this embodiment, a bonus zone (bonus segment) may be set based on the group support card. In the bonus zone, the player can advantageously proceed with the raising game. The bonus zone will be described below.

FIG. 36 illustrates the bonus zone. In a case where the outing mode is set, when training to which the group support card is allocated is executed, a bonus-zone occurrence lottery is performed. When selection is made in the bonus-zone occurrence lottery, the bonus zone commences. However, the bonus-zone occurrence lottery is not performed in the bonus zone. Therefore, a non-bonus-zone state can be regarded as an occurrence condition for the bonus zone.

When joint training to which the group support card is allocated is executed after the outing mode is set, the bonus zone commences at a probability of 1/10. The bonus zone commences on a turn subsequent to the turn on which the joint training associated with the group support card is executed. When the bonus zone commences, a poor condition of the raising target character is resolved as an effect. Although a detailed description will be omitted, a poor condition refers to a state where the progress of the main raising game set for the raising target character is disadvantageous.

The bonus zone is basically set assuming that the group support card is included in the deck. However, as mentioned above, even if the group support card is not included in the deck, the initial event occurs when the initial event is selected by lottery, and the continuous event can subsequently occur and the outing mode can be subsequently set. Accordingly, when the outing mode is set and the group support card not included in the deck is allocated, the bonus zone may possibly occur. Although the selection probability in the bonus-zone occurrence lottery is 10%, the selection probability is settable, as appropriate.

In the bonus zone, effects are brought about, including the raising target character not being in a poor condition and a further increase in effect, such as an increase in attribute parameter in accordance with the occurrence of the second event. When the training to which the group support card is allocated is executed in the bonus zone, friendship training based on the group support card occurs, and the effect, such as an increase in attribute parameter, further increases. In this case, bonus entertainment that emerges only in the bonus zone is executed. In other words, the emergence of the bonus entertainment provides a notification about the occurrence of the friendship training and the increase in the training effect.

The bonus zone is provided with a termination condition. When the termination condition is satisfied, the setting of the bonus zone is canceled. The termination condition includes selection of cancellation by lottery and a lapse of five turns after the occurrence of the bonus zone. The cancellation lottery is executed on one of second to fourth turns after the occurrence of the bonus zone. Therefore, the bonus zone continues for five turns at the longest and ends on one turn at the shortest.

Although the selection probability of the cancellation lottery is 50%, the selection probability is settable, as appropriate. Moreover, the cancellation lottery is not mandatory. For example, the termination condition for the bonus zone may be provided with only the number of turns till the end of the bonus zone.

Figures 37A, 37B:
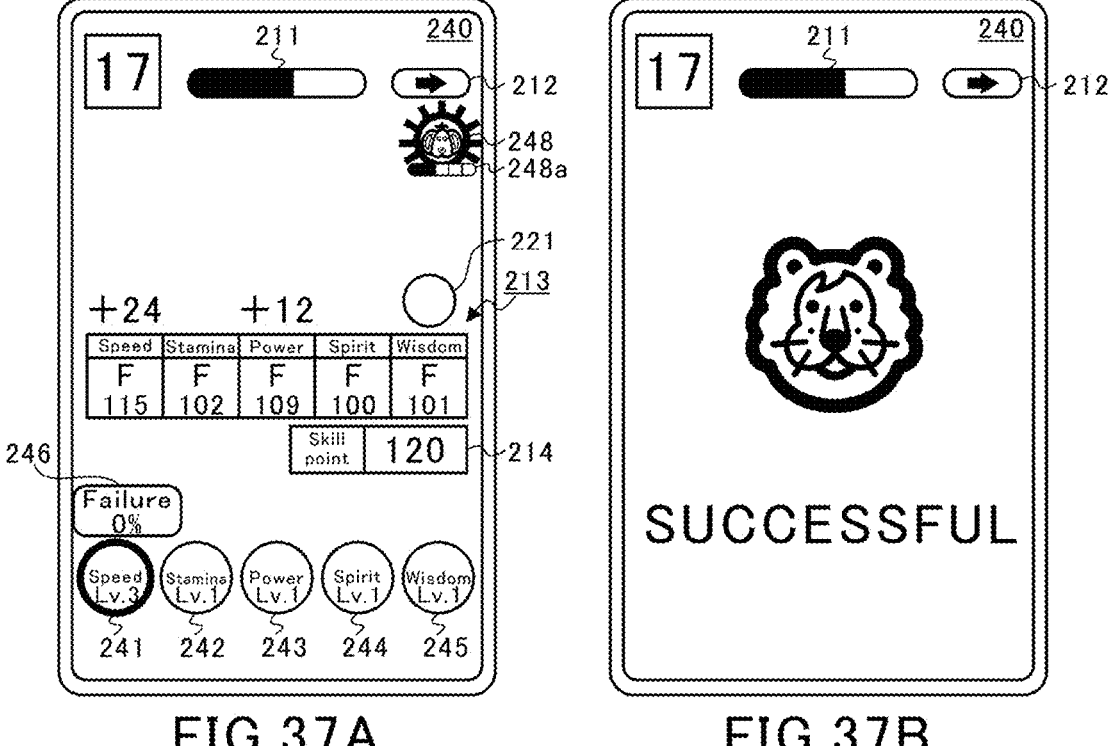
FIG. 37A illustrates an allocated character icon of the group support card.
FIG. 37B illustrates bonus entertainment.

FIG. 37A illustrates the allocated character icon 248 of the group support card. FIG. 37B illustrates the bonus entertainment. As mentioned above, the group support card is associated with multiple affiliated characters, but there is only one type of allocated character icon 248 corresponding to the group support card. The allocated character icon 248 corresponding to the group support card displays the first affiliated character.

In the bonus zone, when the group support card is allocated to training, the training to which the group support card is allocated is selected and executed, so that friendship training based on the group support card can occur. In this case, friendship training can also occur with respect to any of the training items. In the state where friendship training can occur, the allocated character icon 248 is displayed in a highlight fashion by an effect, as shown in FIG. 37A. FIG. 37A illustrates a state where the group support card is allocated to speed training. In this case, an increase value of each attribute parameter when the speed training is successful is displayed near the status display section 213. Each increase value displayed has added thereto a bonus addition value according to the occurrence of friendship training.

When the speed training is selected in the state shown in FIG. 37A, friendship training based on the group support card occurs. When the training is successful, bonus entertainment is executed. In the bonus entertainment, an affiliated character is displayed, and a notification about the successful training is provided, as shown in FIG. 37B.

The bonus entertainment is provided with multiple execution patterns. In this embodiment, a bonus-entertainment execution pattern is provided for each affiliated character. Since five affiliated characters are associated with one group support card, the bonus entertainment is provided with five execution patterns. In each execution pattern, one affiliated character is always displayed, and the voice of the displayed affiliated character is output.

When friendship training based on the group support card occurs, the bonus-entertainment execution pattern is set by lottery. Specifically, when friendship training (bonus event) occurs, any one of the multiple affiliated characters associated with the group support card (predetermined game medium) is set as a character displayed in the bonus entertainment. Accordingly, the set affiliated character is displayed in the bonus entertainment.

Alternatively, for example, the bonus-entertainment execution pattern may be selected in accordance with a preset sequence instead of by lottery. Furthermore, although a bonus-entertainment execution pattern is provided for each affiliated character, only a bonus-entertainment execution pattern corresponding to some of the affiliated characters may be provided. As another alternative, a bonus-entertainment execution pattern displaying multiple affiliated characters may be provided.

Accordingly, in the bonus entertainment, any one of the multiple affiliated characters is displayed. Consequently, even when the number of support cards that can be included in the deck is limited, the game outcome can be diversified, and the player's motivation for playing the game can be enhanced. Furthermore, in the bonus zone, entertainment different from that in a non-bonus zone can be executed as bonus entertainment, so that a bonus, such as an increase in the increase value of a parameter, is added. Accordingly, the player's motivation for playing the game can be further enhanced.

[Process for Determining Rival-Character Allocation]

The turn start process involves determining whether or not to allocate a rival character. A rival character is an NPC that emerges in an individual race and that competes with the raising target character in the individual race. A rival character has the same character ID as a normal NPC (referred to as "normal NPC" hereinafter) that emerges in a normal individual race in which a rival character has not emerged.

A rival character has higher parameters than a normal NPC. For example, a rival character has an attribute parameter with an attribute parameter value that is predetermined times (e.g., 1.1 times) that of a normal NPC having the same character ID. Therefore, an individual race where a rival character has emerged has gameplay where the rival character and the raising target character compete for rankings (i.e., first place).

FIG. 38 illustrates an allocation table. As shown in FIG. 38, the allocation table has a selection ratio of allocation ("allocate" or "not allocate") for the rival character. In this embodiment, it is determined whether or not allocation is to be performed for the rival character based on the allocation table shown in FIG. 38.

In this embodiment, the rival-character allocation is executed in a case where individual races emerging on the current turn include a race in which the aptitude parameters related to the racetrack aptitude and the distance aptitude of the current raising target character are higher than or equal to a predetermined value (e.g., higher than or equal to C). Therefore, the "process for determining rival-character allocation" involves first determining whether the individual races (race categories) emerging on the current turn include a race (referred to as "compatible race" hereinafter) in which the aptitude parameters related to the racetrack aptitude and the distance aptitude of the current raising target character are higher than or equal to the predetermined value.

As shown in FIG. 38, in this embodiment, with regard to the rival character, the selection ratio is changed in accordance with the difficulty level of the compatible race. In detail, as shown in FIG. 38, with regard to the rival character, if the difficulty level (grade) of the compatible race is GI, the "allocate" option is selected at a probability of 60%, and the "not allocate" option is selected at a probability of 40%.

With regard to the rival character, if the difficulty level of the compatible race is GII, the "allocate" option is selected at a probability of 50%, and the "not allocate" option is selected at a probability of 50%. With regard to the rival character, if the difficulty level of the compatible race is GIII, the "allocate" option is selected at a probability of 40%, and the "not allocate" option is selected at a probability of 60%. The selection ratio for the rival character does not have to be changed in accordance with the difficulty level of the compatible race. For example, the selection ratio for the rival character may be uniform regardless of the difficulty level of the compatible race.

When the rival-character allocation is determined, the type (character ID) of the rival character to be allocated is randomly selected by lottery. In this case, any character is randomly selected as a rival character by lottery from characters whose aptitude parameters related to racetrack aptitudes for racetracks, such as turf and dirt, and distance aptitudes for distances, such as short-distance, mile, mid-distance, and long-distance, set for the compatible race are higher than or equal to the predetermined value (e.g., higher than or equal to C). If there are multiple compatible races during a single turn, the random lottery is performed such that the same rival character (character ID) is not redundant between the multiple compatible races. Moreover, the random lottery for the rival character is performed while excluding the raising target character to be raised.

The parameters for the rival character may be changed in accordance with the difficulty level of the compatible race. For example, the rival character may have higher parameters as the difficulty level of the compatible race increases. The parameters of the rival character may be fixed values regardless of the difficulty level of the compatible race.

The parameters of the rival character are set to increase as the turn of the raising game progresses. In detail, the parameters of the rival character may be set to increase from the initial-phase turn segment, the middle-phase turn segment, and the later-phase turn segment in that order. In more detail, an attribute parameter of the rival character is 1.1 times the attribute parameter of the normal NPC having the same character ID in the case of the initial-phase turn segment, is 1.3 times the attribute parameter of the normal NPC having the same character ID in the case of the middle-phase turn segment, and is 1.5 times the attribute parameter of the normal NPC having the same character ID in the case of the later-phase turn segment.

When the raising target character participates in the compatible race, the player is given a basic reward. When the raising target character wins against the rival character in the compatible race, the player is given an additional reward in addition to the basic reward. The additional reward may be given when the raising target character participates in the compatible race regardless of the win-loss result against the rival character. The basic reward can be obtained by the player regardless of the win-loss result against the rival character. The additional reward is given to the raising target character separately from the basic reward and is, for example, a skill hint related to the racetrack of the compatible race, a skill hint related to the distance of the compatible race, or a skill hint related to the running style of the raising target character.

The additional reward may be a predetermined event displayed on the display 26. In the predetermined event, for example, the rival character is displayed. The additional reward also includes a skill hint associated with the raising target character and a parameter. The skill hint may be determined based on parameters, such as the racetrack aptitude, the distance aptitude, and the running-style aptitude of the raising target character.

[Process for Providing Notification about Rival-Character Allocation]

Figures 39A, 39B:
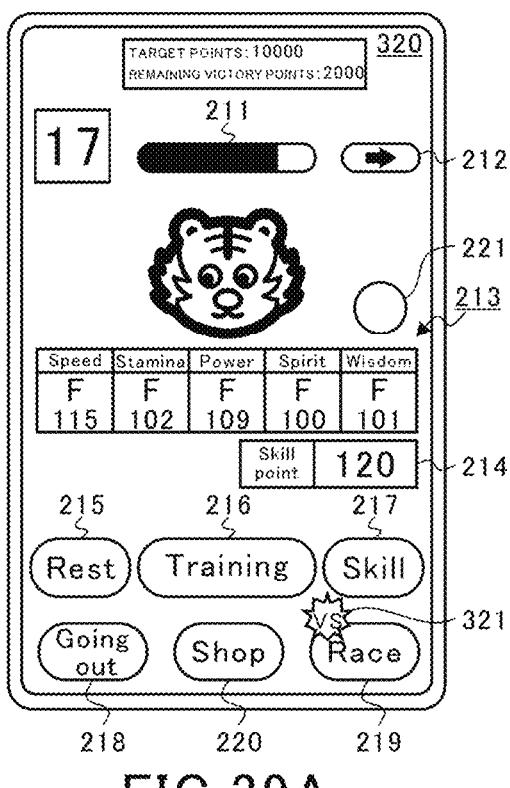
FIG. 39A illustrates a notification about allocation of a rival character on the game screen.
FIG. 39B illustrates a notification about allocation of the rival character on the individual-race selection screen.

FIG. 39A illustrates a notification about rival-character allocation on a game screen 320. FIG. 39B illustrates a notification about rival-character allocation on an individual-race selection screen 330.

When the rival-character allocation is set in accordance with the "process for determining rival-character allocation", a rival-character notification indication 321 is displayed in a superposed fashion over the individual-race operation section 219 of the game screen 320, as shown in FIG. 39A.

When the individual-race operation section 219 displaying the rival-character notification indication 321 is tapped, the individual-race selection screen 330 shown in FIG. 39B is displayed on the display 26. The rival-character notification indication 321 indicating "rival-character participates" is displayed in a superposed fashion over the race category (compatible race) to which the rival character is set to be allocated among the race categories in the individual-race selection operation section 266 on the individual-race selection screen 330.

This embodiment relates to an example where the rival-character notification indication 321 shown in FIGS. 39A and 39B is displayed on the display 26 when the allocation of the rival character is set. However, the configuration is not limited to this. For example, the rival-character notification indication 321 may include text or an image based on which the character type of the rival character can be identified.

In this embodiment, if the raising target character has achieved a predetermined condition when the final turn is completed in each of the initial-phase turn segment, the middle-phase turn segment, and the later-phase turn segment, a bonus event occurs. Examples of the predetermined condition include a state where the victory points acquired are beyond the target points by a predetermined value or more, a state where first place is acquired in a race at a predetermined difficulty level (e.g., GI) for a predetermined number of times or more, and a state where a victory is achieved against the rival character for a predetermined number of times or more.

The bonus event includes a low bonus event and a high bonus event, and the type of bonus event that occurs varies depending on the achievement status of the predetermined condition. A low bonus event is, for example, an event that increases the level of unique skill set for the raising target character. A high bonus event includes, for example, an event that increases a parameter of the raising target character by a predetermined value and an event that increases the skill points by a predetermined value, in addition to the event that increases the level of unique skill set for the raising target character.

In this embodiment, when only a basic condition of the predetermined condition is achieved, the low bonus event occurs. When an additional condition is achieved in addition to the basic condition of the predetermined condition, the high bonus event occurs. In the high bonus event, the details of the event change based on the type of turn segment.

For example, when the type of turn segment is the initial-phase turn segment, the high bonus event that occurs causes the level of unique skill set for the raising target character to increase, causes one random type of parameter among the parameters of the raising target character to increase by a predetermined value (e.g., +10), and causes the skill points to increase by a predetermined value (e.g., +20).

When the type of turn segment is the middle-phase turn segment, the high bonus event that occurs causes the level of unique skill set for the raising target character to increase, causes all of the parameters of the raising target character to increase by a predetermined value (e.g., +5), and causes the skill points to increase by a predetermined value (e.g., +30).

When the type of turn segment is the later-phase turn segment, the high bonus event that occurs causes the level of unique skill set for the raising target character to increase, causes all of the parameters of the raising target character to increase by a predetermined value (e.g., +10), and causes the skill points to increase by a predetermined value (e.g., +30).

In this embodiment, the bonus event also occurs when the raising target character has achieved a special condition, separately from the bonus event that occurs at the end of the aforementioned turn segment. A special condition is, for example, a state where the raising target character has won and achieved first place in a specific race among individual races. In detail, a special condition includes a state where first place is acquired a predetermined number of times in an individual race where a specific racetrack and a specific distance are set, a state where first place is acquired a predetermined number of times in a specific local individual race, and a state where first place is acquired in a specific race among highly-difficult GI races. The bonus event causes, for example, a parameter of the raising target character to increase by a predetermined value.

In the aforementioned main raising game, when all of the turns are completed, the raising game ends. If a target set for each character or target points set for each prescribed turn segment is/are not achievable in mid-course of the main raising game, the raising game ends at that time point.

When the raising game ends, the raising target character raised in the raising game is stored as a raised character. More precisely, information (referred to as "raised character information" hereinafter) related to the raised character raised in the raising game is stored in association with the player ID. The raised character information is stored in both the player terminal 1 and the server 1000. The raised character information stored in association with the player ID includes attribute parameters, aptitude parameters, acquired skills, and inheritance information.

Furthermore, when the raising game ends, the score of the raised character is calculated. The score is calculated based on, for example, the attribute parameters, the aptitude parameters, the acquired skills, and the individual-race record at the end of the raising game. The method for calculating the score, that is, a calculation expression for calculating the score, is prepared in advance, and the score is calculated based on the predetermined calculation expression. The method for calculating the score and the calculation expression are not particularly limited. For example, the score may be calculated based only on parameters that affect the race result when the raised character participates in a race in a team competition game or another race game. Such parameters include the attribute parameters, the aptitude parameters, and the acquired skills at the end of the raising game.

The raised character has a raising rank set therefor based on the score. A raising rank is an indicator indicating the strength of the raised character. Each raising rank is associated with a score range. For example, a raised character with a score ranging between 13,000 and 14,499 is given a raising rank of "A+", and a raised character with a score ranging between 14,500 and 15,499 is given a raising rank of "S". Accordingly, a raising rank is given based on the score, so that the approximate strength of the raised character is ascertainable. The raised character information also includes the score and the raising rank.

Figure 40A:
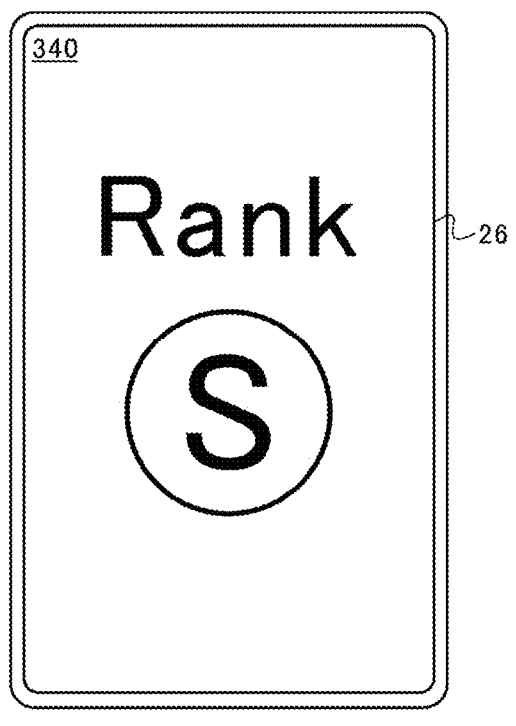
FIG. 40A is a first diagram illustrating a raising completion screen.
Figure 40B:
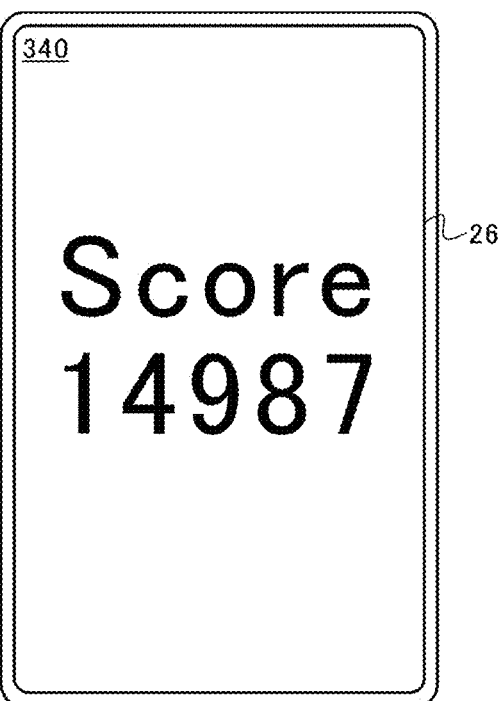
FIG. 40B is a second diagram illustrating the raising completion screen.
Figure 40C:
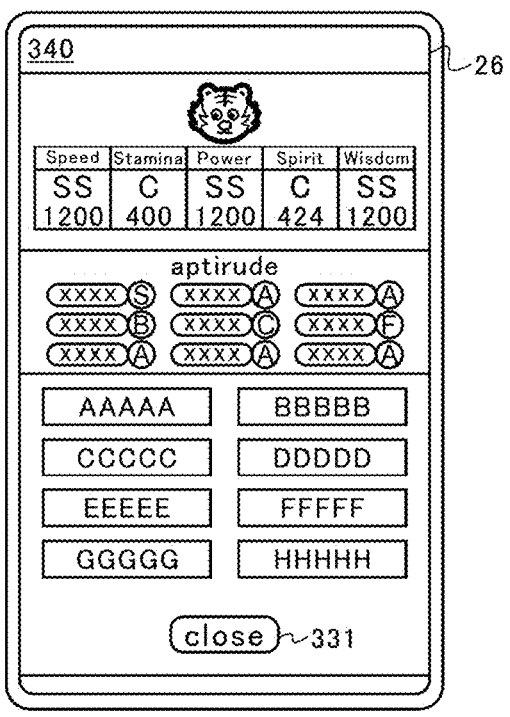
FIG. 40C is a third diagram illustrating the raising completion screen.

FIG. 40A is a first diagram illustrating a raising completion screen 340. FIG. 40B is a second diagram illustrating the raising completion screen 340. FIG. 40C is a third diagram illustrating the raising completion screen 340. As shown in FIG. 40A, when the raising game ends, the raising completion screen 340 is displayed on the display 26. The raising completion screen 340 first displays the raising rank of the raised character, and then displays the score, as shown in FIG. 40B.

After a predetermined time period elapses from when the score is displayed, the attribute parameters, the aptitude parameters, and the acquired skills of the raised character are displayed on the raising completion screen 340, as shown in FIG. 40C. In this case, the raising completion screen 340 is provided with a close operation section 331. When the close operation section 331 is tapped, the raising completion screen 340 is no longer displayed, and the home screen 100 is displayed on the display 26.

When the raising game ends, a lottery for factors to be acquired by the raising target character is performed, and factor information is stored in association with the raised character. Although not shown, the player can cause the raising completion screen 340 to display the factor information acquired by the raised character.

Next, the functional configurations of the player terminal 1 and the server 1000 for executing the raising game described above will be described. In the following description, a process related particularly to the group support card in the raising game will be described in detail, whereas descriptions regarding other processes will be omitted.

[Function Configuration of Player Terminal 1]

Figure 41:
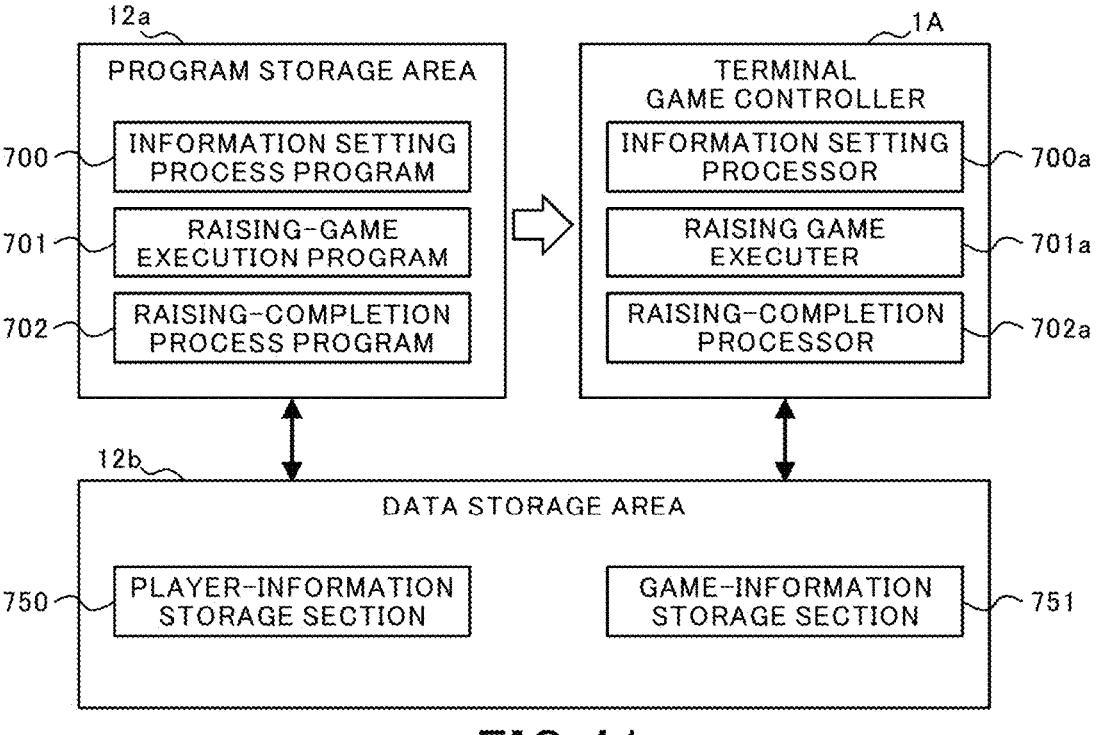
FIG. 41 illustrates the configuration of a memory in the player terminal and the function thereof as a computer.

FIG. 41 illustrates the configuration of the memory 12 in the player terminal 1 and the function thereof as a computer. The memory 12 is provided with a program storage area 12*a* and a data storage area 12*b*. When a game starts, the CPU 10 stores a terminal game control program (module) in the program storage area 12*a*.

The terminal game control program includes an information setting process program 700, a raising-game execution program 701, and a raising-completion process program 702. The programs listed in FIG. 41 are examples, and the terminal game control program may be provided with other multiple programs.

The data storage area 12*b* is provided with a player-information storage section 750 and a game-information storage section 751 as storage sections for storing data. The data storage area 12*b* is provided with other multiple storage sections. In this case, information directly related to a game (referred to as "game information" hereinafter), such as the raising game, is stored in the game-information storage section 751.

Various types of information during the progress of each game, such as the raising game, are also provisionally stored in the game-information storage section 751. Therefore, all pieces of information related to a raised character raised in the raising game are stored in the game-information storage section 751. Furthermore, for example, all pieces of information other than the game information, such as information related to the player or another player and setting information about the player terminal 1, are defined as player information. The player information is stored in the player-information storage section 750.

The CPU 10 activates each program stored in the program storage area 12*a* and updates the data in each storage section of the data storage area 12*b*. By activating each program stored in the program storage area 12*a*, the CPU 10 causes the player terminal 1 (computer) to function as a terminal game controller 1A. The terminal game controller 1A includes an information setting processor 700*a*, a raising game executer 701*a*, and a raising-completion processor 702*a*.

In detail, the CPU 10 activates the information setting process program 700 to cause the computer to function as the information setting processor 700*a*. Likewise, the CPU 10 activates the raising-game execution program 701 and the raising-completion process program 702 to cause the computer to function as the raising game executer 701*a* and the raising-completion processor 702*a*, respectively.

When various types of information are set in the player terminal 1, the information setting processor 700*a* stores the setting-related information as player information in the player-information storage section 750. When information in the player-information storage section 750 is updated, the information setting processor 700*a* transmits the updated information to the server 1000.

The raising game executer 701*a* executes all processes related to the raising game. In detail, the raising game executer 701*a* executes the preparation stage process and the raising stage process.

Upon completion of the raising game, the raising-completion processor 702*a* stores the raised character information including the attribute parameters, aptitude parameters, acquired skills, inheritance information, and factor information of the raised character, as well as the type of character used in the raising.

[Function Configuration of Server 1000]

Figure 42:
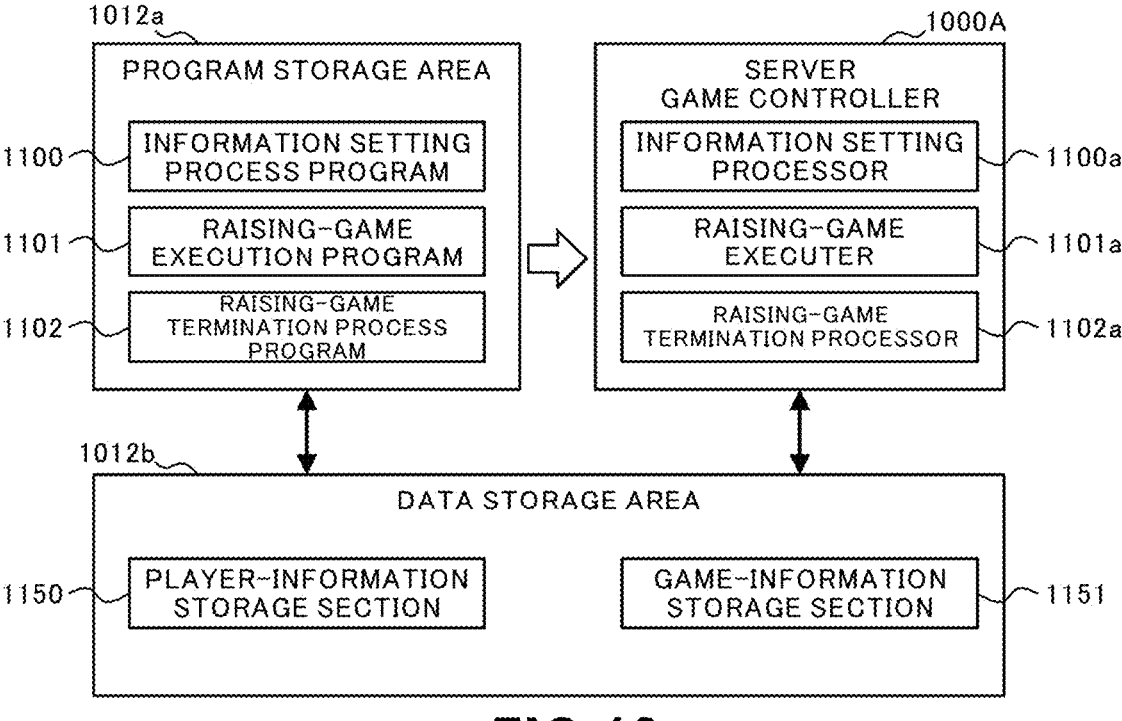
FIG. 42 illustrates the configuration of a memory in the server and the function thereof as a computer.

FIG. 42 illustrates the configuration of the memory 1012 in the server 1000 and the function thereof as a computer. The memory 1012 is provided with a program storage area 1012*a* and a data storage area 1012*b*. When a game starts, the CPU 1010 stores a server game control program (module) in the program storage area 1012*a*.

The server game control program includes an information setting process program 1100, a raising-game execution program 1101, and a raising-game termination process program 1102. The programs listed in FIG. 42 are examples, and the server game control program may be provided with other multiple programs.

The data storage area 1012*b* is provided with a player-information storage section 1150 and a game-information storage section 1151 as storage sections for storing data. The data storage area 1012*b* is provided with other multiple storage sections. In this case, game information about all the players is stored in the game-information storage section 1151 in association with the player IDs. Moreover, player information about all the players is stored in the player-information storage section 1150 in association with the player IDs.

The CPU 1010 activates each program stored in the program storage area 1012*a* and updates the data in each storage section of the data storage area 1012*b*. By activating each program stored in the program storage area 1012*a*, the CPU 1010 causes the server 1000 (computer) to function as a server game controller 1000A. The server game controller 1000A includes an information setting processor 1100*a*, a raising-game executer 1101*a*, and a raising-game termination processor 1102*a*.

In detail, the CPU 1010 activates the information setting process program 1100 to cause the computer to function as the information setting processor 1100*a*. Likewise, the CPU 1010 activates the raising-game execution program 1101 and the raising-game termination process program 1102 to cause the computer to function as the raising-game executer 1101*a* and the raising-game termination processor 1102*a*, respectively.

When various types of information are set in the player terminal 1, the information setting processor 1100*a* updates the player information in the player-information storage section 1150 based on update information received from the player terminal 1. Moreover, the information setting processor 1100*a* measures the time and updates the game points of each player.

The raising-game executer 1101*a* executes all processes related to the raising game.

When the raising game ends, the raising-game termination processor 1102*a* derives the score and the raising rank of the raised character. The raising-game termination processor 1102*a* determines factors to be acquired by the raised character by lottery. Then, the raised character information including the attribute parameters, aptitude parameters, acquired skills, inheritance information, and factor information of the raised character, as well as the type of character used in the raising, is stored in the game-information storage section 1151 in association with the player ID.

Although the information setting processor 700a in the player terminal 1 and the information setting processor 1100a in the server 1000 are similar to each other in that they both store player information, they differ from each other in terms of detailed processing contents and the range of player information to be stored. Although the raising game executer 701a in the player terminal 1 and the raising-game executer 1101a in the server 1000 are similar to each other in that they both execute processing related to the raising game, the two have different roles, that is, the two are responsible for different jobs.

The processes carried out by the functional units in the player terminal 1 and the server 1000 described above will be described below by using flowcharts.

[Processing By Player Terminal 1 and Server 1000]

[Raising-Game-Related Process]

Figure 43:
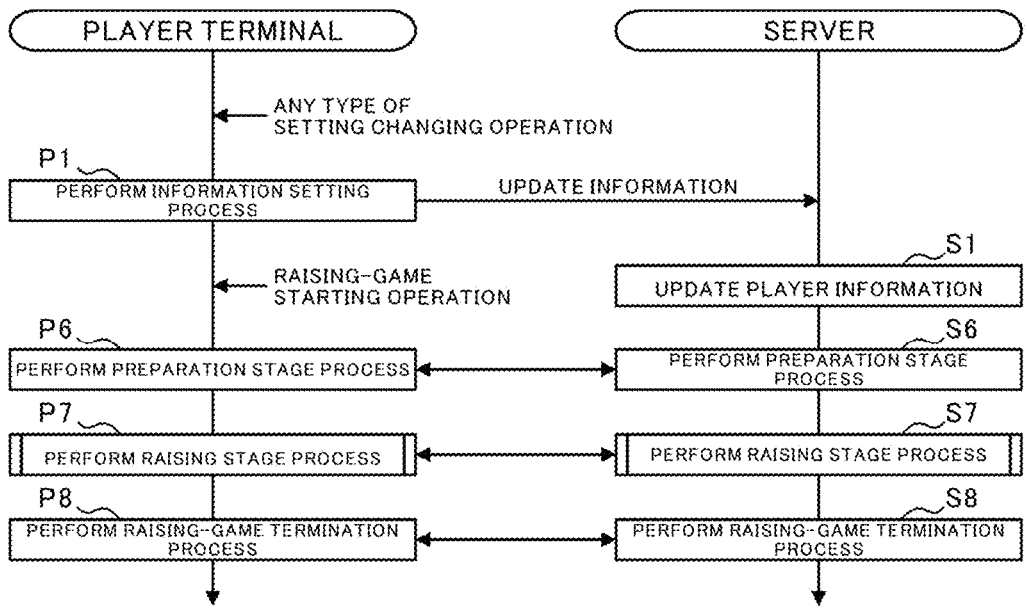
FIG. 43 is a sequence diagram illustrating processing by the player terminal and the server involved with the raising game.

FIG. 43 is a sequence diagram illustrating the processing by the player terminal 1 and the server 1000 involved with the raising game. In the following description, a process in the player terminal 1 will be indicated as Pn (n being an arbitrary integer). A process in the server 1000 will be indicated as Sn (n being an arbitrary integer).

When the player performs any type of setting changing operation on the player terminal 1, the information setting processor 700a of the player terminal 1 performs an information setting process (P1) for updating the player-information storage section 750 based on the operation input by the player. This information setting process involves transmitting update information to the server 1000. When the server 1000 receives the update information, the information setting processor 1100a updates the player information in the player-information storage section 1150 (S1).

An example of the player information updated in P1 and S1 is profile information settable by the player. Furthermore, for example, when an operation for adding another player as a friend or an operation for removing a friend is input as the setting changing operation, friend information as friend-related information is updated. In P1 and S1, the information setting processor 700a and the information setting processor 1100a individually manage game points to be consumed for executing the raising game. If the game points are below an upper limit value, each of the information setting processors 700a and 1100a measures the time and adds a predetermined value of game points to the player at predetermined intervals.

When a raising-game starting operation for starting the raising game is input to the player terminal 1, the raising game executer 701a executes a preparation stage process (P6). During this preparation stage process, a communication process is performed between the player terminal 1 and the server 1000. In the server 1000, the raising-game executer 1101a executes a preparation stage process (S6) based on information received from the player terminal 1. In the preparation stage process (P6, S6), the raising target character and the deck including the inheritance characters and the support cards are set and registered based on an operation performed by the player.

When the preparation stage process (P6) ends, the raising game executer 701a executes a raising stage process (P7). During this raising stage process, a communication process is performed between the player terminal 1 and the server 1000. In the server 1000, the raising-game executer 1101a executes a raising stage process (S7) based on information received from the player terminal 1. In actuality, the roles are shared between the player terminal 1 and the server 1000, and the main raising game progresses in the raising stage process (P7) at the player terminal 1 and in the raising stage process (S7) at the server 1000.

Alternatively, the processes in the raising stage process (P7), to be described below, at the player terminal 1 may partially or entirely be carried out in the raising stage process (S7) at the server 1000, or the processes in the raising stage process (S7) at the server 1000 may partially or entirely be carried out in the raising stage process (P7) at the player terminal 1.

When the raising stage process (P7) is completed, the raising-completion processor 702a in the player terminal 1 executes a raising-game termination process (P8). Likewise, when the raising stage process (S7) is completed, the raising-game termination processor 1102a in the server 1000 executes a raising-game termination process (P8). In the raising-game termination process (P8, S8), the raising target character raised in the raising stage process is saved as a raised character. In this case, factor information given to the raised character is determined by lottery and is stored in association with the raised character. The raising stage process (P7, S7) will be described below in detail.

Figure 44:
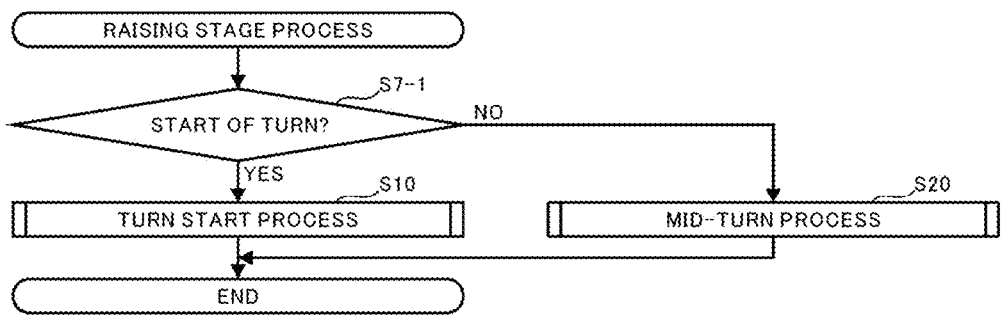
FIG. 44 is a flowchart illustrating a raising stage process in the server.

FIG. 44 is a flowchart illustrating the raising stage process in the server 1000. The raising-game executer 1101a of the server 1000 executes a turn start process (S10) if at the start of a turn (YES in S7-1), or executes a mid-turn process (S20) if not at the start of a turn.

Figure 45:
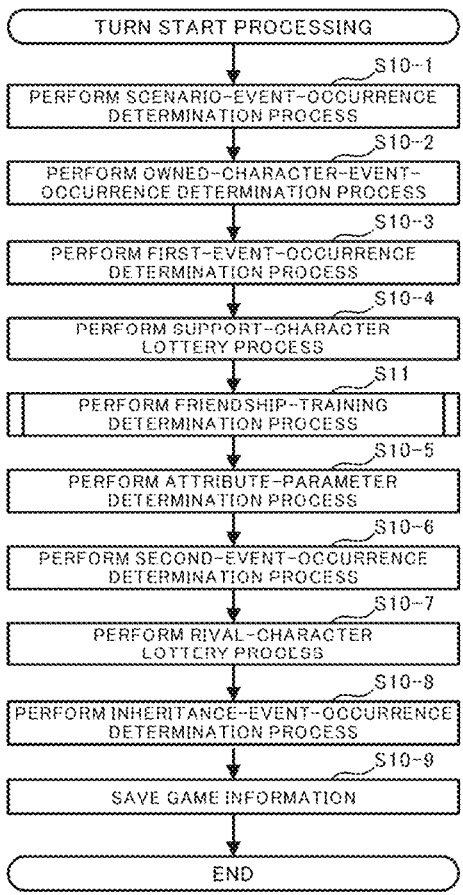
FIG. 45 is a flowchart illustrating the turn start process in the server.

FIG. 45 is a flowchart illustrating the turn start process in the server 1000. As shown in FIG. 45, the raising-game executer 1101a of the server 1000 first executes a scenario-event-occurrence determination process (S10-1). If there is a scenario event that always occurs at the current turn number, the raising-game executer 1101a determines that the scenario event is to occur. If there is no scenario event that always occurs at the current turn number, the raising-game executer 1101a determines whether or not a scenario event is to occur by lottery and determines the type of scenario event that is to occur by lottery.

The raising-game executer 1101a executes an owned-character-event-occurrence determination process (S10-2). If there is an owned character event that always occurs at the current turn number, the raising-game executer 1101a determines that the owned character event is to occur. If there is no owned character event that always occurs at the current turn number, the raising-game executer 1101a determines whether or not an owned character event is to occur by lottery and determines the type of owned character event that is to occur by lottery.

The raising-game executer 1101a executes a first-event-occurrence determination process (S10-3). In this case, a random number is randomly acquired at the start of a turn. Based on the acquired random number and the first event table, it is determined whether or not the first event is to occur, and the type of first event that is to occur is determined.

The raising-game executer 1101a executes a support-character lottery process (S10-4). In detail, the raising-game executer 1101a refers to the allocation table shown in FIG. 32 to determine by lottery whether or not a support character is to be allocated to each training item. This process is executed for every support character.

If it is determined that a support character is to be allocated to a training item, the raising-game executer 1101a associates a support card ID (or a support character ID) with a training ID provided for each training item.

The raising-game executer 1101*a* executes a friendship-training determination process (S11) for determining whether or not friendship training is to occur.

Figure 46:
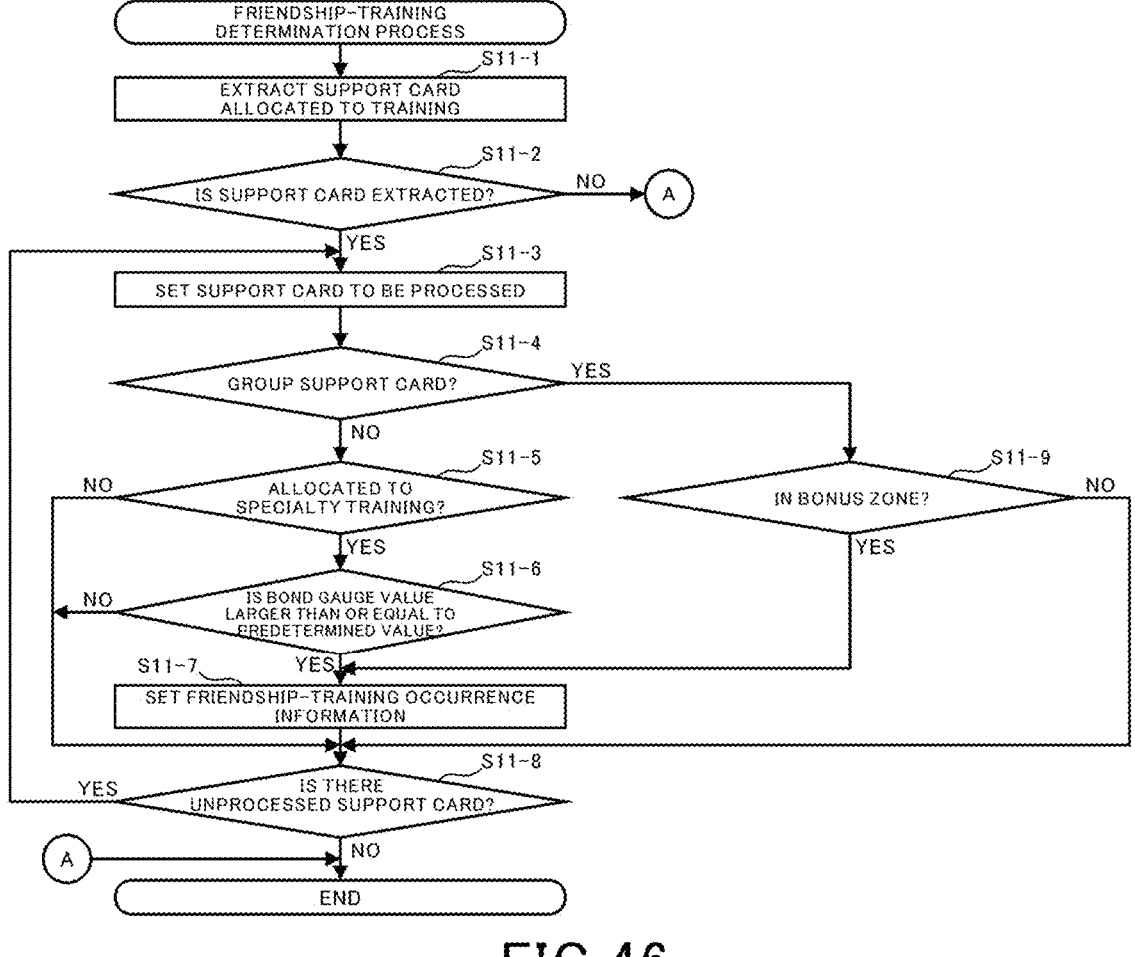
FIG. 46 is a flowchart illustrating a friendship-training determination process in the server.

FIG. 46 is a flowchart illustrating the friendship-training determination process in the server 1000. The raising-game executer 1101*a* extracts a support card associated with any of the training items in step S10-4 (S11-1). If a support card is extracted (YES in S11-2), the raising-game executer 1101*a* sets the support card to be processed for determining whether or not friendship training is to occur (S11-3).

If the support card set in S11-3 is not a group support card (NO in S11-4), the raising-game executer 1101*a* determines whether the training item to which the support card is allocated is specialty training set in the support card (S11-5). If the support card is allocated to specialty training (YES in S11-5) and the bond gauge value of the support card is larger than or equal to a predetermined value (80) (YES in S11-6), the raising-game executer 1101*a* sets friendship-training occurrence information indicating the occurrence of friendship training in association with the support card (S11-7).

On the other hand, if the support card set in S11-3 is a group support card (YES in S11-4) and the bonus zone is being executed (YES in S11-9), the raising-game executer 1101*a* sets the friendship-training occurrence information (S11-7). If the support cards allocated to the training items includes an unprocessed support card that has not undergone the processing from step S11-3 to step S11-9, the raising-game executer 1101*a* repeats the processing from S11-3.

Referring back to FIG. 45, the raising-game executer 1101*a* executes an attribute-parameter determination process (S10-5). The attribute-parameter determination process involves executing each type of training and determining an increase value of an attribute parameter of the raising target character when the training is successful. In detail, the raising-game executer 1101*a* refers to the training level table shown in FIG. 33A, the fixed-increase-value tables shown in FIGS. 33B and 33C, and the bonus-addition-rate table shown in FIG. 33D to determine the increase values of the attribute parameters of the raising target character when the training is successful with respect to all of the training items. Accordingly, when friendship training occurs, the increase values of the attribute parameters increase.

The raising-game executer 1101*a* refers to an endurance table (not shown) to determine an endurance reduction amount or an endurance recovery amount when each training item is executed. Furthermore, the raising-game executer 1101*a* calculates a failure rate of the training with respect to each training item based on the endurance of the raising target character.

The raising-game executer 1101*a* executes a second-event-occurrence determination process (S10-6). In detail, the raising-game executer 1101*a* refers to the second event table shown in FIG. 34 to determine whether or not a second event is to occur by lottery. Specifically, after the support-character lottery process (S10-4), a random number is randomly acquired, and it is determined whether or not a second event is to occur based on the acquired random number and the second event table. For example, the raising-game executer 1101*a* performs an addition lottery for determining whether or not a preset support event can be added to the support card associated with the training item in S10-4.

If it is determined that a second event is to occur, an effect caused by the occurrence of the second event is determined. If in the bonus zone, the raising-game executer 1101*a* performs a computing process to increase the effect caused by the occurrence of the second event.

The raising-game executer 1101*a* executes a rival-character lottery process (S10-7). In detail, the raising-game executer 1101*a* refers to the allocation table shown in FIG. 38 to determine by lottery whether or not a rival character is to be allocated to each compatible race.

The raising-game executer 1101*a* executes an inheritance-event-occurrence determination process (S10-8). In detail, if the current turn is a factor activation turn, the raising-game executer 1101*a* determines that an inheritance event is to occur. In this case, the raising-game executer 1101*a* determines whether or not each factor is to be activated based on factor information of an inheritance character registered in the deck in the preparation stage process in S6. Accordingly, an attribute parameter or an aptitude parameter may increase or a skill hint may be acquired in accordance with each factor set to be activated.

The raising-game executer 1101*a* saves game information including the information related to the lottery results in S10-1 to S10-8 into the game-information storage section 1151 (S10-9). Moreover, the raising-game executer 1101*a* performs a process for causing the player terminal 1 to receive the game information saved in the game-information storage section 1151.

Figure 47:
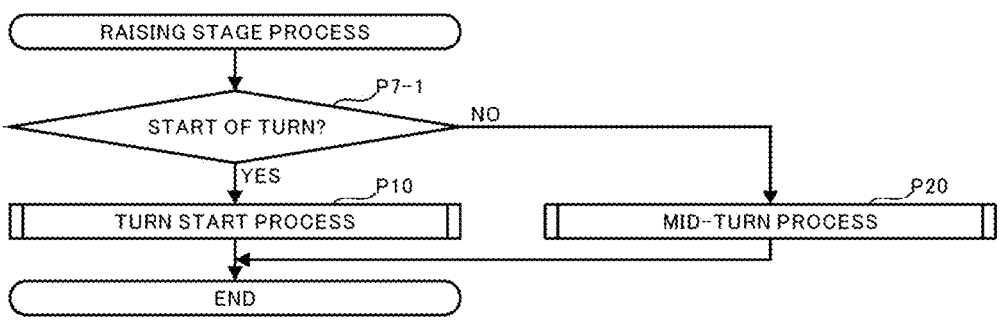
FIG. 47 is a flowchart illustrating a raising stage process in the player terminal.

FIG. 47 is a flowchart illustrating the raising stage process in the player terminal 1. The raising game executer 701*a* of the player terminal 1 executes a turn start process (P10) if at the start of a turn (YES in P7-1), or executes a mid-turn process (P20) if not at the start of a turn.

Figure 48:
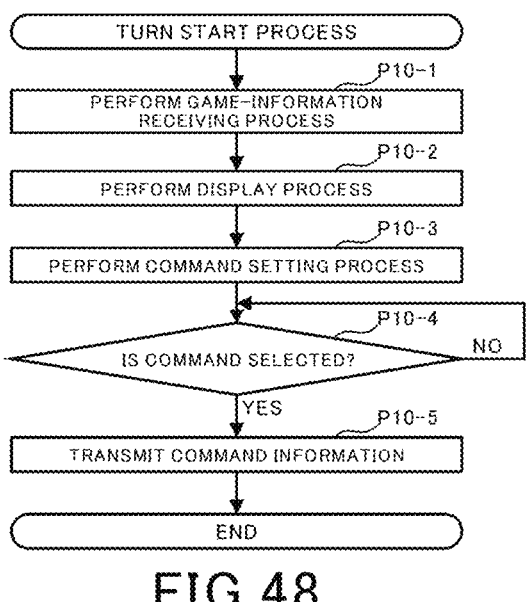
FIG. 48 is a flowchart illustrating the turn start process in the player terminal.

FIG. 48 is a flowchart illustrating the turn start process in the player terminal 1. The turn start process (P10) in the player terminal 1 commences when the turn start process (S10) in the server 1000 is executed and the game information is set in step S10-9.

The raising game executer 701*a* accesses the game-information storage section 1151 of the server 1000 and receives the game information saved in S10-9 from the server 1000 (P10-1). The raising game executer 701*a* performs a display process for displaying, for example, the game screen 210 based on the received game information (P10-2). Then, the raising game executer 701*a* executes a command setting process for allowing the player to select any of various commands related to the raising stage process (P10-3).

In detail, for example, the raising game executer 701*a* refers to the selection item table shown in FIG. 19 and performs a process for allowing the player to select any of various commands from the rest operation section 215, the training operation section 216, the skill operation section 217, the outing operation section 218, the individual-race operation section 219, the shop operation section 220, and the item operation section 221 based on the current turn number. Moreover, the raising game executer 701*a* performs a process for allowing the player to select any of the multiple individual-race selection operation sections 266 associated with the individual-race operation section 219.

In a commanding process, the raising game executer 701*a* allows the player to select any of commands using, for example, the speed operation section 241, the stamina operation section 242, the power operation section 243, the spirit operation section 244, and the wisdom operation section 245 corresponding to the respective training items, the skill display field 251, the raising-target-character selection operation section 256*a*, the support-character selection operation section 256*b*, the first-affiliated-character selection operation section 258*a* to the fifth-affiliated-character selection operation section 258*e*, the all-affiliated-character selection operation section 259, the result operation section 273*rde* race operation section 274, or the item-exchange operation section 303. The raising game executer 701*a* performs a process for allowing the player to select one command from these multiple commands.

The raising game executer 701*a* receives release information, to be described later, from the server 1000 so as to make the all-affiliated-character selection operation section 259 selectable thereafter.

Subsequently, when any of the commands is selected by the player (YES in P10-4), the raising game executer 701*a* transmits, to the server 1000, command information based on which the command selected by the player is identifiable (P10-5).

Figure 49:
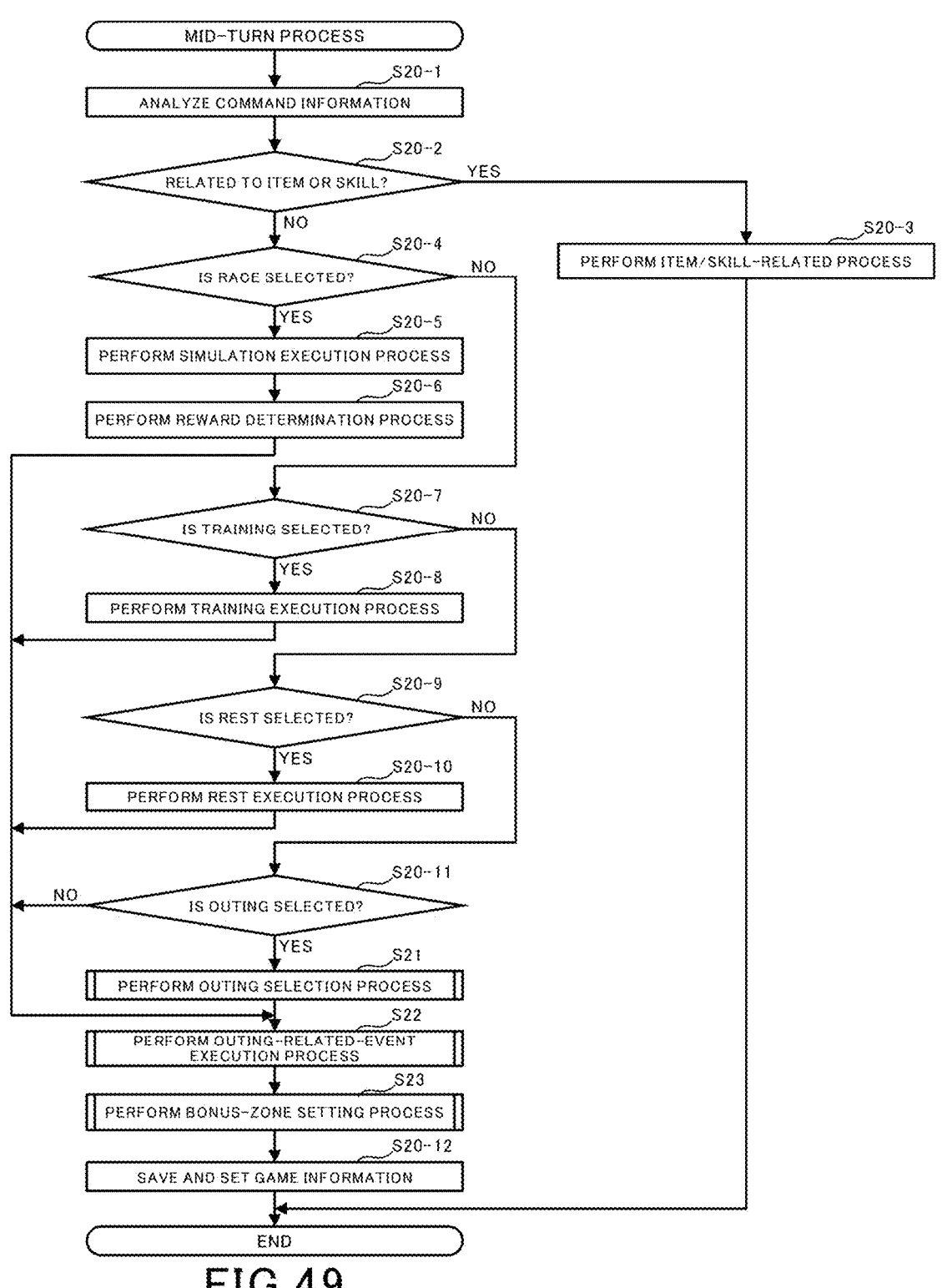
FIG. 49 is a flowchart illustrating a mid-turn process in the server.

FIG. 49 is a flowchart illustrating the mid-turn process in the server 1000. The mid-turn process (S20) in the server 1000 commences when the turn start process (P10) in the player terminal 1 is executed and the command information is transmitted in P10-5.

The raising-game executer 1101*a* analyzes the transmitted command information (S20-1). If the command information related to item or skill acquisition is received (YES in S20-2), the raising-game executer 1101*a* executes an item/skill-related process for acquiring an item or a skill (S20-3).

If the command information related to race execution is received (YES in S20-4), the raising-game executer 1101*a* derives a race result in accordance with a simulation execution process (S20-5) and determines a reward (S20-6).

If the command information indicating any of the training items is received (YES in S20-7), the raising-game executer 1101*a* performs a training execution process (S20-8). In this case, it is determined whether the training has succeeded or failed, and an attribute parameter is updated. If a support card is associated with the executed training, a process for updating the bond gauge value is executed.

If the command information indicating the rest operation section 215 is received (YES in S20-9), the raising-game executer 1101*a* performs a rest execution process (S20-10). In this case, an increase value for endurance is set, and the set increase value is added to the current endurance.

When an outing is selected, that is, when command information indicating the raising-target-character selection operation section 256*a*, the support-character selection operation section 256*b*, the first-affiliated-character selection operation section 258*a* to the fifth-affiliated-character selection operation section 258*e*, or the all-affiliated-character selection operation section 259 is received (YES in S20-11), the raising-game executer 1101*a* performs an outing selection process (S21).

Figure 50:
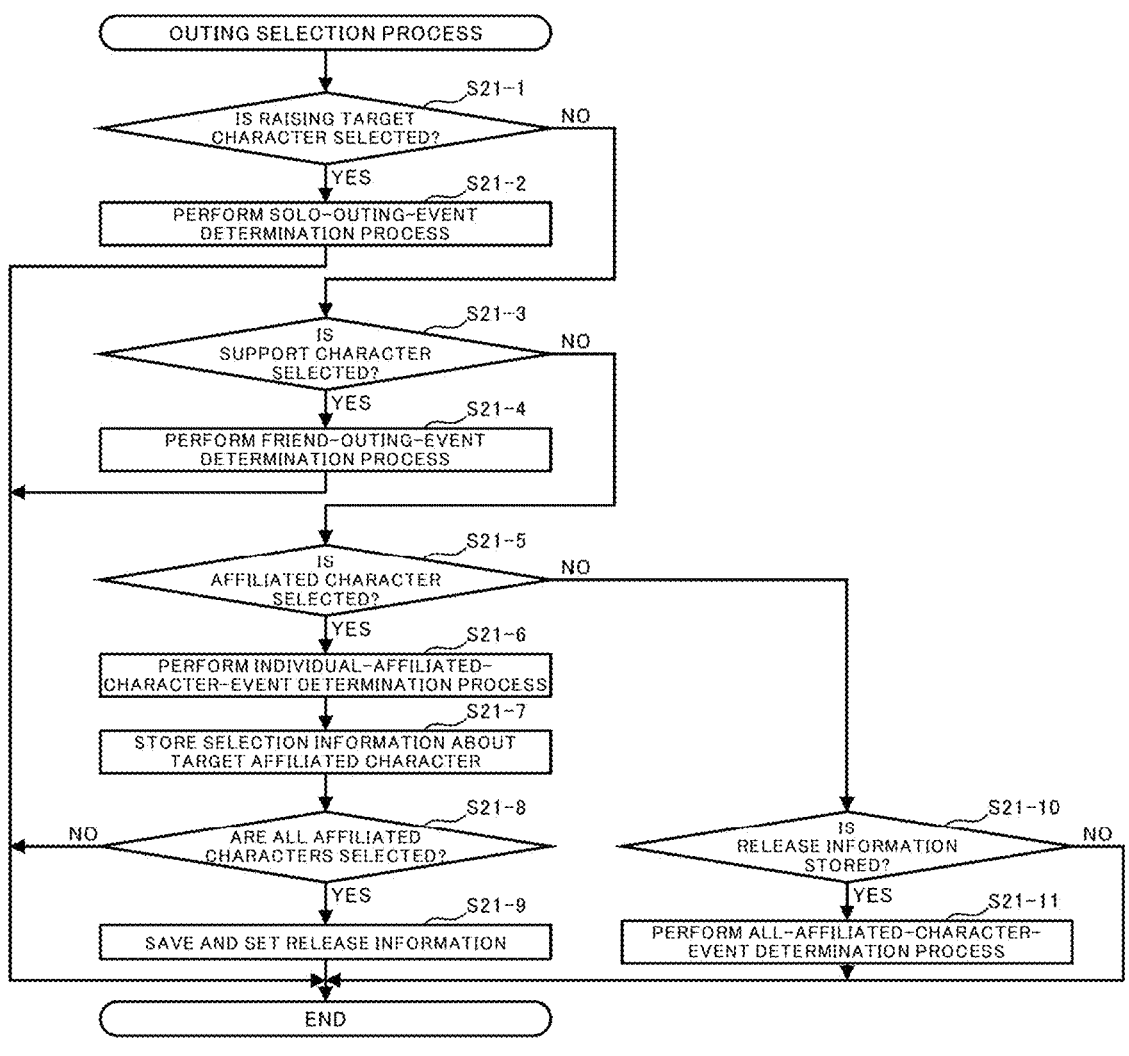
FIG. 50 is a flowchart illustrating an outing selection process in the server.

FIG. 50 is a flowchart illustrating the outing selection process in the server 1000. If the command information indicating the raising-target-character selection operation section 256*a* is received (YES in S21-1), the raising-game executer 1101*a* executes a solo-outing-event determination process (S21-2). In this case, an execution pattern for a solo outing event is set. Based on the set execution pattern, a parameter is updated.

If the command information indicating the support-character selection operation section 256*b* is received (YES in S21-3), the raising-game executer 1101*a* executes a friend-outing-event determination process (S21-4). In this case, an execution pattern for a friend outing event is set. Based on the set execution pattern, a parameter is updated.

If any of the affiliated characters is selected (YES in S21-5), the raising-game executer 1101*a* sets an execution pattern for an individual affiliated character event (S21-6). In this case, a parameter is updated based on the set execution pattern.

The raising-game executer 1101*a* stores selection information about an affiliated character selected by the player (S21-7). Then, if the selection information is stored with respect to all of the affiliated characters associated with the group support card (YES in S21-8), the raising-game executer 1101*a* stores and sets release information indicating that the all-affiliated-character selection operation section 259 is to be released (S21-9).

When the all-affiliated-character selection operation section 259 is selected (NO in S21-5) and the release information is stored (YES in S21-10), the raising-game executer 1101*a* sets an execution pattern for an all-affiliated-character event (S21-11). Based on the set execution pattern, a parameter is updated. Furthermore, in this case, if the all-affiliated-character event is set for the first time, a process for adding a possessed skill is executed.

Referring back to FIG. 49, if a process related to an end of a turn is executed, an outing-related-event execution process (S22) is executed.

Figure 51:
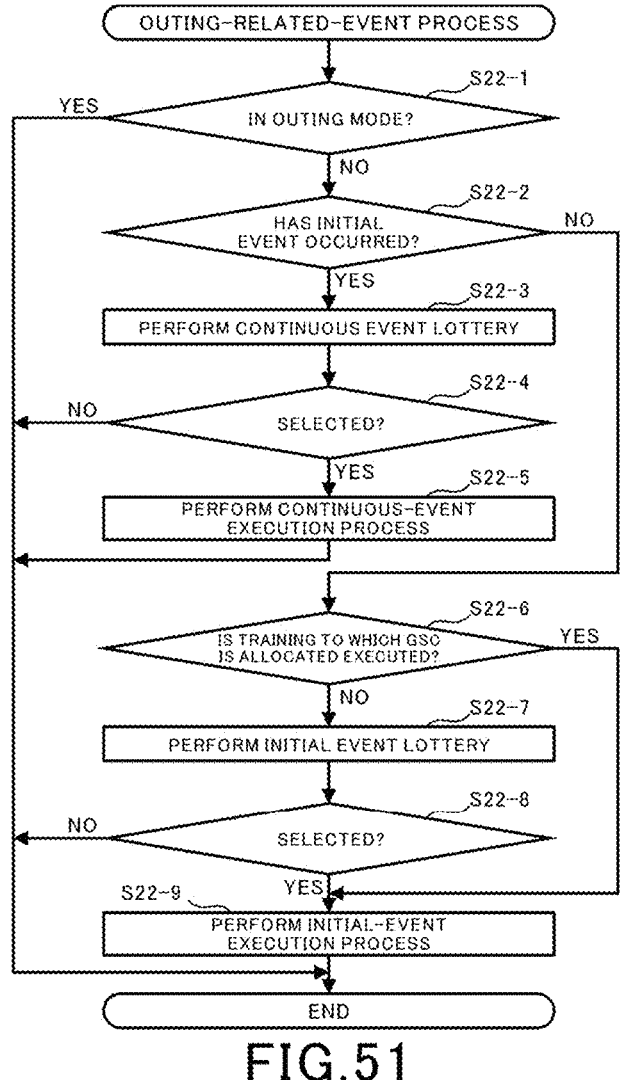
FIG. 51 is a flowchart illustrating an outing-related-event execution process in the server.

FIG. 51 is a flowchart illustrating the outing-related-event execution process in the server 1000. In a case where the outing mode is not set (NO in S22-1) and the initial event has occurred (YES in S22-2), the raising-game executer 1101*a* performs a continuous event lottery (S22-3). In this case, the selection probability of the continuous event lottery is set based on the current bond gauge value of the group support card. When the continuous event is selected by lottery (YES in S22-4), the raising-game executer 1101*a* performs a continuous-event execution process for executing the continuous event (S22-5).

Accordingly, the continuous event is executed in the player terminal 1. Although a description of a specific process will be omitted, when a predetermined option is selected by the player in the player terminal 1 during the continuous event, the outing mode is set in the player terminal 1 and the server 1000.

If the initial event has not occurred (NO in S22-2), the raising-game executer 1101*a* determines whether the training to which the group support card is allocated in S20-8 is executed (S22-6). When the training to which the group support card is allocated is executed (YES in S22-6), the raising-game executer 1101*a* performs an initial-event execution process for executing the initial event (S22-9). Accordingly, the initial event is executed in the player terminal 1.

If the training to which the group support card is allocated is not executed (NO in S22-6), the raising-game executer 1101*a* executes the initial-event lottery (S22-7). When the initial event is selected by lottery (YES in S22-8), the raising-game executer 1101*a* performs the initial-event execution process (S22-9).

Referring back to FIG. 49, the raising-game executer 1101*a* performs a bonus-zone setting process (S23) following the outing-related-event execution process.

Figure 52:
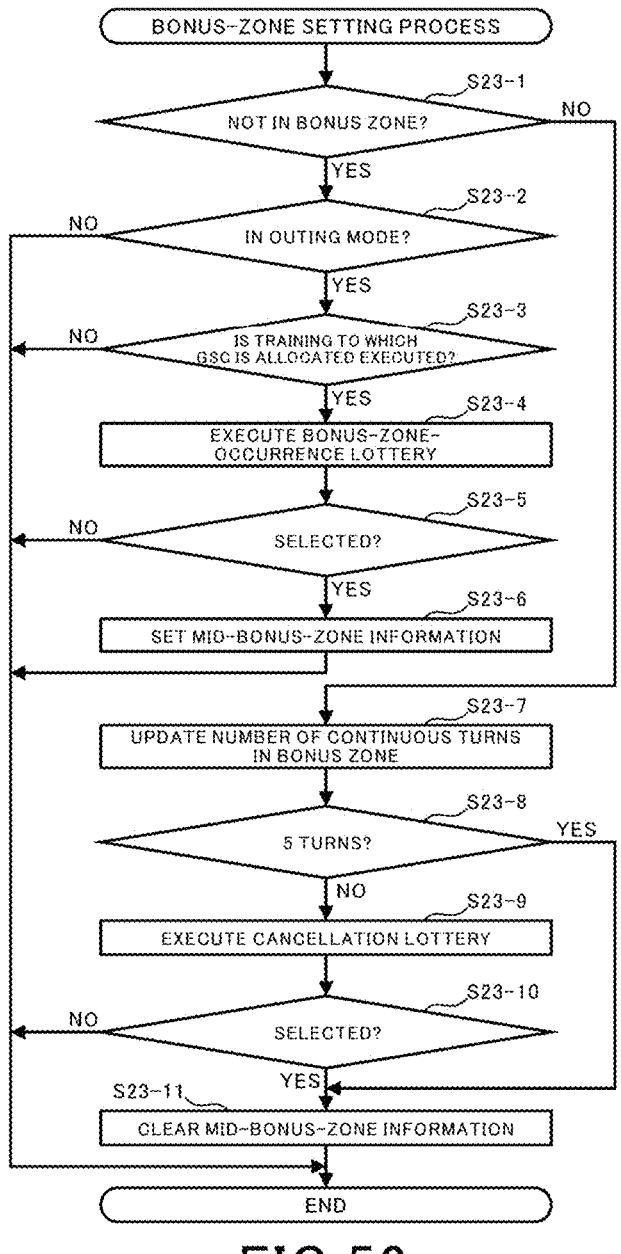
FIG. 52 is a flowchart illustrating a bonus-zone setting process in the server.

FIG. 52 is a flowchart illustrating the bonus-zone setting process in the server 1000. In the case of a non-bonus zone (YES in S23-1) and the outing mode (YES in S23-2), and when training to which the group support card is allocated is executed (YES in S23-3), the raising-game executer 1101*a* executes a bonus-zone occurrence lottery (S23-4). When the bonus zone is selected by lottery (YES in S23-5), the raising-game executer 1101*a* sets mid-bonus-zone information indicating that the bonus zone is being executed (S23-6). The mid-bonus-zone information may be associated with any one of the raising game, the raising target character, and the group support card.

In the case of the bonus zone (NO in S23-1), the raising-game executer 1101*a* updates the number of continuous turns in the bonus zone (S23-7). This involves counting the number of turns executed since the start of the bonus zone. If the number of continuous turns in the bonus zone is five (YES in S23-8), the raising-game executer 1101*a* clears the mid-bonus-zone information (S23-11). Accordingly, the bonus zone is cancelled, that is, ends.

If the number of continuous turns in the bonus zone is not five (NO in S23-8), the raising-game executer 1101*a* executes a cancellation lottery (S23-9). If a cancellation is selected by lottery (YES in S23-10), the raising-game executer 1101*a* clears the mid-bonus-zone information (S23-11). Referring back to FIG. 49, the raising-game executer 1101*a* saves the game information based on the processing results in the mid-turn process (S20) and causes the player terminal 1 to receive the game information.

Figure 53:
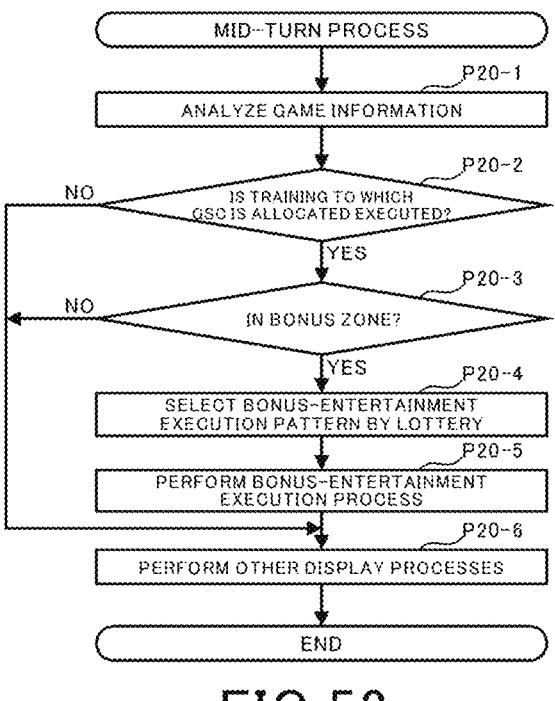
FIG. 53 is a flowchart illustrating a mid-turn process in the player terminal.

FIG. 53 is a flowchart illustrating the mid-turn process in the player terminal 1. The mid-turn process (P20) in the player terminal 1 commences when the mid-turn process (S20) in the server 1000 is executed and the game information is set in S20-12. The raising game executer 701*a* analyzes the received game information (P20-1). Then, when the training to which the group support card is allocated is executed (YES in P20-2) and the bonus zone is being executed (YES in P20-3), the bonus-entertainment execution pattern is selected by lottery (P20-4).

Then, the raising game executer 701*a* executes the bonus entertainment in accordance with the execution pattern selected in P20-4 (P20-5). Furthermore, the raising game executer 701*a* displays various game screens, such as an event screen, based on the analytical result in P20-1 (P20-6). If execution patterns of various events are selected in the server 1000, the raising game executer 701*a* causes the events to occur in the selected execution patterns.

The above-described raising game is achieved in accordance with the above processes. The processes in the player terminal 1 and the server 1000 described above are merely examples. The above-described processes may be executed in the player terminal 1 alone or may be executed in the server 1000 alone.

Although the embodiment has been described above with reference to the appended drawings, the present invention is not limited to the above embodiment. It is obvious to a skilled person that various modifications or alterations may be achieved within the scope defined in the claims, and it is to be understood that such modifications or alterations naturally belong to the technical scope.

The gameplay and the processes in the player terminal 1 and the server 1000 described in the above embodiment are merely examples. In any case, an information processing program may involve causing a computer (either of or both of the player terminal 1 and the server 1000 in the embodiment) to carry out the following processes.

[Processes to be Carried Out by Computer]

A process (e.g., P10-3 in the embodiment) involves allowing a player to select any of multiple predetermined commands (e.g., training items in the embodiment).

A process (e.g., P10-3 in the embodiment) involves allowing the player to select any of multiple specific commands (e.g., the first-affiliated-character selection operation section 258*a* to the fifth-affiliated-character selection section 258*e* in the embodiment) associated with one of multiple pieces of character identification information based on a game medium (e.g., a support card in the embodiment) associated with the multiple pieces of character identification information (e.g., character IDs in the embodiment).

A process (e.g., S20-8 and S21-6 in the embodiment) involves updating a parameter of a raising target character based on the predetermined command or the specific command selected by the player.

A process (e.g., P20-6 in the embodiment) involves causing an event to occur if the specific command is selected, the event involving displaying a character corresponding to the character identification information associated with the selected specific command.

In addition to the above-described processes, the following processes may be carried out.

A process (e.g., S21-9 and P10-3 in the embodiment) involves allowing the player to select a special command (e.g., the all-affiliated-character selection operation section 259 in the embodiment) different from the predetermined command and the specific command when a specific condition is satisfied, the specific condition defining at least either of the number of times the specific command is selected and the type of the selected specific command.

A process (e.g., P20-6 in the embodiment) involves causing a special event (e.g., an all-affiliated-character event in the embodiment) to occur if the special command is selected, the special event involving displaying two or more characters corresponding to any of the multiple pieces of character identification information associated with the game medium.

In the above embodiment, the number of commands and the types thereof that can be selected by the player are merely examples, and design modifications are possible, where appropriate.

In the above embodiment, when any of the specific commands (i.e., the first-affiliated-character selection operation section 258*a* to the fifth-affiliated-character selection operation section 258*e*) and the special command (i.e., the all-affiliated-character selection operation section 259) is selected, the endurance and condition parameters are updated. However, the parameters to be updated when any of the specific commands and the special command is selected are not limited to these parameters. For example, an attribute parameter may be updated. Moreover, the parameters to be updated may vary between the case where the specific command is selected and the case where the special command is selected.

In the above embodiment, a state where all of the specific commands have been selected is set as a specific condition where the special command becomes selectable. Alternatively, for example, a state where the specific condition is satisfied may be achieved and the special command may become selectable when a predetermined specific command is selected from among the multiple specific commands. As another alternative, a state where a specific command is selected a predetermined number of times may be set as the specific condition. In other words, at least either of the number of times the specific command is selected and the type of the selected specific command may be defined as the specific condition.

The information processing program for executing the processing in the above embodiment and various modifications may be provided as a storage medium by being stored in a non-transitory computer readable storage medium. Furthermore, a game terminal device including this storage medium may be provided. Moreover, the above embodiment and the modifications may each be an information processing method that realizes the functions and the steps indicated in the flowcharts.

What is claimed is:

1. A non-transitory computer readable medium storing a program causing a computer to execute:

a process for allowing a player to select any of a plurality of predetermined commands;

a process for allowing the player to select any of a plurality of specific commands based on a game medium associated with a plurality of character IDs, each of the plurality of specific commands being associated with one of the plurality of character IDs;

a process for updating a parameter of a raising target character based on the predetermined command or the specific command selected by the player; and a process for causing an event to occur when the specific command is selected, the event involving displaying a character corresponding to a character ID associated with the selected specific command.

2. The non-transitory computer readable medium according to claim 1, wherein the program further causes the computer to execute:

a process for allowing the player to select a special command different from the predetermined command and the specific command when a specific condition is satisfied, the specific condition defining at least either of the number of times the specific command is selected and a type of the selected specific command.

3. The non-transitory computer readable medium according to claim 2, wherein the program further causes the computer to execute:

a process for causing a special event to occur when the special command is selected, the special event involving displaying two or more characters corresponding to two or more of the plurality of character IDs associated with the game medium.

4. An information processing method executed by at least one computer, wherein the at least one computer executes:

a process for allowing a player to select any of a plurality of predetermined commands;

a process for allowing the player to select any of a plurality of specific commands based on a game medium associated with a plurality of character IDs, each of the plurality of specific commands being associated with one of the plurality of character IDs;

a process for updating a parameter of a raising target character based on the predetermined command or the specific command selected by the player; and a process for causing an event to occur when the specific command is selected, the event involving displaying a character corresponding to a character ID associated with the selected specific command.

5. A gaming device causing at least one computer to execute:

a process for allowing a player to select any of a plurality of predetermined commands;

a process for allowing the player to select any of a plurality of specific commands based on a game medium associated with a plurality of character IDs, each of the plurality of specific commands being associated with one of the plurality of character IDs;

a process for updating a parameter of a raising target character based on the predetermined command or the specific command selected by the player; and a process for causing an event to occur when the specific command is selected, the event involving displaying a character corresponding to a character ID associated with the selected specific command.

* * * * *